US010648132B2

(12) United States Patent
Mohammadi et al.

(10) Patent No.: US 10,648,132 B2
(45) Date of Patent: May 12, 2020

(54) FIBROUS STRUCTURES COMPRISING A SURFACE SOFTENING COMPOSITION

(71) Applicant: Elevance Renewable Sciences, Inc., Woodridge, IL (US)

(72) Inventors: Khosrow Parviz Mohammadi, Liberty Township, OH (US); Beth Ann Schubert, Maineville, OH (US)

(*) Notice: Subject to any disclaimer, the term of this patent is extended or adjusted under 35 U.S.C. 154(b) by 31 days.

(21) Appl. No.: 15/723,120

(22) Filed: Oct. 2, 2017

(65) Prior Publication Data

US 2018/0094388 A1 Apr. 5, 2018

Related U.S. Application Data

(60) Provisional application No. 62/403,226, filed on Oct. 3, 2016.

(51) Int. Cl.
| | | |
|---|---|---|
| D21H 17/53 | (2006.01) | |
| D21H 27/00 | (2006.01) | |
| D21H 19/28 | (2006.01) | |
| D21H 21/22 | (2006.01) | |
| D21H 27/40 | (2006.01) | |
| C08F 222/10 | (2006.01) | |

(52) U.S. Cl.
CPC ........... D21H 17/53 (2013.01); C08F 222/10 (2013.01); D21H 19/28 (2013.01); D21H 21/22 (2013.01); D21H 27/005 (2013.01); D21H 27/40 (2013.01)

(58) Field of Classification Search
CPC ........ D21H 17/53; D21H 19/28; D21H 21/22; D21H 27/005; D21H 27/40; C08F 220/68; C08F 222/10; A61K 8/0208
See application file for complete search history.

(56) References Cited

U.S. PATENT DOCUMENTS

| | | | | |
|---|---|---|---|---|
| 4,235,761 A | * | 11/1980 | Koenig | C08L 57/02 524/277 |
| 4,673,525 A | * | 6/1987 | Small | A61K 8/361 510/150 |
| 6,646,085 B1 | * | 11/2003 | Craun | C08F 220/68 524/514 |
| 2011/0201533 A1 | * | 8/2011 | Ponder | C11D 1/667 510/221 |
| 2018/0051114 A1 | * | 2/2018 | Cohen | C08F 222/00 |
| 2018/0051235 A1 | * | 2/2018 | Schubert | C11D 3/001 |
| 2018/0071185 A1 | * | 3/2018 | Cochran | A61K 8/362 |
| 2018/0085288 A1 | * | 3/2018 | Marsh | A61K 8/0208 |
| 2018/0092820 A1 | * | 4/2018 | Stella | A61K 8/375 |
| 2018/0094388 A1 | * | 4/2018 | Mohammadi | D21H 17/53 |
| 2018/0161474 A1 | * | 6/2018 | Klofta | C08G 63/52 |

FOREIGN PATENT DOCUMENTS

| | | | | |
|---|---|---|---|---|
| CA | 2760915 A1 | * | 2/2012 | ............. C11D 3/001 |
| CA | 2940069 A1 | * | 11/2016 | ............. C11D 3/001 |
| GB | 622456 A | * | 5/1949 | ............... B22C 7/02 |

\* cited by examiner

*Primary Examiner* — Jose A Fortuna

(74) *Attorney, Agent, or Firm* — Kilpatrick Townsend & Stockton LLP

(57) ABSTRACT

Fibrous structures having thereon a surface softening composition containing a glyceride copolymer, sanitary tissue products made from such fibrous structures and methods for making same are provided.

19 Claims, 2 Drawing Sheets

FIBROUS STRUCTURES COMPRISING A SURFACE SOFTENING COMPOSITION

FIELD OF THE INVENTION

The present invention relates to fibrous structures and sanitary tissue products comprising such fibrous structures. More particularly, the present invention relates to fibrous structures comprising a surface softening composition comprising a glyceride copolymer, sanitary tissue products comprising such fibrous structures and methods for making same.

BACKGROUND OF THE INVENTION

Fibrous structures comprising surface softening compositions are known in the art. Silicones and quaternary ammonium compounds have been widely used in the past as surface softening agents within surface softening compositions for various fibrous structures from textiles and fabrics to sanitary tissue products, such as toilet paper, facial tissue, paper towels, and wipes.

Unfortunately, the current surface softening agents have a number of drawbacks which include high cost, a narrow pH formulation window, less than desirable stability and/or softening performance. In an effort to alleviate such drawbacks, new surface softening agents have continued to be developed. Unfortunately, even such newly developed surface softening agents continue to exhibit one or more of the abovementioned drawbacks. Applicants recognized that the aforementioned drawbacks are due to one or more of the following factors: hydrolytic instability of ester linkage which is beta to the quaternary ammonium group in the molecule causes pH intolerance, the high charge density of quaternary ammonium headgroup causes salt intolerance, and excessively high molecular weights of the polymeric softening agents makes them difficult to process and dispose of Thus what is required are surface softening agents that comprise a material that functions to soften the fibrous structures they are applied to, but does not exhibit the same level of drawbacks as current surface softening agents.

Accordingly, there is a need for surface softening agents that when applied to a surface of a fibrous structure provides the fibrous structure with softness without the drawbacks discussed above, sanitary tissue products comprising such fibrous structures, and methods for making same.

SUMMARY OF THE INVENTION

The present invention fulfills the need described above by providing a fibrous structure comprising a surface softening composition comprising a glyceride copolymer. Applicants unexpectedly found that glyceride copolymers can serve as a surface softening agent without exhibiting the drawbacks mentioned above. While not being bound by theory, Applicants believe that the uncharged nature and/or the low degree of oligomerization of the glyceride copolymers result in the lack of the aforementioned drawbacks. Thus glyceride copolymers are salt and pH tolerant as well as easier to process and dispose of, yet have a softening capability that is at least as good as that of the best current surface softening agents. As a result, formulations comprising such glyceride copolymers can have wide pH ranges, and/or salt levels and still be stable. In addition, the salt and/or pH tolerance of such formulations allows a number of additional ingredients to be employed by the formulator, including ingredients that hitherto were not available to formulators.

In one example of the present invention, a fibrous structure comprising a surface softening composition comprising a glyceride copolymer, is provided.

In another example of the present invention, a fibrous structure comprising a surface softening composition comprising a glyceride copolymer and being substantially free of silicones and quaternary ammonium surface softening agents, is provided.

In even another example of the present invention, a fibrous structure comprising a surface softening composition comprising a methathesized unsaturated polyol ester and one or more other surface softening agents selected from the group consisting of: silicones, quaternary ammonium compounds, and mixtures thereof, is provided.

In still another example of the present invention, a fibrous structure comprising a surface softening composition comprising a glyceride copolymer and a lotion composition, are provided.

In yet another example of the present invention, a process for treating a surface of a fibrous structure, the process comprising the step of applying a surface softening composition comprising a glyceride copolymer to the surface of the fibrous structure, is provided.

In even yet another example of the present invention, a single- or multi-ply sanitary tissue product comprising a fibrous structure according to the present invention, is provided.

Accordingly, the present invention provides fibrous structures comprising a surface softening composition comprising a glyceride copolymer, sanitary tissue products comprising such fibrous structures, and processes for making such fibrous structures.

DETAILED DESCRIPTION OF THE INVENTION

Definitions

Figure 1:
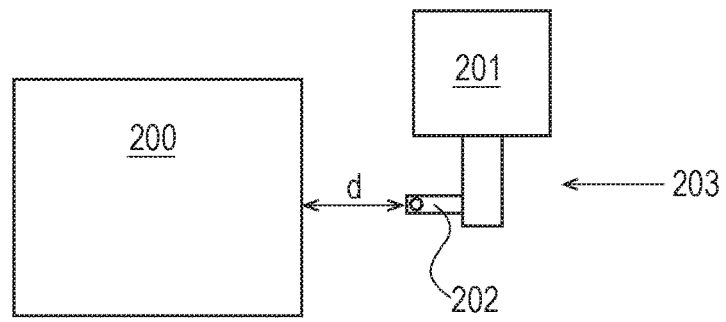
FIG. 1 is a schematic top view representation of a Slip Stick Coefficient of Friction Test Method set-up.

As used herein, "natural oil", "natural feedstocks," or "natural oil feedstocks" refers to oils obtained from plants or animal sources. The term "natural oil" includes natural oil derivatives, unless otherwise indicated. The terms also include modified plant or animal sources (e.g., genetically modified plant or animal sources), and derivatives produced or modified by fermentation or enzymatic processes, unless indicated otherwise. Examples of natural oils include, but are not limited to, vegetable oils, algae oils, fish oils, animal fats, tall oils, derivatives of these oils, combinations of any of these oils, and the like. Representative non-limiting examples of vegetable oils include low erucic acid rapeseed oil (canola oil), high erucic acid rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil.

The term "natural oil glyceride" refers to a glyceryl ester of a fatty acid obtained from a natural oil. Such glycerides include monoacylglycerides, diacylglycerides, and triacylglyceriedes (triglycerides). In some embodiments, the natural oil glycerides are triglycerides. Analogously, the term "unsaturated natural oil glyceride" refers to natural oil glycerides, wherein at least one of its fatty acid residues contains unsaturation. For example, a glyceride of oleic acid is an unsaturated natural oil glyceride. The term "unsaturated alkenylized natural oil glyceride" refers to an unsaturated natural oil glyceride (as defined above) that is derivatized via a metathesis reaction with a sort-chain olefin (as defined below). In some cases, olefinizing process shortens one or more of the fatty acid chains in the compound. For example, a glyceride of 9-decenoic acid is an unsaturated alkenylized natural oil glyceride. Similarly, butenylized (e.g., with 1-butene and/or 2-butene) canola oil is a natural oil glyceride that has been modified via metathesis to contain some short-chain unsaturated $C_{10-15}$ ester groups.

The term "natural oil derivatives" refers to derivatives thereof derived from natural oil. The methods used to form these natural oil derivatives may include one or more of addition, neutralization, overbasing, saponification, transesterification, interesterification, esterification, amidation, hydrogenation, isomerization, oxidation, alkylation, acylation, sulfurization, sulfonation, rearrangement, reduction, fermentation, pyrolysis, hydrolysis, liquefaction, anaerobic digestion, hydrothermal processing, gasification or a combination of two or more thereof. Examples of natural derivatives thereof may include carboxylic acids, gums, phospholipids, soapstock, acidulated soapstock, distillate or distillate sludge, fatty acids, fatty acid esters, as well as hydroxy substituted variations thereof, including unsaturated polyol esters. In some embodiments, the natural oil derivative may comprise an unsaturated carboxylic acid having from about 5 to about 30 carbon atoms, having one or more carbon-carbon double bonds in the hydrocarbon (alkene) chain. The natural oil derivative may also comprise an unsaturated fatty acid alkyl (e.g., methyl) ester derived from a glyceride of natural oil. For example, the natural oil derivative may be a fatty acid methyl ester ("FAME") derived from the glyceride of the natural oil. In some embodiments, a feedstock includes canola or soybean oil, as a non-limiting example, refined, bleached, and deodorized oil (i.e., RBD soybean oil).

As used herein, the term "unsaturated polyol ester" refers to a compound having two or more hydroxyl groups wherein at least one of the hydroxyl groups is in the form of an ester and wherein the ester has an organic group including at least one carbon-carbon double bond.

The term "oligomeric glyceride moiety" is a moiety comprising two or more, in one aspect, up to 20, in another aspect, up to 10 constitutional units formed via olefin metathesis from natural oil glycerides and/or alkenylized natural oil glycerides.

The term "free hydrocarbon" refers to any one or combination of unsaturated or saturated straight, branched, or cyclic hydrocarbons in the $C_{2-30}$ range.

The term "metathesis monomer" refers to a single entity that is the product of an olefin metathesis reaction which comprises a molecule of a compound with one or more carbon-carbon double bonds which has undergone an alkylidene unit interchange via one or more of the carbon-carbon double bonds either within the same molecule (intramolecular metathesis) and/or with a molecule of another compound containing one or more carbon-carbon double bonds such as an olefin (intermolecular metathesis). In some embodiments, the term refers to a triglyceride or other unsaturated polyol ester that has not yet undergone an alkylidene unit interchange but contains at least one $C_{4-17}$ ester having a carbon-carbon double bond in the "omega minus n" position, where n=0, 1, 2, 3, 4, 5, or 6 and where the ester moiety has at least n+3 carbon atoms.

The term "metathesis dimer" refers to the product of a metathesis reaction wherein two reactant compounds, which can be the same or different and each with one or more carbon-carbon double bonds, are bonded together via one or more of the carbon-carbon double bonds in each of the reactant compounds as a result of the metathesis reaction.

The term "metathesis trimer" refers to the product of one or more metathesis reactions wherein three molecules of two or more reactant compounds, which can be the same or different and each with one or more carbon-carbon double bonds, are bonded together via one or more of the carbon-carbon double bonds in each of the reactant compounds as a result of the one or more metathesis reactions, the trimer containing three bonded groups derived from the reactant compounds.

The term "metathesis tetramer" refers to the product of one or more metathesis reactions wherein four molecules of two or more reactant compounds, which can be the same or different and each with one or more carbon-carbon double bonds, are bonded together via one or more of the carbon-carbon double bonds in each of the reactant compounds as a result of the one or more metathesis reactions, the tetramer containing four bonded groups derived from the reactant compounds.

The term "metathesis pentamer" refers to the product of one or more metathesis reactions wherein five molecules of two or more reactant compounds, which can be the same or different and each with one or more carbon-carbon double bonds, are bonded together via one or more of the carbon-carbon double bonds in each of the reactant compounds as a result of the one or more metathesis reactions, the pentamer containing five bonded groups derived from the reactant compounds.

The term "metathesis hexamer" refers to the product of one or more metathesis reactions wherein six molecules of two or more reactant compounds, which can be the same or different and each with one or more carbon-carbon double bonds, are bonded together via one or more of the carbon-carbon double bonds in each of the reactant compounds as a result of the one or more metathesis reactions, the hexamer containing six bonded groups derived from the reactant compounds.

The term "metathesis heptamer" refers to the product of one or more metathesis reactions wherein seven molecules of two or more reactant compounds, which can be the same or different and each with one or more carbon-carbon double bonds, are bonded together via one or more of the carbon-carbon double bonds in each of the reactant compounds as a result of the one or more metathesis reactions, the heptamer containing seven bonded groups derived from the reactant compounds.

The term "metathesis octamer" refers to the product of one or more metathesis reactions wherein eight molecules of two or more reactant compounds, which can be the same or different and each with one or more carbon-carbon double bonds, are bonded together via one or more of the carbon-carbon double bonds in each of the reactant compounds as a result of the one or more metathesis reactions, the octamer containing eight bonded groups derived from the reactant compounds.

The term "metathesis nonamer" refers to the product of one or more metathesis reactions wherein nine molecules of two or more reactant compounds, which can be the same or different and each with one or more carbon-carbon double bonds, are bonded together via one or more of the carbon-carbon double bonds in each of the reactant compounds as a result of the one or more metathesis reactions, the nonamer containing nine bonded groups derived from the reactant compounds.

The term "metathesis decamer" refers to the product of one or more metathesis reactions wherein ten molecules of two or more reactant compounds, which can be the same or different and each with one or more carbon-carbon double bonds, are bonded together via one or more of the carbon-carbon double bonds in each of the reactant compounds as a result of the one or more metathesis reactions, the decamer containing ten bonded groups derived from the reactant compounds.

The term "metathesis oligomer" refers to the product of one or more metathesis reactions wherein two or more molecules (e.g., 2 to about 10, or 2 to about 4) of two or more reactant compounds, which can be the same or different and each with one or more carbon-carbon double bonds, are bonded together via one or more of the carbon-carbon double bonds in each of the reactant compounds as a result of the one or more metathesis reactions, the oligomer containing a few (e.g., 2 to about 10, or 2 to about 4) bonded groups derived from the reactant compounds. In some embodiments, the term "metathesis oligomer" may include metathesis reactions wherein greater than ten molecules of two or more reactant compounds, which can be the same or different and each with one or more carbon-carbon double bonds, are bonded together via one or more of the carbon-carbon double bonds in each of the reactant compounds as a result of the one or more metathesis reactions, the oligomer containing greater than ten bonded groups derived from the reactant compounds.

As used herein, "metathesis" refers to olefin metathesis. As used herein, "metathesis catalyst" includes any catalyst or catalyst system that catalyzes an olefin metathesis reaction.

As used herein, "metathesize" or "metathesizing" refer to the reacting of a feedstock in the presence of a metathesis catalyst to form a "metathesized product" comprising new olefinic compounds, i.e., "metathesized" compounds. Metathesizing is not limited to any particular type of olefin metathesis, and may refer to cross-metathesis (i.e., co-metathesis), self-metathesis, ring-opening metathesis, ring-opening metathesis polymerizations ("ROMP"), ring-closing metathesis ("RCM"), and acyclic diene metathesis ("ADMET"). In some embodiments, metathesizing refers to reacting two triglycerides present in a natural feedstock (self-metathesis) in the presence of a metathesis catalyst, wherein each triglyceride has an unsaturated carbon-carbon double bond, thereby forming a new mixture of olefins and esters which may include a triglyceride dimer. Such triglyceride dimers may have more than one olefinic bond, thus higher oligomers also may form. These higher order oligomers may comprise one or more of: metathesis monomers, metathesis dimers, metathesis trimers, metathesis tetramers, metathesis pentamers, and higher order metathesis oligomers (e.g., metathesis hexamers, metathesis, metathesis heptamers, metathesis octamers, metathesis nonamers, metathesis decamers, and higher than metathesis decamers and above). Additionally, in some other embodiments, metathesizing may refer to reacting an olefin, such as ethylene, and a triglyceride in a natural feedstock having at least one unsaturated carbon-carbon double bond, thereby forming new olefinic molecules as well as new ester molecules (cross-metathesis).

As used herein, "olefin" or "olefins" refer to compounds having at least one unsaturated carbon-carbon double bond. In certain embodiments, the term "olefins" refers to a group of unsaturated carbon-carbon double bond compounds with different carbon lengths. Unless noted otherwise, the terms "olefin" or "olefins" encompasses "polyunsaturated olefins" or "polyolefins," which have more than one carbon-carbon double bond. As used herein, the term "monounsaturated olefins" or "mono-olefins" refers to compounds having only one carbon-carbon double bond. A compound having a terminal carbon-carbon double bond can be referred to as a "terminal olefin" or an "alpha-olefin," while an olefin having a non-terminal carbon-carbon double bond can be referred to as an "internal olefin." In some embodiments, the alpha-olefin is a terminal alkene, which is an alkene (as defined below) having a terminal carbon-carbon double bond. Additional carbon-carbon double bonds can be present.

The number of carbon atoms in any group or compound can be represented by the terms: "$C_z$", which refers to a group of compound having z carbon atoms; and "$C_{x-y}$", which refers to a group or compound containing from x to y, inclusive, carbon atoms. For example, "$C_{1-6}$ alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. As a further example, a "$C_{4-10}$ alkene" refers to an alkene molecule having from 4 to 10 carbon atoms, and, for example, includes, but is not limited to, 1-butene, 2-butene, isobutene, 1-pentene, 1-hexene, 3-hexene, 1-heptene, 3-heptene, 1-octene, 4-octene, 1-nonene, 4-nonene, and 1-decene.

As used herein, the terms "short-chain alkene" or "short-chain olefin" refer to any one or combination of unsaturated straight, branched, or cyclic hydrocarbons in the $C_{2-14}$ range, or the $C_{2-12}$ range, or the $C_{2-10}$ range, or the $C_{2-8}$ range. Such olefins include alpha-olefins, wherein the unsaturated carbon-carbon bond is present at one end of the compound. Such olefins also include dienes or trienes. Such olefins also include internal olefins. Examples of short-chain alkenes in the $C_{2-6}$ range include, but are not limited to: ethylene, propylene, 1-butene, 2-butene, isobutene, 1-pentene, 2-pentene, 2-methyl-1-butene, 2-methyl-2-butene, 3-methyl-1-butene, cyclopentene, 1,4-pentadiene, 1-hexene, 2-hexene, 3-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. Non-limiting examples of short-chain alkenes in the $C_{7-9}$ range include 1,4-heptadiene, 1-heptene, 3,6-nonadiene, 3-nonene, 1,4,7-octatriene. In certain embodiments, it is preferable to use a mixture of olefins, the mixture comprising linear and branched low-molecular-weight olefins in the $C_{4-10}$ range. In some embodiments, it may be preferable to use a mixture of linear and branched $C_4$ olefins (i.e., combinations of: 1-butene, 2-butene, and/or isobutene). In other embodiments, a higher range of $C_{11-14}$ may be used.

As used herein, "alkyl" refers to a straight or branched chain saturated hydrocarbon having 1 to 30 carbon atoms, which may be optionally substituted, as herein further described, with multiple degrees of substitution being allowed. Examples of "alkyl," as used herein, include, but are not limited to, methyl, ethyl, n-propyl, isopropyl, isobutyl, n-butyl, sec-butyl, tert-butyl, isopentyl, n-pentyl, neopentyl, n-hexyl, and 2-ethylhexyl. The number of carbon atoms in an alkyl group is represented by the phrase "$C_{x-y}$ alkyl," which refers to an alkyl group, as herein defined, containing from x to y, inclusive, carbon atoms. Thus, "$C_{1-6}$ alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. In some instances, the "alkyl" group can be divalent, in which case the group can alternatively be referred to as an "alkylene" group.

As used herein, "alkenyl" refers to a straight or branched chain non-aromatic hydrocarbon having 2 to 30 carbon atoms and having one or more carbon-carbon double bonds, which may be optionally substituted, as herein further described, with multiple degrees of substitution being allowed. Examples of "alkenyl," as used herein, include, but are not limited to, ethenyl, 2-propenyl, 2-butenyl, and 3-butenyl. The number of carbon atoms in an alkenyl group is represented by the phrase "$C_{x-y}$ alkenyl," which refers to an alkenyl group, as herein defined, containing from x to y, inclusive, carbon atoms. Thus, "$C_{2-6}$ alkenyl" represents an alkenyl chain having from 2 to 6 carbon atoms and, for example, includes, but is not limited to, ethenyl, 2-propenyl, 2-butenyl, and 3-butenyl. In some instances, the "alkenyl" group can be divalent, in which case the group can alternatively be referred to as an "alkenylene" group.

As used herein, "direct bond" refers to an embodiment where the identified moiety is absent from the structure, and is replaced by a bond between other moieties to which it is connected. For example, if the specification or claims recite A-D-E and D is defined as a direct bond, the resulting structure is A-E.

As used herein, "substituted" refers to substitution of one or more hydrogen atoms of the designated moiety with the named substituent or substituents, multiple degrees of substitution being allowed unless otherwise stated, provided that the substitution results in a stable or chemically feasible compound. A stable compound or chemically feasible compound is one in which the chemical structure is not substantially altered when kept at a temperature from about −80° C. to about +40° C., in the absence of moisture or other chemically reactive conditions, for at least a week. As used herein, the phrases "substituted with one or more . . . " or "substituted one or more times . . . " refer to a number of substituents that equals from one to the maximum number of substituents possible based on the number of available bonding sites, provided that the above conditions of stability and chemical feasibility are met.

In some instances herein, organic compounds are described using the "line structure" methodology, where chemical bonds are indicated by a line, where the carbon atoms are not expressly labeled, and where the hydrogen atoms covalently bound to carbon (or the C—H bonds) are not shown at all. For example, by that convention, the formula  represents n-propane. In some instances herein, a squiggly bond is used to show the compound can have any one of two or more isomers. For example, the structure  can refer to (E)-2-butene or (Z)-2-butene. The same is true when olefinic structures are drawn that are ambiguous as to which isomer is referred to. For example, $CH_3$—CH═CH—$CH_3$ can refer to (E)-2-butene or (Z)-2-butene.

As used herein, the various functional groups represented will be understood to have a point of attachment at the functional group having the hyphen or dash (—) or an asterisk (*). In other words, in the case of —$CH_2CH_2CH_3$, it will be understood that the point of attachment is the $CH_2$ group at the far left. If a group is recited without an asterisk or a dash, then the attachment point is indicated by the plain and ordinary meaning of the recited group.

As used herein, multi-atom bivalent species are to be read from left to right. For example, if the specification or claims recite A-D-E and D is defined as —OC(O)—, the resulting group with D replaced is: A-OC(O)-E and not A-C(O)O-E.

"Fiber" as used herein means an elongate particulate having an apparent length greatly exceeding its apparent diameter, i.e. a length to diameter ratio of at least about 10. Fibers having a non-circular cross-section are common; the "diameter" in this case may be considered to be the diameter of a circle having cross-sectional area equal to the cross-sectional area of the fiber. More specifically, as used herein, "fiber" refers to papermaking fibers. The present invention contemplates the use of a variety of papermaking fibers, such as, for example, natural fibers or synthetic fibers, or any other suitable fibers, and any combination thereof.

Natural papermaking fibers useful in the present invention include animal fibers, mineral fibers, plant fibers and mixtures thereof. Animal fibers may, for example, be selected from the group consisting of: wool, silk and mixtures thereof. Plant fibers may, for example, be derived from a plant selected from the group consisting of: wood, cotton, cotton linters, flax, sisal, abaca, hemp, hesperaloe, jute, bamboo, bagasse, kudzu, corn, sorghum, gourd, agave, loofah, and mixtures thereof. In one example the fibers comprise trichomes, such as trichomes obtained from *Stachys bzyantina*, for example trichomes from a Lamb's Ear plant.

Wood fibers; often referred to as wood pulps include chemical pulps, such as kraft (sulfate) and sulfite pulps, as well as mechanical and semi-chemical pulps including, for example, groundwood, thermomechanical pulp, chemi-mechanical pulp (CMP), chemi-thermomechanical pulp (CTMP), neutral semi-chemical sulfite pulp (NSCS). Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified and/or layered fibrous structure. U.S. Pat. Nos. 4,300,981 and 3,994,771 are incorporated herein by reference for the purpose of disclosing layering of hardwood and softwood fibers. Also applicable to the present invention are fibers derived from recycled paper, which may contain any or all of the above categories as well as other non-fibrous materials such as fillers and adhesives used to facilitate the original papermaking.

The wood pulp fibers may be short (typical of hardwood fibers) or long (typical of softwood fibers). Non-limiting examples of short fibers include fibers derived from a fiber source selected from the group consisting of Acacia, Eucalyptus, Maple, Oak, Aspen, Birch, Cottonwood, Alder, Ash, Cherry, Elm, Hickory, Poplar, Gum, Walnut, Locust, Sycamore, Beech, Catalpa, Sassafras, Gmelina, Albizia, Anthocephalus, and Magnolia. Non-limiting examples of long fibers include fibers derived from Pine, Spruce, Fir, Tamarack, Hemlock, Cypress, and Cedar. Softwood fibers derived from the kraft process and originating from more-northern climates may be preferred. These are often referred to as northern softwood kraft (NSK) pulps.

Synthetic fibers may be selected from the group consisting of: wet spun fibers, dry spun fibers, melt spun (including melt blown) fibers, synthetic pulp fibers and mixtures thereof. Synthetic fibers may, for example, be comprised of cellulose (often referred to as "rayon"); cellulose derivatives such as esters, ether, or nitrous derivatives; polyolefins (including polyethylene and polypropylene); polyesters (including polyethylene terephthalate); polyamides (often referred to as "nylon"); acrylics; non-cellulosic polymeric carbohydrates (such as starch, chitin and chitin derivatives such as chitosan); and mixtures thereof.

"Fibrous structure" as used herein means a structure that comprises one or more fibers. Non-limiting examples of processes for making fibrous structures include known wet-laid papermaking processes and air-laid papermaking processes. Such processes typically include steps of preparing a fiber composition, oftentimes referred to as a fiber slurry in wet-laid processes, either wet or dry, and then depositing a plurality of fibers onto a forming wire or belt such that an embryonic fibrous structure is formed, drying and/or bonding the fibers together such that a fibrous structure is formed, and/or further processing the fibrous structure such that a finished fibrous structure is formed. For example, in typical papermaking processes, the finished fibrous structure is the fibrous structure that is wound on the reel at the end of papermaking, but before converting thereof into a sanitary tissue product.

Non-limiting types of fibrous structures according to the present invention include conventionally felt-pressed fibrous structures; pattern densified fibrous structures; and high-bulk, uncompacted fibrous structures. The fibrous structures may be of a homogeneous or multilayered ("layered" meaning two or three or more layers) construction; and the sanitary tissue products made therefrom may be of a single-ply or multi-ply construction.

The fibrous structures may be post-processed, such as by embossing and/or calendaring and/or folding and/or printing images thereon.

The fibrous structures may be through-air-dried fibrous structures or conventionally dried fibrous structures.

The fibrous structures may be creped or uncreped. In one example, the fibrous structures may be belt-creped and/or fabric creped.

"Sanitary tissue product" comprises one or more fibrous structures, converted or not, that is useful as a wiping implement for post-urinary and post-bowel movement cleaning (toilet tissue), for otorhinolaryngological discharges (facial tissue and/or disposable handkerchiefs), and multi-functional absorbent and cleaning uses (absorbent towels and/or wipes). In one example, a lotion composition-containing multi-ply disposable handkerchief having a caliper of from about 0.1 mm to about 0.4 mm in accordance with the present invention is provided.

"Ply" or "Plies" as used herein means an individual finished fibrous structure optionally to be disposed in a substantially contiguous, face-to-face relationship with other plies, forming a multiple ply finished fibrous structure product and/or sanitary tissue product. It is also contemplated that a single fibrous structure can effectively form two "plies" or multiple "plies", for example, by being folded on itself.

"Surface of a fibrous structure" as used herein means that portion of the fibrous structure that is exposed to the external environment. In other words, the surface of a fibrous structure is that portion of the fibrous structure that is not completely surrounded by other portions of the fibrous structure.

"User Contacting Surface" as used herein means that portion of the fibrous structure and/or surface softening composition and/or lotion composition present directly and/or indirectly on the surface of the fibrous structure that is exposed to the external environment. In other words, it is that surface formed by the fibrous structure including any surface softening composition and/or lotion composition present directly and/or indirectly on the surface of the fibrous structure that contacts an opposing surface when used by a user. For example, it is that surface formed by the fibrous structure including any surface softening composition and/or lotion composition present directly and/or indirectly on the surface of the fibrous structure that contacts a user's skin when a user wipes his/her skin with the fibrous structure of the present invention.

In one example, the user contacting surface, especially for a textured and/or structured fibrous structure, such as a through-air-dried fibrous structure and/or an embossed fibrous structure, may comprise raised areas and recessed areas of the fibrous structure. In the case of a through-air-dried, pattern densified fibrous structure the raised areas may be knuckles and the recessed areas may be pillows and vice versa. Accordingly, the knuckles may, directly and/or indirectly, comprise the surface softening composition and lotion composition and the pillows may be void of the surface softening composition and the lotion composition and vice versa so that when a user contacts the user's skin with the fibrous structure, only the lotion composition contacts the user's skin. A similar case is true for embossed fibrous structures where the embossed areas may, directly and/or indirectly, comprise the surface softening composition and the lotion composition and the non-embossed areas may be void of the surface softening composition and the lotion composition and vice versa.

The user contacting surface may be present on the fibrous structure and/or sanitary tissue product before use by the user and/or the user contacting surface may be created/formed prior to and/or during use of the fibrous structure and/or sanitary tissue product by the user, such as upon the user applying pressure to the fibrous structure and/or sanitary tissue product as the user contacts the user's skin with the fibrous structure and/or sanitary tissue product.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Fibrous Structure

The fibrous structure according to the present invention comprises a surface comprising a surface softening composition comprising a surface softening agent comprising a glyceride copolymer.

In another example, the surface of the fibrous structure may comprise a layer of a surface softening composition according to the present invention and a layer a different surface softening composition and/or a lotion composition. The layers of the surface softening compositions and/or lotion composition may be phase registered with one another. In another example, the different surface softening compositions and/or lotion composition may cover different regions of the surface of the fibrous structure, for example they may be in a striped configuration.

In still another example, the surface softening composition of the present invention may cover about 100% and/or greater than 98% and/or greater than 95% and/or greater than 90% of the surface area of the surface of the fibrous structure.

The surface softening composition and/or lotion composition may be applied to a surface of the fibrous structure by any suitable means known in the art. Any contact or contact-free application suitable for applying the surface softening composition, such as spraying, dipping, padding, printing, slot extruding, such as in rows or patterns, rotogravure printing, flexographic printing, offset printing, screen printing, mask or stencil application process and mixtures thereof can be used to apply the surface softening composition and/or lotion composition to the surface of the fibrous structure and/or sanitary tissue product. Surface softening compositions can be applied to the fibrous structure and/or sanitary tissue product before, concurrently, or after the lotion composition application to the fibrous structure and/or sanitary tissue product.

In one example, the surface softening composition and/or the lotion composition is applied to the surface of the fibrous structure during the fibrous structure making process, such as before and/or after drying the fibrous structure.

In another example, the surface softening composition and/or the lotion composition is applied to the surface of the fibrous structure during the converting process.

In yet another example, the surface softening composition is applied to the surface of a fibrous structure prior to application of the lotion composition.

The surface softening composition can be applied during papermaking and/or converting, especially if applied to the outside layer of a layered fibrous structure and/or sanitary tissue product comprising such layered fibrous structure.

The surface softening composition and lotion composition can be applied by separate devices or by a single device that has two or more chambers capable of separately delivering the different compositions, especially incompatible, different compositions, such as the surface softening composition and the lotion composition.

The application devices may be sequentially arranged along the papermaking (fibrous structure making) and/or converting process.

The fibrous structures of the present invention may exhibit Slip Stick Coefficients of Friction of less than 360 and/or less than 355 and/or less than 350 and/or less than 325 and/or less than 300 and/or less than 285 (COF*10000) as measured according to the Slip Stick Coefficient of Friction Test Method described herein.

The fibrous structures of the present invention may exhibit average TS7 Softness Values of less than 9 and/or less than 8.5 and/or less than 8 and/or less than 7.5 as measured according to the Softness Test Method described herein.

Surface Softening Composition

A surface softening composition, for purposes of the present invention, is a composition that improves the tactile sensation of a surface of a fibrous structure perceived by a user whom holds a fibrous structure and/or sanitary tissue product comprising the fibrous structure and rubs it across the user's skin. Such tactile perceivable softness can be characterized by, but is not limited to, friction, flexibility, and smoothness, as well as subjective descriptors, such as a feeling like lubricious, velvet, silk or flannel.

The surface softening composition may or may not be transferable. Typically, it is substantially non-transferable.

The surface softening composition may increase or decrease the surface friction of the surface of the fibrous structure, especially the user contacting surface of the fibrous structure. Typically, the surface softening composition will reduce the surface friction of the surface of the fibrous structure compared to a surface of the fibrous structure without such surface softening composition.

The surface softening composition comprises a surface softening agent. The surface softening composition during application to the fibrous structure may comprise at least about 0.1% and/or at least 0.5% and/or at least about 1% and/or at least about 3% and/or at least about 5% to 100% and/or to about 98% and/or to about 95% and/or to about 90% and/or to about 80% and/or to about 70% and/or to about 50% and/or to about 40% by weight of the surface softening agent. In one example, the surface softening composition comprises from about 5% to about 40% by weight of the surface softening agent. In one example, the surface softening composition comprises a glyceride copolymer as a surface softening agent.

The surface softening composition present on the fibrous structure and/or sanitary tissue product comprising the fibrous structure of the present invention may comprise at least about 0.01% and/or at least about 0.05% and/or at least about 0.1% of total basis weight of the surface softening agent, for example a glyceride copolymer. In one example, the fibrous structure and/or sanitary tissue product may comprise from about 0.01% to about 20% and/or from about 0.05% to about 15% and/or from about 0.1% to about 10% and/or from about 0.01% to about 5% and/or from about 0.1% to about 2% of total basis weight of the surface softening composition.

In one example, the surface softening composition may be present on and/or in the fibrous structure at a level of at least 1#/ton and/or at least 5#/ton and/or at least 10#/ton and/or at least 15#/ton.

Surface Softening Agents

In one example, the surface softening agent is selected from the group consisting of:

(i), a first glyceride copolymer, comprising, based on total weight of first glyceride copolymer, from about 3% to about 30%, from about 3% to about 25%, or from about 5% to about 20% $C_{10-14}$ unsaturated fatty acid esters; in one aspect, said first glyceride copolymer comprises, based on total weight of first glyceride copolymer, from about 3% to about 30%, from about 3% to about 25%, or from about 3% to about 20% $C_{10-13}$ unsaturated fatty acid esters; in one aspect said first glyceride copolymer comprises, based on total weight of first glyceride copolymer, from about 0.1% to about 30%, from about 0.1% to about 25%, from about 0.2% to about 20%, or from about 0.5% to about 15% $C_{10-11}$ unsaturated fatty acid esters; and (ii) optionally, but desirably, a second glyceride copolymer having formula (I):

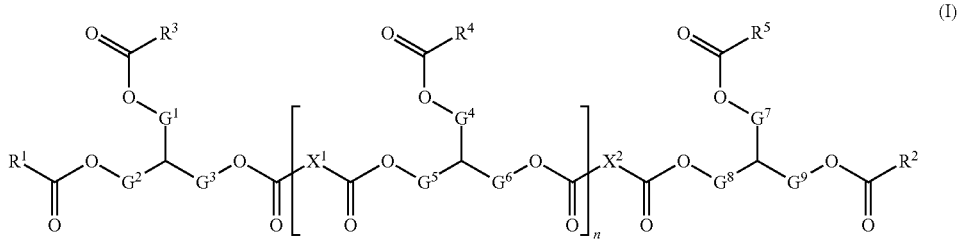

(I)

wherein:
- each $R^1$, $R^2$, $R^3$, $R^4$, and $R^5$ in second glyceride copolymer is independently selected from the group consisting of an oligomeric glyceride moiety, a $C_{1-24}$ alkyl, a substituted $C_{1-24}$ alkyl wherein the substituent is one or more —OH moieties, a $C_{2-24}$ alkenyl, or a substituted $C_{2-24}$ alkenyl wherein the substituent is one or more —OH moieties; and/or wherein each of the following combinations of moieties may each independently be covalently linked:
  - $R^1$ and $R^3$,
  - $R^2$ and $R^5$,
  - $R^1$ and an adjacent $R^4$,
  - $R^2$ and an adjacent $R^4$,
  - $R^3$ and an adjacent $R^4$,
  - $R^5$ and an adjacent $R^4$, or
  - any two adjacent $R^4$
  such that the covalently linked moieties form an alkenylene moiety;
- each $X^1$ and $X^2$ in said second glyceride copolymer is independently selected from the group consisting of a $C_{1-32}$ alkylene, a substituted $C_{1-32}$ alkylene wherein the substituent is one or more —OH moieties, a $C_{2-32}$ alkenylene or a substituted $C_{2-32}$ alkenylene wherein the substituent is one or more —OH moieties;
- two of $G^1$, $G^2$, and $G^3$ are —$CH_2$—, and one of $G^1$, $G^2$, and $G^3$ is a direct bond;
- for each individual repeat unit in the repeat unit having index n, two of $G^4$, $G^5$, and $G^6$ are —$CH_2$—, and one of $G^4$, $G^5$, and $G^6$ is a direct bond, and the values $G^4$, $G^5$, and $G^6$ for each individual repeat unit are independently selected from the values of $G^4$, $G^5$, and $G^6$ in other repeating units;
- two of $G^7$, $G^8$, and $G^9$ are —$CH_2$—, and one of $G^7$, $G^8$, and $G^9$ is a direct bond;
- n is an integer from 3 to 250;
- with the proviso for each of said second glyceride copolymers at least one of $R^1$, $R^2$, $R^3$, and $R^5$, and/or at least one $R^4$ in one individual repeat unit of said repeat unit having index n, is selected from the group consisting of: 8-nonenyl; 8-decenyl; 8-undecenyl; 8-dodecenyl; 8,11-dodecadienyl; 8,11-tridecadienyl; 8,11-tetradecadienyl; 8,11-pentadecadienyl; 8,11,14-pentadecatrienyl; 8,11,14-hexadecatrienyl; 8,11,14-octadecatrienyl; 9-methyl-8-decenyl; 9-methyl-8-undecenyl; 10-methyl-8-undecenyl; 12-methyl-8,11-tridecadienyl; 12-methyl-8,11-tetradecadienyl; 13-methyl-8,11-tetradecadienyl; 15-methyl-8,11,14-hexadecatrienyl; 15-methyl-8,11,14-heptadecatrienyl; 16-methyl-8,11,14-heptadecatrienyl; 12-tridecenyl; 12-tetradecenyl; 12-pentadecenyl; 12-hexadecenyl; 13-methyl-12-tetradecenyl; 13-methyl-12-pentadecenyl; and 14-methyl-12-pentadecenyl; in one aspect, said second glyceride copolymer comprises based on total weight of second glyceride copolymer, from about 3% to about 30%, from about 3% to about 25%, or from about 5% to about 20% $C_{9-13}$ alkenyl moieties; in one aspect, said second glyceride copolymer comprises, based on total weight of second glyceride copolymer, from about 3% to about 30%, from about 3% to about 25%, or from about 3% to about 20% $C_{9-12}$ alkenyl moieties; in one aspect, said second glyceride copolymer comprises, based on total weight of second glyceride copolymer, from about 0.1% to about 30%, from about 0.1% to about 25%, from about 0.2% to about 20%, or from about 0.5% to about 15% $C_{9-10}$ alkenyl moieties; and
- (iii) optionally, a third glyceride copolymer, which comprises constitutional units formed from reacting, in the presence of a metathesis catalyst, one or more compounds from each of the compounds having the following formulas:

Formula (IIa):

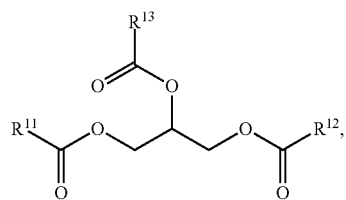

(IIa)

Formula (IIb):

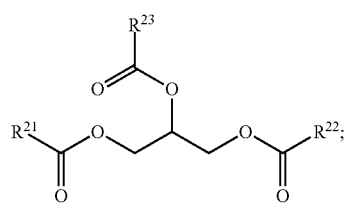

(IIb)

wherein,
- each $R^{11}$, $R^{12}$ and $R^{13}$ is independently a $C_{1-24}$ alkyl, a substituted $C_{1-24}$ alkyl wherein the substituent is one or more —OH moieties, a $C_{2-24}$ alkenyl, or a substituted $C_{2-24}$ alkenyl wherein the substituent is one or more —OH moieties with the proviso that at least one of $R^{11}$, $R^{12}$, and $R^{13}$ is a $C_{2-24}$ alkenyl or a substituted $C_{2-24}$ alkenyl wherein the substituent is one or more —OH moieties; and
- each $R^{21}$, $R^{22}$, and $R^{23}$ is independently a $C_{1-24}$ alkyl, a substituted $C_{1-24}$ alkyl wherein the substituent is one or more —OH moieties, a $C_{2-24}$ alkenyl, or a substituted $C_{2-24}$ alkenyl wherein the substituent is one or more —OH moieties, with the proviso that at least one of $R^{21}$, $R^{22}$, and $R^{23}$ is 8-nonenyl; 8-decenyl; 8-undecenyl; 8-dodecenyl; 8,11-dodecadienyl; 8,11-tridecadienyl; 8,11-tetradecadienyl; 8,11-pentadecadienyl; 8,11,14-pentadecatrienyl; 8,11,14-hexadecatrienyl; 8,11,14-octadecatrienyl; 9-methyl-8-decenyl; 9-methyl-8-undecenyl; 10-methyl-8-undecenyl; 12-methyl-8,11-tridecadienyl; 12-methyl-8,11-tetradecadienyl; 13-methyl-8,11-tetradecadienyl; 15-methyl-8,11,14-hexadecatrienyl; 15-methyl-8,11,14-heptadecatrienyl; 16-methyl-8,11,14-heptadecatrienyl; 12-tridecenyl; 12-tetradecenyl; 12-pentadecenyl; 12-hexadecenyl; 13-methyl-12-tetradecenyl; 13-methyl-12-pentadecenyl; and 14-methyl-12-pentadecenyl; wherein the number ratio of constitutional units formed from monomer compounds of formula (IIa) to constitutional units formed from monomer compounds of formula (IIb) is no more than 10:1; and (iv) mixtures thereof.

In addition to any or all of the above or alternatively, the first, second, and third glyceride copolymers may, separately and independently, exhibit a weight average molecular weight of from about 4,000 g/mol to about 150,000 g/mol, from about 5,000 g/mol to about 130,000 g/mol, from about 6,000 g/mol to about 100,000 g/mol, from about 7,000 g/mol to about 50,000 g/mol, from about 8,000 g/mol to about 30,000 g/mol, or from about 8,000 g/mol to about 20,000 g/mol.

In addition to any or all of the above or alternatively, the first, second, and third glyceride copolymers may be produced by a process comprising metathesis; in one aspect, said process comprises reacting two or more monomers in the presence of the metathesis catalyst as part of a reaction mixture, wherein the weight-to-weight ratio of the monomer compounds of formula (IIa) to the monomer compounds of formula (IIb) in the reaction mixture is no more than 10:1, no more than 9:1, no more than 8:1, no more than 7:1, no more than 6:1, no more than 5:1, no more than 4:1, no more than 3:1, no more than 2:1, or no more than 1:1; in one aspect, the metathesis catalyst is an organo-ruthenium compound, an organo-osmium compound, an organo-tungsten compound, or an organo-molybdenum compound.

In addition to any or all of the above or alternatively, the second glyceride copolymer may be such that at least one of $R^1$, $R^2$, $R^3$, $R^4$, or $R^5$ is a $C_{9-13}$ alkenyl, in one aspect, at least one of $R^1$, $R^2$, $R^3$, $R^4$, or $R^5$ is a $C_{9-12}$ alkenyl, in another aspect, at least one of $R^1$, $R^2$, $R^3$, $R^4$, or $R^5$ is a $C_{9-10}$ alkenyl.

In addition to any or all of the above or alternatively, the third glyceride copolymer may be such that at least one of $R^{11}$, $R^{12}$, $R^{13}$, $R^{21}$, $R^{22}$, or $R^{23}$ is a $C_{9-13}$ alkenyl, in one aspect, at least one of $R^{11}$, $R^{12}$, $R^{13}$, $R^{21}$, $R^{22}$, or $R^{23}$ is a $C_{9-12}$ alkenyl, in another aspect, at least one of $R^{11}$, $R^{12}$, $R^{13}$, $R^{21}$, $R^{22}$, or $R^{23}$ is a $C_{9-10}$ alkenyl.

In addition to any or all of the above or alternatively, the second glyceride copolymer may be such that the second glyceride copolymer's $G^1$ and $G^2$ moieties are —$CH_2$— and $G^3$ is a direct bond.

In addition to any or all of the above or alternatively, the second glyceride copolymer may be such that the second glyceride copolymer's $G^1$ and $G^3$ moieties are —$CH_2$— and $G^2$ is a direct bond.

In addition to any or all of the above or alternatively, the second glyceride copolymer may be such that the second glyceride copolymer's $G^2$ and $G^3$ moieties are —$CH_2$— and $G^1$ is a direct bond.

In addition to any or all of the above or alternatively, the second glyceride copolymer may be such that at least one of, $G^4$ and $G^5$ are —$CH_2$— and $G^6$ is a direct bond.

In addition to any or all of the above or alternatively, the second glyceride copolymer may be such that at least one of, $G^4$ and $G^6$ are —$CH_2$— and $G^5$ is a direct bond.

In addition to any or all of the above or alternatively, the second glyceride copolymer, at least one of, $G^5$ and $G^6$ are —$CH_2$— and $G^4$ is a direct bond.

In addition to any or all of the above or alternatively, the second glyceride copolymer may be such that at least one of, $G^7$ and $G^8$ are —$CH_2$— and $G^9$ is a direct bond.

In addition to any or all of the above or alternatively, the second glyceride copolymer may be such that at least one of $G^7$ and $G^9$ are —$CH_2$— and $G^8$ is a direct bond.

In addition to any or all of the above or alternatively, the second glyceride copolymer may be such that at least one of $G^8$ and $G^9$ are —$CH_2$— and $G^7$ is a direct bond.

In addition to any or all of the above or alternatively, the second glyceride copolymer may be such that each $X^1$ is independently selected from the group consisting of —$(CH_2)_{16}$—, —$(CH_2)_{18}$—, —$(CH_2)_{19}$—, —$(CH_2)_{20}$—, —$(CH_2)_{22}$—, —$(CH_2)_{24}$—, —$(CH_2)_{25}$—, —$(CH_2)_{28}$—, —$(CH_2)_7$—CH=CH—$(CH_2)_7$—, —$(CH_2)_7$—CH=CH—$CH_2$—CH=CH—$(CH_2)_7$—, —$(CH_2)_7$—CH=CH—$CH_2$—CH=CH—$CH_2$—CH=CH—$(CH_2)_7$—, —$(CH_2)_7$—CH=CH—$CH_2$—CH=CH—$CH_2$—CH=CH—$CH_2$—CH=CH—$(CH_2)_7$—, —$(CH_2)_7$—CH=CH—$CH_2$—CH=CH—$CH_2$—CH=CH—$CH_2$—CH=CH—$(CH_2)_7$—, —$(CH_2)_{11}$—CH=CH—$(CH_2)_{11}$—, —$(CH_2)_7$—CH=CH—$CH_2$—CH=CH—$(CH_2)_{11}$—, —$(CH_2)_{11}$—CH=CH—$CH_2$—CH=CH—$(CH_2)_7$—, —$(CH_2)_7$—CH=CH—$CH_2$—CH=CH—$(CH_2)_{11}$—, —$(CH_2)_{11}$—CH=CH—$CH_2$—CH=CH—$CH_2$—CH=CH—$(CH_2)_7$—, —$(CH_2)_9$—CH=CH—$(CH_2)_7$, —$(CH_2)_7$—CH=CH—$(CH_2)_9$, —$(CH_2)_{11}$—CH=CH—$(CH_2)_7$—, or —$(CH_2)_7$—CH=CH—$(CH_2)_{11}$—.

In addition to any or all of the above or alternatively, the second glyceride copolymer may be such that each $X^2$ is independently selected from the group consisting of —$(CH_2)_{16}$—, —$(CH_2)_{18}$—, —$(CH_2)_{19}$—, —$(CH_2)_{20}$—, —$(CH_2)_{22}$—, —$(CH_2)_{24}$—, —$(CH_2)_{25}$—, —$(CH_2)_{28}$—, —$(CH_2)_7$—CH=CH—$(CH_2)_7$—, —$(CH_2)_7$—CH=CH—$CH_2$—CH=CH—$(CH_2)_7$—, —$(CH_2)_7$—CH=CH—$CH_2$—CH=CH—$CH_2$—CH=CH—$(CH_2)_7$—, —$(CH_2)_7$—CH=CH—$CH_2$—CH=CH—$CH_2$—CH=CH—$CH_2$—CH=CH—$(CH_2)_7$—, —$(CH_2)_7$—CH=CH—$CH_2$—CH=CH—$CH_2$—CH=CH—$CH_2$—CH=CH—$(CH_2)_7$—, —$(CH_2)_{11}$—CH=CH—$(CH_2)_{11}$—, —$(CH_2)_7$—CH=CH—$CH_2$—CH=CH—$(CH_2)_{11}$—, —$(CH_2)_{11}$—CH=CH—$CH_2$—CH=CH—$(CH_2)_7$—, —$(CH_2)_7$—CH=CH—$CH_2$—CH=CH—$(CH_2)_{11}$—, —$(CH_2)_{11}$—CH=CH—$CH_2$—CH=CH—$CH_2$—CH=CH—$(CH_2)_7$—, —$(CH_2)_9$—CH=CH—$(CH_2)_7$, —$(CH_2)_7$—CH=CH—$(CH_2)_9$, —$(CH_2)_{11}$—CH=CH—$(CH_2)_7$—, or —$(CH_2)_7$—CH=CH—$(CH_2)_{11}$—.

In addition to any or all of the above or alternatively, the second glyceride copolymer may be such that $R^1$ is a $C_{1-24}$ alkyl or a $C_{2-24}$ alkenyl; in one aspect, $R^1$ is selected from the group consisting of: 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-octadecatrienyl, 9-methyl-8-decenyl, 9-methyl-8-undecenyl, 10-methyl-8-undecenyl, 12-methyl-8,11-tridecadienyl, 12-methyl-8,11- tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 12-tridecenyl, 12-tetradecenyl, 12-pentadecenyl, 12-hexadecenyl, 13-methyl-12-tetradecenyl, 13-methyl-12-pentadecenyl, and 14-methyl-12-pentadecenyl, in another aspect, $R^1$ is selected from the group consisting of 8-nonenyl, 8-decenyl, 8-undecenyl, 8,11-dodecadienyl, 8,11-tridecadienyl, 8,11-tetradecadienyl, 8,11,14-pentadecatrienyl, 8,11,14-hexadecatrienyl, 12-tridecenyl, 12-tetradecenyl, and 12-pentadecenyl.

In addition to any or all of the above or alternatively, the second glyceride copolymer may be such that $R^2$ is a $C_{1-24}$ alkyl or a $C_{2-24}$ alkenyl; in one aspect, $R^2$ is selected from the group consisting of: 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-octadecatrienyl, 9-methyl-8-decenyl, 9-methyl-8-undecenyl, 10-methyl-8-undecenyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 12-tridecenyl, 12-tetradecenyl, 12-pentadecenyl, 12-hexadecenyl, 13-methyl-12-tetradecenyl, 13-methyl-12-pentadecenyl, and 14-methyl-12-pentadecenyl; in another aspect, $R^2$ is selected from the group consisting of 8-nonenyl, 8-decenyl, 8-undecenyl, 8,11-dodecadienyl, 8,11-tridecadienyl, 8,11-tetradecadienyl, 8,11,14-pentadecatrienyl, 8,11,14-hexadecatrienyl, 12-tridecenyl, 12-tetradecenyl, and 12-pentadecenyl.

In addition to any or all of the above or alternatively, the second glyceride copolymer may be such that $R^3$ is a $C_{1-24}$ alkyl or a $C_{2-24}$ alkenyl; in one aspect, $R^3$ is selected from the group consisting of: 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-octadecatrienyl, 9-methyl-8-decenyl, 9-methyl-8-undecenyl, 10-methyl-8-undecenyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 12-tridecenyl, 12-tetradecenyl, 12-pentadecenyl, 12-hexadecenyl, 13-methyl-12-tetradecenyl, 13-methyl-12-pentadecenyl, and 14-methyl-12-pentadecenyl; in another aspect, $R^3$ is selected from the group consisting of 8-nonenyl, 8-decenyl, 8-undecenyl, 8,11-dodecadienyl, 8,11-tridecadienyl, 8,11-tetradecadienyl, 8,11,14-pentadecatrienyl, 8,11,14-hexadecatrienyl, 12-tridecenyl, 12-tetradecenyl, and 12-pentadecenyl.

In addition to any or all of the above or alternatively, the second glyceride copolymer, each $R^4$ is independently selected from a $C_{1-24}$ alkyl and a $C_{2-24}$ alkenyl; in one aspect, each $R^4$ is independently selected from the group consisting of: 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-octadecatrienyl, 9-methyl-8-decenyl, 9-methyl-8-undecenyl, 10-methyl-8-undecenyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 12-tridecenyl, 12-tetradecenyl, 12-pentadecenyl, 12-hexadecenyl, 13-methyl-12-tetradecenyl, 13-methyl-12-pentadecenyl, and 14-methyl-12-pentadecenyl; in another aspect, each $R^4$ is independently selected from the group consisting of 8-nonenyl, 8-decenyl, 8-undecenyl, 8,11-dodecadienyl, 8,11-tridecadienyl, 8,11-tetradecadienyl, 8,11,14-pentadecatrienyl, 8,11,14-hexadecatrienyl, 12-tridecenyl, 12-tetradecenyl, and 12-pentadecenyl.

In addition to any or all of the above or alternatively, the second glyceride copolymer may be such that $R^5$ is a $C_{1-24}$ alkyl or a $C_{2-24}$ alkenyl; in one aspect, $R^5$ is selected from the group consisting of: 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-octadecatrienyl, 9-methyl-8-decenyl, 9-methyl-8-undecenyl, 10-methyl-8-undecenyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 12-tridecenyl, 12-tetradecenyl, 12-pentadecenyl, 12-hexadecenyl, 13-methyl-12-tetradecenyl, 13-methyl-12-pentadecenyl, and 14-methyl-12-pentadecenyl; in another aspect, $R^5$ is selected from the group consisting of 8-nonenyl, 8-decenyl, 8-undecenyl, 8,11-dodecadienyl, 8,11-tridecadienyl, 8,11-tetradecadienyl, 8,11,14-pentadecatrienyl, 8,11,14-hexadecatrienyl, 12-tridecenyl, 12-tetradecenyl, and 12-pentadecenyl.

In addition to any or all of the above or alternatively, the second glyceride copolymer may be such that n is an integer from 3 to 250, from 5 to 180, from 6 to 140, from 8 to 70, from 9 to 40, or from 9 to 26.

In addition to any or all of the above or alternatively, the third glyceride copolymer may be such that $R^{11}$, $R^{12}$, and $R^{13}$ are each independently selected from the group consisting of pentadecyl, heptadecyl, 8-heptadecenyl, 8,11-heptadecadienyl, and 8,11,14-heptadecatrienyl.

In addition to any or all of the above or alternatively, the third glyceride copolymer may be such that two of $R^{21}$, $R^{22}$, and $R^{23}$ are independently selected from the group consisting of pentadecyl, heptadecyl, 8-heptadecenyl, 8,11-heptadecadienyl, and 8,11,14-heptadecatrienyl; and wherein one of $R^{21}$, $R^{22}$, and $R^{23}$ is selected from the group consisting of: 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-octadecatrienyl, 9-methyl-8-decenyl, 9-methyl-8-undecenyl, 10-methyl-8-undecenyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 12-tridecenyl, 12-tetradecenyl, 12-pentadecenyl, 12-hexadecenyl, 13-methyl-12-tetradecenyl, 13-methyl-12-pentadecenyl, and 14-methyl-12-pentadecenyl; in one aspect, one of $R^{21}$, $R^{22}$, and $R^{23}$ is selected from the group consisting of 8-nonenyl, 8-decenyl, 8-undecenyl, 8,11-dodecadienyl, 8,11-tridecadienyl, 8,11-tetradecadienyl, 8,11,14-pentadecatrienyl, 8,11,14-hexadecatrienyl, 12-tridecenyl, 12-tetradecenyl, and 12-pentadecenyl.

In addition to any or all of the above or alternatively, the third glyceride copolymer may be such that one of $R^{21}$, $R^{22}$, and $R^{23}$ is selected from the group consisting of pentadecyl, heptadecyl, 8-heptadecenyl, 8,11-heptadecadienyl, and 8,11,14-heptadecatrienyl; and wherein two of $R^{21}$, $R^{22}$, and $R^{23}$ are independently selected from the group consisting of: 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-octadecatrienyl, 9-methyl-8-decenyl, 9-methyl-8-undecenyl, 10-methyl-8-undecenyl, 12-methyl- 8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 12-tridecenyl, 12-tetradecenyl, 12-pentadecenyl, 12-hexadecenyl, 13-methyl-12-tetradecenyl, 13-methyl-12-pentadecenyl, and 14-methyl-12-pentadecenyl; in one aspect, two of $R^{21}$, $R^{22}$, and $R^{23}$ are independently selected from the group consisting of 8-nonenyl, 8-decenyl, 8-undecenyl, 8,11-dodecadienyl, 8,11-tridecadienyl, 8,11-tetradecadienyl, 8,11,14-pentadecatrienyl, 8,11,14-hexadecatrienyl, 12-tridecenyl, 12-tetradecenyl, and 12-pentadecenyl.

In one example, the surface softening agent may comprise a glyceride copolymer, which comprises constitutional units formed from reacting:

a) at least an unsaturated natural oil glyceride, and a unsaturated alkenylized natural oil glyceride in the presence of a metathesis catalyst;

b) at least an unsaturated synthetic polyol ester, and a unsaturated alkenylized natural oil glyceride in the presence of a metathesis catalyst;

c) at least an unsaturated natural oil glyceride, and a unsaturated alkenylized synthetic polyol ester in the presence of a metathesis catalyst;

d) at least an unsaturated synthetic polyol ester, and a unsaturated alkenylized synthetic polyol ester in the presence of a metathesis catalyst;

e) at least an unsaturated alkenylized synthetic polyol ester, and a unsaturated alkenylized synthetic polyol ester in the presence of a metathesis catalyst;

at least an unsaturated alkenylized natural oil glyceride, and a unsaturated alkenylized natural oil glyceride in the presence of a metathesis catalyst;

optionally wherein:

in one aspect, said glyceride copolymer comprises a $C_{10-14}$ unsaturated fatty acid ester;

in one aspect said catalyst is selected from the group consisting of an organo-ruthenium compound, an organo-osmium compound, an organo-tungsten compound, an organo-molybdenum compound and mixtures thereof;

in one aspect the unsaturated alkenylized natural oil glyceride is formed from the reaction of a unsaturated natural oil glyceride with a short-chain alkene in the presence of a metathesis catalyst, in one aspect, said catalyst is selected from the group consisting of an organo-ruthenium compound, an organo-osmium compound, an organo-tungsten compound, an organo-molybdenum compound and mixtures thereof, in one aspect, the short-chain alkene is selected from the group consisting of ethylene, propylene, 1-butene, 2-butene, isobutene, 1-pentene, 2-pentene, 1-hexene, 2-hexene, 3-hexene and mixtures thereof, in one aspect, the short-chain alkene is selected from the group consisting of ethylene, propylene, 1-butene, and 2-butene, and mixtures thereof, in one aspect, the unsaturated alkenylized natural oil glyceride has a lower molecular weight than the second unsaturated natural oil glyceride;

in one aspect, the unsaturated natural oil glyceride is obtained from a natural oil; in one aspect, from vegetable oil, animal fat, and/or algae oil; in one aspect, from Abyssinian oil, Almond Oil, Apricot Oil, Apricot Kernel oil, Argan oil, Avocado Oil, Babassu Oil, Baobab Oil, Black Cumin Oil, Black Currant Oil, Borage Oil, Camelina oil, Carinata oil, Canola oil, Castor oil, Cherry Kernel Oil, Coconut oil, Corn oil, Cottonseed oil, Echium Oil, Evening Primrose Oil, Flax Seed Oil, Grape Seed Oil, Grapefruit Seed Oil, Hazelnut Oil, Hemp Seed Oil, Jatropha oil, Jojoba Oil, Kukui Nut Oil, Linseed Oil, Macadamia Nut Oil, Meadowfoam Seed Oil, Moringa Oil, Neem Oil, Olive Oil, Palm Oil, Palm Kernel Oil, Peach Kernel Oil, Peanut Oil, Pecan Oil, Pennycress oil, Perilla Seed Oil, Pistachio Oil, Pomegranate Seed Oil, Pongamia oil, Pumpkin Seed Oil, Raspberry Oil, Red Palm Olein, Rice Bran Oil, Rosehip Oil, Safflower Oil, Seabuckthorn Fruit Oil, Sesame Seed Oil, Shea Olein, Sunflower Oil, Soybean Oil, Tonka Bean Oil, Tung Oil, Walnut Oil, Wheat Germ Oil, High Oleoyl Soybean Oil, High Oleoyl Sunflower Oil, High Oleoyl Safflower Oil, High Erucic Acid Rapeseed Oil, and mixtures thereof;

in one aspect, said synthetic polyol ester is derived from a material selected from the group consisting of ethylene glycol, propylene glycol, glycerol, polyglycerol, polyethylene glycol, polypropylene glycol, poly(tetramethylene ether) glycol, pentaerythritol, dipentaerythritol, tripentaerythritol, trimethylolpropane, neopentyl glycol, a sugar, for example, sucrose, and mixtures thereof; and/or in one aspect, the glyceride copolymer has a weight average molecular weight ranging from 4,000 g/mol to 150,000 g/mol, from 5,000 g/mol to 130,000 g/mol, from 6,000 g/mol to 100,000 g/mol, from 7,000 g/mol to 50,000 g/mol, from 8,000 g/mol to 30,000 g/mol, or from 8,000 g/mol to 20,000 g/mol.

In one example, the short-chain alkene is selected from the group consisting of: ethylene, propylene, 1-butene, 2-butene, and mixtures thereof.

In one example, the first glyceride copolymer is derived from a natural polyol ester and/or a synthetic polyol ester, in one aspect, said natural polyol ester is selected from the group consisting of a vegetable oil, a animal fat, a algae oil and mixtures thereof; and said synthetic polyol ester is derived from a material selected from the group consisting of ethylene glycol, propylene glycol, glycerol, polyglycerol, polyethylene glycol, polypropylene glycol, poly(tetramethylene ether) glycol, pentaerythritol, dipentaerythritol, tripentaerythritol, trimethylolpropane, neopentyl glycol, a sugar, for example, sucrose, and mixtures thereof.

In another example, the surface softening composition, based on total composition weight, from about 0.1% to about 50%, from about 0.5% to about 30%, or from about 1% to about 20% of a glyceride copolymer, selected from the group consisting of said first glyceride copolymer, second glyceride copolymer, third glyceride copolymer, and mixtures thereof.

In one example, the first and/or second glyceride copolymers may exhibit a free hydrocarbon content, based on the weight of glyceride copolymer of from about 0% to about 5%, from about 0.1% to about 5%, from about 0.1% to about 4%, from about 0.1 to about 3%, or from about 0.1% to about 1%.

In another example, the third glyceride copolymer may exhibit a free hydrocarbon content, based on the weight of glyceride copolymer of from about 0% to about 5%, from about 0.1% to about 5%, from about 0.1% to about 4%, from about 0.1 to about 3%, or from about 0.1% to about 1%.

In one example, $R^{21}$, $R^{22}$, and $R^{23}$ of the third glyceride copolymer may be each independently selected from the group consisting of: 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-octadecatrienyl, 9-methyl-8-decenyl, 9-methyl-8-undecenyl, 10-methyl-8-undecenyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 12-tridecenyl, 12-tetradecenyl, 12-pentadecenyl, 12-hexadecenyl, 13-methyl-12-tetradecenyl, 13-methyl-12-pentadecenyl, and 14-methyl-12-pentadecenyl; in one aspect, $R^{21}$, $R^{22}$, and $R^{23}$ are each independently selected from the group consisting of 8-nonenyl, 8-decenyl, 8-undecenyl, 8,11-dodecadienyl, 8,11-tridecadienyl, 8,11-tetradecadienyl, 8,11,14-pentadecatrienyl, 8,11,14-hexadecatrienyl, 12-tridecenyl, 12-tetradecenyl, and 12-pentadecenyl.

In another example, the surface softening agent is selected from the group consisting of:

(i), a first glyceride copolymer, comprising, based on total weight of first glyceride copolymer, from 3% to 30%, and/or from 3% to 25%, and/or from 5% to 20% $C_{10-14}$ unsaturated fatty acid esters; and/or said first glyceride copolymer comprises, based on total weight of first glyceride copolymer, from 3% to 30%, and/or from 3% to 25%, and/or from 3% to 20% $C_{10-13}$ unsaturated fatty acid esters; and/or said first glyceride copolymer comprises, based on total weight of first glyceride copolymer, from 0.1% to 30%, and/or from 0.1% to 25%, and/or from 0.2% to 20%, and/or from 0.5% to 15% $C_{10-11}$ unsaturated fatty acid esters; and (ii) optionally, but desirably, a second glyceride copolymer having formula (I):

$G^5$, and $G^6$ for each individual repeat unit are independently selected from the values of $G^4$, $G^5$, and $G^6$ in other repeating units;

two of $G^7$, $G^8$, and $G^9$ are —$CH_2$—, and one of $G^7$, $G^8$, and $G^9$ is a direct bond;

n is an integer from 3 to 250;

with the proviso for each of said second glyceride copolymers at least one of $R^1$, $R^2$, $R^3$, and $R^5$, and/or at least one $R^4$ in one individual repeat unit of said repeat unit having index n, is selected from the group consisting of: 8-nonenyl; 8-decenyl; 8-undecenyl; 8-dodecenyl; 8,11-dodecadienyl; 8,11-tridecadienyl; 8,11-tetradecadienyl; 8,11-pentadecadienyl; 8,11,14-pentadecatrienyl; 8,11,14-hexadecatrienyl; 8,11,14-octadecatrienyl; 9-methyl-8-decenyl; 9-methyl-8-undecenyl; 10-methyl-8-undecenyl; 12-methyl-8,11-tridecadienyl; 12-methyl-8,11-tetradecadienyl; 13-methyl-8,11-tetradecadienyl; 15-methyl-8,11,14-hexadecatrienyl; 15-methyl-8,11,14-heptadecatrienyl; 16-methyl-8,11,14-heptadecatrienyl; 12-tridecenyl; 12-tetradecenyl; 12-pentadecenyl; 12-hexadecenyl; 13-methyl-12-tetradecenyl; 13-methyl-12-pentadecenyl; and 14-methyl-12-pen-

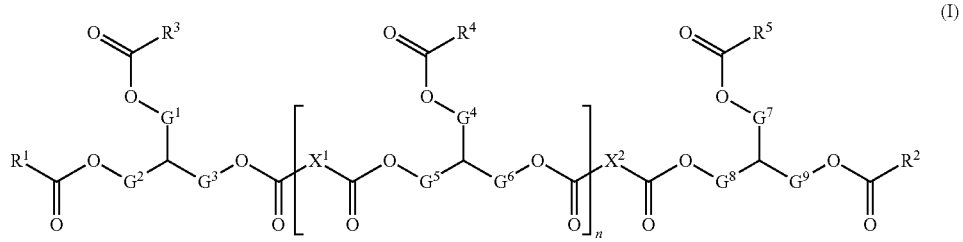

(I)

wherein:
each $R^1$, $R^2$, $R^3$, $R^4$, and $R^5$ in second glyceride copolymer is independently selected from the group consisting of an oligomeric glyceride moiety, a $C_{1-24}$ alkyl, a substituted $C_{1-24}$ alkyl wherein the substituent is one or more —OH moieties, a $C_{2-24}$ alkenyl, or a substituted $C_{2-24}$ alkenyl wherein the substituent is one or more —OH moieties; and/or wherein each of the following combinations of moieties may each independently be covalently linked:
$R^1$ and $R^3$,
$R^2$ and $R^5$,
$R^1$ and an adjacent $R^4$,
$R^2$ and an adjacent $R^4$,
$R^3$ and an adjacent $R^4$,
$R^5$ and an adjacent $R^4$, or
any two adjacent $R^4$
such that the covalently linked moieties form an alkenylene moiety;
each $X^1$ and $X^2$ in said second glyceride copolymer is independently selected from the group consisting of a $C_{1-32}$ alkylene, a substituted $C_{1-32}$ alkylene wherein the substituent is one or more —OH moieties, a $C_{2-32}$ alkenylene or a substituted $C_{2-32}$ alkenylene wherein the substituent is one or more —OH moieties;
two of $G^1$, $G^2$, and $G^3$ are —$CH_2$—, and one of $G^1$, $G^2$, and $G^3$ is a direct bond;
for each individual repeat unit in the repeat unit having index n, two of $G^4$, $G^5$, and $G^6$ are —$CH_2$—, and one of $G^4$, $G^5$, and $G^6$ is a direct bond, and the values $G^4$, tadecenyl; and/or said second glyceride copolymer comprises based on total weight of second glyceride copolymer, from 3% to 30%, and/or from 3% to 25%, and/or from 5% to 20% $C_{9-13}$ alkenyl moieties; and/or said second glyceride copolymer comprises, based on total weight of second glyceride copolymer, from 3% to 30%, and/or from 3% to 25%, and/or from 3% to 20% $C_{9-12}$ alkenyl moieties; and/or said second glyceride copolymer comprises, based on total weight of second glyceride copolymer, from 0.1% to 30%, and/or from 0.1% to 25%, and/or from 0.2% to 20%, and/or from 0.5% to 15% $C_{9-10}$ alkenyl moieties; and (iii) optionally, a third glyceride copolymer, which comprises constitutional units formed from reacting, in the presence of a metathesis catalyst, one or more compounds from each of the compounds having the following formulas:

Formula (IIa):

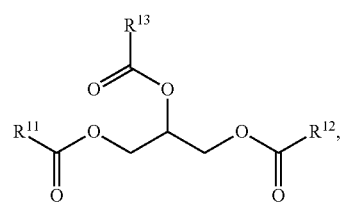

(IIa)

Formula (IIb):

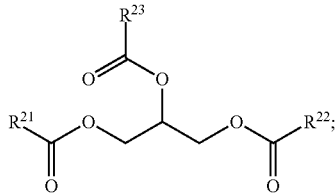

(IIb)

wherein,
each $R^{11}$, $R^{12}$, and $R^{13}$ is independently a $C_{1-24}$ alkyl, a substituted $C_{1-24}$ alkyl wherein the substituent is one or more —OH moieties, a $C_{2-24}$ alkenyl, or a substituted $C_{2-24}$ alkenyl wherein the substituent is one or more —OH moieties with the proviso that at least one of $R^{11}$, $R^{12}$, and $R^{13}$ is a $C_{2-24}$ alkenyl or a substituted $C_{2-24}$ alkenyl wherein the substituent is one or more —OH moieties; and
each $R^{21}$, $R^{22}$, and $R^{23}$ is independently a $C_{1-24}$ alkyl, a substituted $C_{1-24}$ alkyl wherein the substituent is one or more —OH moieties, a $C_{2-24}$ alkenyl, or a substituted $C_{2-24}$ alkenyl wherein the substituent is one or more —OH moieties, with the proviso that at least one of $R^{21}$, $R^{22}$, and $R^{23}$ is 8-nonenyl; 8-decenyl; 8-undecenyl; 8-dodecenyl; 8,11-dodecadienyl; 8,11-tridecadienyl; 8,11-tetradecadienyl; 8,11-pentadecadienyl; 8,11,14-pentadecatrienyl; 8,11,14-hexadecatrienyl; 8,11,14-octadecatrienyl; 9-methyl-8-decenyl; 9-methyl-8-undecenyl; 10-methyl-8-undecenyl; 12-methyl-8,11-tridecadienyl; 12-methyl-8,11-tetradecadienyl; 13-methyl-8,11-tetradecadienyl; 15-methyl-8,11,14-hexadecatrienyl; 15-methyl-8,11,14-heptadecatrienyl; 16-methyl-8,11,14-heptadecatrienyl; 12-tridecenyl; 12-tetradecenyl; 12-pentadecenyl; 12-hexadecenyl; 13-methyl-12-tetradecenyl; 13-methyl-12-pentadecenyl; and 14-methyl-12-pentadecenyl; wherein the number ratio of constitutional units formed from monomer compounds of formula (IIa) to constitutional units formed from monomer compounds of formula (IIb) is no more than 10:1; and
(iv) mixtures thereof.

In addition to any or all of the above or alternatively, said first, second, and third glyceride copolymers may have a weight average molecular weight of from 4,000 g/mol to 150,000 g/mol, and/or from 5,000 g/mol to 130,000 g/mol, and/or from 6,000 g/mol to 100,000 g/mol, and/or from 7,000 g/mol to 50,000 g/mol, and/or from 8,000 g/mol to 30,000 g/mol, and/or from 8,000 g/mol to 20,000 g/mol.

In addition to any or all of the above or alternatively, said first, second, and third glyceride copolymers may be produced by a process comprising metathesis; and/or said process comprises reacting two or more monomers in the presence of the metathesis catalyst as part of a reaction mixture, wherein the weight-to-weight ratio of the monomer compounds of formula (IIa) to the monomer compounds of formula (IIb) in the reaction mixture is no more than 10:1, and/or no more than 9:1, and/or no more than 8:1, and/or no more than 7:1, and/or no more than 6:1, and/or no more than 5:1, and/or no more than 4:1, and/or no more than 3:1, and/or no more than 2:1, and/or no more than 1:1; and/or the metathesis catalyst is an organo-ruthenium compound, an organo-osmium compound, an organo-tungsten compound, or an organo-molybdenum compound.

In addition to any or all of the above or alternatively, said second glyceride copolymer may be such that at least one of $R^1$, $R^2$, $R^3$, $R^4$, or $R^5$ is a $C_{9-13}$ alkenyl, and/or a $C_{9-12}$ alkenyl, and/or a $C_{9-10}$ alkenyl.

In addition to any or all of the above or alternatively, said third glyceride copolymer may be such that at least one of $R^{11}$, $R^{12}$, $R^{13}$, $R^{21}$, $R^{22}$, or $R^{23}$ is a $C_{9-13}$ alkenyl, and/or a $C_{9-12}$ alkenyl, and/or a $C_{9-10}$ alkenyl.

In addition to any or all of the above or alternatively, the second glyceride copolymer may be such that the second glyceride copolymer's $G^1$ and $G^2$ moieties are —$CH_2$— and $G^3$ is a direct bond.

In addition to any or all of the above or alternatively, the second glyceride copolymer may be such that the second glyceride copolymer's $G^1$ and $G^3$ moieties are —$CH_2$— and $G^2$ is a direct bond.

In addition to any or all of the above or alternatively, the second glyceride copolymer may be such that the second glyceride copolymer's $G^2$ and $G^3$ moieties are —$CH_2$— and $G^1$ is a direct bond.

In addition to any or all of the above or alternatively, the second glyceride copolymer may be such that the second glyceride copolymer, at least one of, $G^4$ and $G^5$ are —$CH_2$— and $G^6$ is a direct bond.

In addition to any or all of the above or alternatively, the second glyceride copolymer may be such that the second glyceride copolymer, at least one of, $G^4$ and $G^6$ are —$CH_2$— and $G^5$ is a direct bond.

In addition to any or all of the above or alternatively, the second glyceride copolymer may be such that the second glyceride copolymer, at least one of, $G^5$ and $G^6$ are —$CH_2$— and $G^4$ is a direct bond.

In addition to any or all of the above or alternatively, the second glyceride copolymer may be such that at least one of, $G^7$ and $G^8$ are —$CH_2$— and $G^9$ is a direct bond.

In addition to any or all of the above or alternatively, the second glyceride copolymer may be such that at least one of $G^7$ and $G^9$ are —$CH_2$— and $G^8$ is a direct bond.

In addition to any or all of the above or alternatively, the second glyceride copolymer may be such that at least one of $G^8$ and $G^9$ are —$CH_2$— and $G^7$ is a direct bond.

In addition to any or all of the above or alternatively, the second glyceride copolymer may be such that each $X^1$ is independently selected from the group consisting of —$(CH_2)_{16}$—, —$(CH_2)_{18}$—, —$(CH_2)_{19}$—, —$(CH_2)_{20}$—, —$(CH_2)_{22}$—, —$(CH_2)_{24}$—, —$(CH_2)_{25}$—, —$(CH_2)_{28}$—, —$(CH_2)_7$—CH=CH—$(CH_2)_7$—, —$(CH_2)_7$—CH=CH—$CH_2$—CH=CH—$(CH_2)_7$—, —$(CH_2)_7$—CH=CH—$CH_2$—CH=CH—$CH_2$—CH=CH—$(CH_2)_7$—, —$(CH_2)_7$—CH=CH—$CH_2$—CH=CH—$CH_2$—CH=CH—$CH_2$—CH=CH—$(CH_2)_7$—, —$(CH_2)_7$—CH=CH—$CH_2$—CH=CH—$CH_2$—CH=CH—$CH_2$—CH=CH—$(CH_2)_7$—, —$(CH_2)_{11}$—CH=CH—$(CH_2)_{11}$—, —$(CH_2)_7$—CH=CH—$CH_2$—CH=CH—$(CH_2)_{11}$—, —$(CH_2)_{11}$—CH=CH—$CH_2$—CH=CH—$(CH_2)_7$—, —$(CH_2)_7$—CH=CH—$CH_2$—CH=CH—$(CH_2)_{11}$—, —$(CH_2)_{11}$—CH=CH—$CH_2$—CH=CH—$CH_2$—CH=CH—$(CH_2)_7$—, —$(CH_2)_9$—CH=CH—$(CH_2)_7$, —$(CH_2)_7$—CH=CH—$(CH_2)_9$, —$(CH_2)_{11}$—CH=CH—$(CH_2)_7$—, or —$(CH_2)_7$—CH=CH—$(CH_2)_{11}$—.

In addition to any or all of the above or alternatively, the second glyceride copolymer may be such that each $X^2$ is independently selected from the group consisting of —$(CH_2)_{16}$—, —$(CH_2)_{18}$—, —$(CH_2)_{19}$—, —$(CH_2)_{20}$—, —$(CH_2)_{22}$—, —$(CH_2)_{24}$—, —$(CH_2)_{25}$—, —$(CH_2)_{28}$—, —$(CH_2)_7$—CH=CH—$(CH_2)_7$—, —$(CH_2)_7$—CH=CH—

$CH_2$—CH=CH—$(CH_2)_7$—, —$(CH_2)_7$—CH=CH—$CH_2$—CH=CH—$CH_2$—CH=CH—$(CH_2)_7$—, —$(CH_2)_7$—CH=CH—$CH_2$—CH=CH—$CH_2$—CH=CH—$CH_2$—CH=CH—$CH_2$—CH=CH—$(CH_2)_7$—, —$(CH_2)_7$—CH=CH—$CH_2$—CH=CH—$CH_2$—CH=CH—$CH_2$—CH=CH—$CH_2$—CH=CH—$(CH_2)_7$—, —$(CH_2)_{11}$—CH=CH—$(CH_2)_{11}$—, —$(CH_2)_7$—CH=CH—$CH_2$—CH=CH—$(CH_2)_{11}$—, —$(CH_2)_{11}$—CH=CH—$CH_2$—CH=CH—$(CH_2)_7$—, —$(CH_2)_7$—CH=CH—$CH_2$—CH=CH—$(CH_2)_{11}$—, —$(CH_2)_{11}$—CH=CH—$CH_2$—CH=CH—$CH_2$—CH=CH—$(CH_2)_7$—, —$(CH_2)_9$—CH=CH—$(CH_2)_7$—, —$(CH_2)_7$—CH=CH—$(CH_2)_9$, —$(CH_2)_{11}$—CH=CH—$(CH_2)_7$—, or —$(CH_2)_7$—CH=CH—$(CH_2)_{11}$—.

In addition to any or all of the above or alternatively, the second glyceride copolymer may be such that $R^1$ is a $C_{1-24}$ alkyl or a $C_{2-24}$ alkenyl; and/or $R^1$ is selected from the group consisting of: 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-octadecatrienyl, 9-methyl-8-decenyl, 9-methyl-8-undecenyl, 10-methyl-8-undecenyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 12-tridecenyl, 12-tetradecenyl, 12-pentadecenyl, 12-hexadecenyl, 13-methyl-12-tetradecenyl, 13-methyl-12-pentadecenyl, and 14-methyl-12-pentadecenyl, and/or $R^1$ is selected from the group consisting of 8-nonenyl, 8-decenyl, 8-undecenyl, 8,11-dodecadienyl, 8,11-tridecadienyl, 8,11-tetradecadienyl, 8,11,14-pentadecatrienyl, 8,11,14-hexadecatrienyl, 12-tridecenyl, 12-tetradecenyl, and 12-pentadecenyl.

In addition to any or all of the above or alternatively, the second glyceride copolymer may be such that $R^2$ is a $C_{1-24}$ alkyl or a $C_{2-24}$ alkenyl; and/or $R^2$ is selected from the group consisting of: 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-octadecatrienyl, 9-methyl-8-decenyl, 9-methyl-8-undecenyl, 10-methyl-8-undecenyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 12-tridecenyl, 12-tetradecenyl, 12-pentadecenyl, 12-hexadecenyl, 13-methyl-12-tetradecenyl, 13-methyl-12-pentadecenyl, and 14-methyl-12-pentadecenyl; and/or $R^2$ is selected from the group consisting of 8-nonenyl, 8-decenyl, 8-undecenyl, 8,11-dodecadienyl, 8,11-tridecadienyl, 8,11-tetradecadienyl, 8,11,14-pentadecatrienyl, 8,11,14-hexadecatrienyl, 12-tridecenyl, 12-tetradecenyl, and 12-pentadecenyl.

In addition to any or all of the above or alternatively, the second glyceride copolymer may be such that $R^3$ is a $C_{1-24}$ alkyl or a $C_{2-24}$ alkenyl; and/or $R^3$ is selected from the group consisting of: 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-octadecatrienyl, 9-methyl-8-decenyl, 9-methyl-8-undecenyl, 10-methyl-8-undecenyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 12-tridecenyl, 12-tetradecenyl, 12-pentadecenyl, 12-hexadecenyl, 13-methyl-12-tetradecenyl, 13-methyl-12-pentadecenyl, and 14-methyl-12-pentadecenyl; and/or $R^3$ is selected from the group consisting of 8-nonenyl, 8-decenyl, 8-undecenyl, 8,11-dodecadienyl, 8,11-tridecadienyl, 8,11-tetradecadienyl, 8,11,14-pentadecatrienyl, 8,11,14-hexadecatrienyl, 12-tridecenyl, 12-tetradecenyl, and 12-pentadecenyl.

In addition to any or all of the above or alternatively, the second glyceride copolymer may be such that each $R^4$ is independently selected from a $C_{1-24}$ alkyl and a $C_{2-24}$ alkenyl; and/or each $R^4$ is independently selected from the group consisting of: 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-octadecatrienyl, 9-methyl-8-decenyl, 9-methyl-8-undecenyl, 10-methyl-8-undecenyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 12-tridecenyl, 12-tetradecenyl, 12-pentadecenyl, 12-hexadecenyl, 13-methyl-12-tetradecenyl, 13-methyl-12-pentadecenyl, and 14-methyl-12-pentadecenyl; and/or each $R^4$ is independently selected from the group consisting of 8-nonenyl, 8-decenyl, 8-undecenyl, 8,11-dodecadienyl, 8,11-tridecadienyl, 8,11-tetradecadienyl, 8,11,14-pentadecatrienyl, 8,11,14-hexadecatrienyl, 12-tridecenyl, 12-tetradecenyl, and 12-pentadecenyl.

In addition to any or all of the above or alternatively, the second glyceride copolymer may be such that $R^5$ is a $C_{1-24}$ alkyl or a $C_{2-24}$ alkenyl; and/or $R^5$ is selected from the group consisting of: 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-octadecatrienyl, 9-methyl-8-decenyl, 9-methyl-8-undecenyl, 10-methyl-8-undecenyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 12-tridecenyl, 12-tetradecenyl, 12-pentadecenyl, 12-hexadecenyl, 13-methyl-12-tetradecenyl, 13-methyl-12-pentadecenyl, and 14-methyl-12-pentadecenyl; and/or $R^5$ is selected from the group consisting of 8-nonenyl, 8-decenyl, 8-undecenyl, 8,11-dodecadienyl, 8,11-tridecadienyl, 8,11-tetradecadienyl, 8,11,14-pentadecatrienyl, 8,11,14-hexadecatrienyl, 12-tridecenyl, 12-tetradecenyl, and 12-pentadecenyl.

In addition to any or all of the above or alternatively, the second glyceride copolymer may be such that n is an integer from 3 to 250, and/or from 5 to 180, and/or from 6 to 140, and/or from 8 to 70, and/or from 9 to 40, and/or from 9 to 26.

In addition to any or all of the above or alternatively, the third glyceride copolymer may be such that $R^{11}$, $R^{12}$, and $R^{13}$ are each independently selected from the group consisting of pentadecyl, heptadecyl, 8-heptadecenyl, 8,11-heptadecadienyl, and 8,11,14-heptadecatrienyl.

In addition to any or all of the above or alternatively, the third glyceride copolymer may be such that two of $R^{21}$, $R^{22}$, and $R^{23}$ are independently selected from the group consisting of pentadecyl, heptadecyl, 8-heptadecenyl, 8,11-heptadecadienyl, and 8,11,14-heptadecatrienyl; and wherein one of $R^{21}$, $R^{22}$, and $R^{23}$ is selected from the group consisting of: 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-octadecatrienyl, 9-methyl-8-decenyl, 9-methyl-8-undecenyl, 10-methyl-8-undecenyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 12-tridecenyl, 12-tetradecenyl, 12-pentadecenyl, 12-hexadecenyl, 13-methyl-12-tetradecenyl, 13-methyl-12-pentadecenyl, and 14-methyl-12-pentadecenyl; and/or one of $R^{21}$, $R^{22}$, and $R^{23}$ is selected from the group consisting of 8-nonenyl, 8-decenyl, 8-undecenyl, 8,11-dodecadienyl, 8,11-tridecadienyl, 8,11-tetradecadienyl, 8,11,14-pentadecatrienyl, 8,11,14-hexadecatrienyl, 12-tridecenyl, 12-tetradecenyl, and 12-pentadecenyl.

In addition to any or all of the above or alternatively, the third glyceride copolymer may be such that one of $R^{21}$, $R^{22}$, and $R^{23}$ is selected from the group consisting of pentadecyl, heptadecyl, 8-heptadecenyl, 8,11-heptadecadienyl, and 8,11,14-heptadecatrienyl; and wherein two of $R^{21}$, $R^{22}$, and $R^{23}$ are independently selected from the group consisting of: 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-octadecatrienyl, 9-methyl-8-decenyl, 9-methyl-8-undecenyl, 10-methyl-8-undecenyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 12-tridecenyl, 12-tetradecenyl, 12-pentadecenyl, 12-hexadecenyl, 13-methyl-12-tetradecenyl, 13-methyl-12-pentadecenyl, and 14-methyl-12-pentadecenyl; and/or two of $R^{21}$, $R^{22}$, and $R^{23}$ are independently selected from the group consisting of 8-nonenyl, 8-decenyl, 8-undecenyl, 8,11-dodecadienyl, 8,11-tridecadienyl, 8,11-tetradecadienyl, 8,11,14-pentadecatrienyl, 8,11,14-hexadecatrienyl, 12-tridecenyl, 12-tetradecenyl, and 12-pentadecenyl.

In one example, the surface softening agent may comprise a glyceride copolymer, which comprises a $C_{10-14}$ unsaturated fatty acid ester, which comprises constitutional units formed from reacting:

a) at least an unsaturated natural oil glyceride, and an unsaturated alkenylized natural oil glyceride in the presence of a metathesis catalyst;

b) at least an unsaturated synthetic polyol ester, and an unsaturated alkenylized natural oil glyceride in the presence of a metathesis catalyst;

c) at least an unsaturated natural oil glyceride, and an unsaturated alkenylized synthetic polyol ester in the presence of a metathesis catalyst;

d) at least an unsaturated synthetic polyol ester, and an unsaturated alkenylized synthetic polyol ester in the presence of a metathesis catalyst;

e) at least an unsaturated alkenylized synthetic polyol ester, and an unsaturated alkenylized synthetic polyol ester in the presence of a metathesis catalyst;

f) at least an unsaturated alkenylized natural oil glyceride, and an unsaturated alkenylized natural oil glyceride in the presence of a metathesis catalyst.

optionally wherein:

said catalyst is selected from the group consisting of an organo-ruthenium compound, an organo-osmium compound, an organo-tungsten compound, an organo-molybdenum compound and mixtures thereof;

the unsaturated alkenylized natural oil glyceride is formed from the reaction of a unsaturated natural oil glyceride with a short-chain alkene in the presence of a metathesis catalyst, and/or said catalyst is selected from the group consisting of an organo-ruthenium compound, an organo-osmium compound, an organo-tungsten compound, an organo-molybdenum compound and mixtures thereof, and/or the short-chain alkene is selected from the group consisting of ethylene, propylene, 1-butene, 2-butene, isobutene, 1-pentene, 2-pentene, 1-hexene, 2-hexene, 3-hexene and mixtures thereof, and/or the short-chain alkene is selected from the group consisting of ethylene, propylene, 1-butene, and 2-butene, and mixtures thereof, and/or the unsaturated alkenylized natural oil glyceride has a lower molecular weight than the second unsaturated natural oil glyceride;

the unsaturated natural oil glyceride is obtained from a natural oil; and/or from vegetable oil, animal fat, and/or algae oil; and/or from Abyssinian oil, Almond Oil, Apricot Oil, Apricot Kernel oil, Argan oil, Avocado Oil, Babassu Oil, Baobab Oil, Black Cumin Oil, Black Currant Oil, Borage Oil, Camelina oil, Carinata oil, Canola oil, Castor oil, Cherry Kernel Oil, Coconut oil, Corn oil, Cottonseed oil, Echium Oil, Evening Primrose Oil, Flax Seed Oil, Grape Seed Oil, Grapefruit Seed Oil, Hazelnut Oil, Hemp Seed Oil, Jatropha oil, Jojoba Oil, Kukui Nut Oil, Linseed Oil, Macadamia Nut Oil, Meadowfoam Seed Oil, Moringa Oil, Neem Oil, Olive Oil, Palm Oil, Palm Kernel Oil, Peach Kernel Oil, Peanut Oil, Pecan Oil, Pennycress oil, Perilla Seed Oil, Pistachio Oil, Pomegranate Seed Oil, Pongamia oil, Pumpkin Seed Oil, Raspberry Oil, Red Palm Olein, Rice Bran Oil, Rosehip Oil, Safflower Oil, Seabuckthorn Fruit Oil, Sesame Seed Oil, Shea Olein, Sunflower Oil, Soybean Oil, Tonka Bean Oil, Tung Oil, Walnut Oil, Wheat Germ Oil, High Oleoyl Soybean Oil, High Oleoyl Sunflower Oil, High Oleoyl Safflower Oil, High Erucic Acid Rapeseed Oil, and mixtures thereof;

said synthetic polyol ester is derived from a material selected from the group consisting of ethylene glycol, propylene glycol, glycerol, polyglycerol, polyethylene glycol, polypropylene glycol, poly(tetramethylene ether) glycol, pentaerythritol, dipentaerythritol, tripentaerythritol, trimethylolpropane, neopentyl glycol, a sugar, and/or, sucrose, and mixtures thereof; and the glyceride copolymer has a weight average molecular weight ranging from 4,000 g/mol to 150,000 g/mol, and/or from 5,000 g/mol to 130,000 g/mol, and/or from 6,000 g/mol to 100,000 g/mol, and/or from 7,000 g/mol to 50,000 g/mol, and/or from 8,000 g/mol to 30,000 g/mol, and/or from 8,000 g/mol to 20,000 g/mol.

In one example, the short-chain alkene is selected from the group consisting of: ethylene, propylene, 1-butene, 2-butene, and mixtures thereof.

In one example, the first glyceride copolymer is derived from a natural polyol ester and/or a synthetic polyol ester, and/or said natural polyol ester is selected from the group consisting of a vegetable oil, a animal fat, a algae oil and mixtures thereof; and said synthetic polyol ester is derived from a material selected from the group consisting of ethylene glycol, propylene glycol, glycerol, polyglycerol, polyethylene glycol, polypropylene glycol, poly(tetramethylene ether) glycol, pentaerythritol, dipentaerythritol, tripentaerythritol, trimethylolpropane, neopentyl glycol, a sugar, and/or, sucrose, and mixtures thereof.

In one example, based on total composition weight, the surface softening composition comprises from 0.1% to 50%, and/or from 0.5% to 30%, and/or from 1% to 20% of a glyceride copolymer, selected from the group consisting of said first glyceride copolymer, second glyceride copolymer, third glyceride copolymer, and mixtures thereof.

In one example, the first and/or second glyceride copolymers may exhibit a free hydrocarbon content, based on the weight of glyceride copolymer of from 0% to 5%, and/or from 0.1% to 5%, and/or from 0.1% to 4%, and/or from 0.1 to 3%, and/or from 0.1% to 1%.

In one example, the third glyceride copolymer may exhibit a free hydrocarbon content, based on the weight of glyceride copolymer of from 0% to 5%, and/or from 0.1% to 5%, and/or from 0.1% to 4%, and/or from 0.1 to 3%, and/or from 0.1% to 1%.

In another example, $R^{21}$, $R^{22}$, and $R^{23}$ of the third glyceride copolymer may be each independently selected from the group consisting of: 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-octadecatrienyl, 9-methyl-8-decenyl, 9-methyl-8-undecenyl, 10-methyl-8-undecenyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 12-tridecenyl, 12-tetradecenyl, 12-pentadecenyl, 12-hexadecenyl, 13-methyl-12-tetradecenyl, 13-methyl-12-pentadecenyl, and 14-methyl-12-pentadecenyl; and/or $R^{21}$, $R^{22}$, and $R^{23}$ are each independently selected from the group consisting of 8-nonenyl, 8-decenyl, 8-undecenyl, 8,11-dodecadienyl, 8,11-tridecadienyl, 8,11-tetradecadienyl, 8,11,14-pentadecatrienyl, 8,11,14-hexadecatrienyl, 12-tridecenyl, 12-tetradecenyl, and 12-pentadecenyl.

Methods of Making Compositions

The compositions of the present invention can be formulated into any suitable form and prepared by any process chosen by the formulator, non-limiting examples of which are described in U.S. Pat. No. 5,879,584 which is incorporated herein by reference. For example, the glyceride copolymers can be combined directly with the composition's other ingredients without pre-emulsification and/or pre-mixing to form the finished products. Alternatively, the glyceride copolymers can be combined with surfactants or emulsifiers, solvents, suitable adjuncts, and/or any other suitable ingredients to prepare emulsions prior to compounding the finished products.

Suitable equipment for use in the processes disclosed herein may include continuous stirred tank reactors, homogenizers, turbine agitators, recirculating pumps, paddle mixers, plough shear mixers, ribbon blenders, vertical axis granulators and drum mixers, both in batch and, where available, in continuous process configurations, spray dryers, and extruders. Such equipment can be obtained from Lodige GmbH (Paderborn, Germany), Littleford Day, Inc. (Florence, Ky., U.S.A.), Forberg AS (Larvik, Norway), Glatt Ingenieurtechnik GmbH (Weimar, Germany), Niro (Soeborg, Denmark), Hosokawa Bepex Corp. (Minneapolis, Minn., U.S.A.), Arde Barinco (New Jersey, U.S.A.).

Glyceride Oligomers

In one aspect, the disclosure provides glyceride copolymers of formula (I):

alkenyl, or a substituted $C_{2-24}$ alkenyl wherein the substituent is one or more —OH moieties; and/or each of the following combinations of moieties may each independently be covalently linked: $R^1$ and $R^3$, $R^2$ and $R^5$, $R^1$ and an adjacent $R^4$, $R^2$ and an adjacent $R^4$, $R^3$ and an adjacent $R^4$, $R^5$ and an adjacent $R^4$, or any two adjacent $R^4$ such that the covalently linked moieties forms an alkenylene moiety; each $X^1$ and $X^2$ is independently selected from the group consisting of a $C_{1-32}$ alkylene, a substituted $C_{1-32}$ alkylene wherein the substituent is one or more —OH moieties, a $C_{2-32}$ alkenylene or a substituted $C_{2-32}$ alkenylene wherein the substituent is one or more —OH moieties; two of $G^1$, $G^2$, and $G^3$ are —CH$_2$—, and one of $G^1$, $G^2$, and $G^3$ is a direct bond; for each individual repeat unit in the repeat unit having index n, two of $G^4$, $G^5$, and $G^6$ are —CH$_2$—, and one of $G^4$, $G^5$, and $G^6$ is a direct bond, and the values $G^4$, $G^5$, and $G^6$ for each individual repeat unit are independently selected from the values of $G^4$, $G^5$, and $G^6$ in other repeating units; two of $G^7$, $G^8$, and $G^9$ are —CH$_2$—, and one of $G^7$, $G^8$, and $G^9$ is a direct bond; and n is an integer from 3 to 250; with the proviso for each of said second glyceride copolymers at least one of $R^1$, $R^2$, $R^3$, and $R^5$, and/or at least one $R^4$ in one individual repeat unit of said repeat unit having index n, is selected from the group consisting of: 8-nonenyl; 8-decenyl; 8-undecenyl; 8-dodecenyl; 8,11-dodecadienyl; 8,11-tridecadienyl; 8,11-tetradecadienyl; 8,11-pentadecadienyl; 8,11,14-pentadecatrienyl; 8,11,14-hexadecatrienyl; 8,11,14-octadecatrienyl; 9-methyl-8-decenyl; 9-methyl-8-undecenyl; 10-methyl-8-undecenyl; 12-methyl-8,11-tridecadienyl; 12-methyl-8,11-tetradecadienyl; 13-methyl-8,11-tetradecadienyl; 15-methyl-8,11,14-hexadecatrienyl; 15-methyl-8,11,14-heptadecatrienyl; 16-methyl-8,11,14-heptadecatrienyl; 12-tridecenyl; 12-tetradecenyl; 12-pentadecenyl; 12-hexadecenyl; 13-methyl-12-tetradecenyl; 13-methyl-12-pentadecenyl; and 14-methyl-12-pentadecenyl.

$G^1$, $G^2$, and $G^3$ can have any suitable value. In some embodiments, $G^1$ and $G^2$ are —CH$_2$— and $G^3$ is a direct bond. In some other embodiments, $G^1$ and $G^3$ are —CH$_2$— and $G^2$ is a direct bond. In some other embodiments, $G^2$ and $G^3$ are —CH$_2$— and $G^1$ is a direct bond.

$G^4$, $G^5$, and $G^6$ can, in each instance, independently have any suitable value. In some embodiments of any of the aforementioned embodiments, in at least one instance, $G^4$ and $G^5$ are —CH$_2$— and $G^6$ is a direct bond. In some other embodiments of any of the aforementioned embodiments, in at least one instance, $G^4$ and $G^6$ are —CH$_2$— and $G^5$ is a direct bond. In some other embodiments of any of the aforementioned embodiments, in at least one instance, $G^5$ and $G^6$ are —CH$_2$— and $G^4$ is a direct bond.

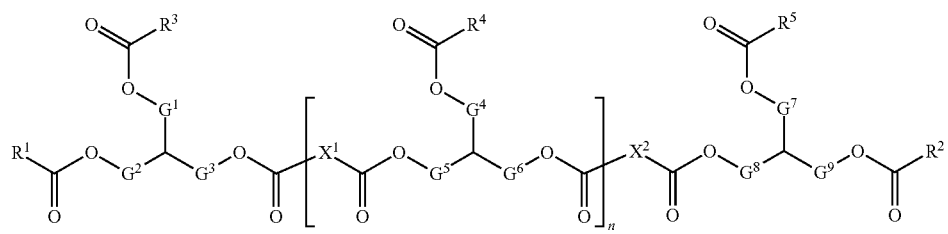

(I)

wherein: each $R^1$, $R^2$, $R^3$, $R^4$, and $R^5$ is independently selected from the group consisting of an oligomeric glyceride moiety, a $C_{1-24}$ alkyl, a substituted $C_{1-24}$ alkyl wherein the substituent is one or more —OH moieties, a $C_{2-24}$ $G^7$, $G^8$, and $G^9$ can have any suitable value. In some embodiments of any of the aforementioned embodiments, $G^7$ and $G^8$ are —CH$_2$— and $G^9$ is a direct bond. In some other embodiments of any of the aforementioned embodiments, $G^7$ and $G^9$ are —$CH_2$— and $G^8$ is a direct bond. In some other embodiments of any of the aforementioned embodiments, $G^8$ and $G^9$ are —$CH_2$— and $G^7$ is a direct bond.

$X^1$ can have any suitable value. In some embodiments of any of the aforementioned embodiments, $X^1$ is —$(CH_2)_{16}$—, —$(CH_2)_{18}$—, —$(CH_2)_{19}$—, —$(CH_2)_{28}$—, —$(CH_2)_{22}$—, —$(CH_2)_{24}$—, —$(CH_2)_{25}$—, —$(CH_2)_{28}$—, —$(CH_2)_7$—CH=CH—$(CH_2)_7$—, —$(CH_2)_7$—CH=CH—$CH_2$—CH=CH—$(CH_2)_7$—, —$(CH_2)_7$—CH=CH—$CH_2$—CH=CH—$CH_2$—CH=CH—$(CH_2)_7$—, —$(CH_2)_7$—CH=CH—$CH_2$—CH=CH—$CH_2$—CH=CH—$CH_2$—CH=CH—$(CH_2)_7$—, —$(CH_2)_7$—CH=CH—$CH_2$—CH=CH—$CH_2$—CH=CH—$CH_2$—, —$(CH_2)_7$—CH=CH—$CH_2$—CH=CH—$(CH_2)_7$—, —$(CH_2)_{11}$—CH=CH—$(CH_2)_{11}$—, —$(CH_2)_7$—CH=CH—$CH_2$—CH=CH—$(CH_2)_{11}$—, —$(CH_2)_{11}$—CH=CH—$CH_2$—CH=CH—$(CH_2)_7$—, —$(CH_2)_7$—CH=CH—$(CH_2)_7$—CH=CH—$CH_2$—, —$(CH_2)_7$—CH=CH—$CH_2$—CH=CH—$(CH_2)_{11}$—, —$(CH_2)_1$—CH=CH—$CH_2$—CH=CH—$CH_2$—CH=CH—$(CH_2)_7$—, —$(CH_2)_9$—CH=CH—$(CH_2)_7$, —$(CH_2)_7$—CH=CH—$(CH_2)_9$, —$(CH_2)_{11}$—CH=CH—$(CH_2)_7$—, or —$(CH_2)_7$—CH=CH—$(CH_2)_{11}$—. In some such embodiments, $X^1$ is —$(CH_2)_{16}$—, —$(CH_2)_{18}$—, —$(CH_2)_{19}$—, —$(CH_2)_{22}$—, —$(CH_2)_{25}$—, —$(CH_2)_{28}$—, —$(CH_2)_7$—CH=CH—$(CH_2)_7$—, —$(CH_2)_9$—CH=CH—$(CH_2)_7$—, —$(CH_2)_7$—CH=CH—$(CH_2)_9$—, —$(CH_2)_7$—CH=CH—$CH_2$—CH=CH—$(CH_2)_7$—, —$(CH_2)_7$—CH=CH—$CH_2$—CH=CH—$CH_2$—CH=CH—$(CH_2)_7$—, —$(CH_2)_7$—CH=CH—$CH_2$—CH=CH—$CH_2$—, or —$(CH_2)_7$—CH=CH—$CH_2$—CH=CH—$CH_2$—CH=CH—$CH_2$—CH=CH—$(CH_2)_7$—. In some further such embodiments, $X^1$ is —$(CH_2)_7$—CH=CH—$(CH_2)_7$—, —$(CH_2)_9$—CH=CH—$(CH_2)_7$—, —$(CH_2)_7$—CH=CH—$(CH_2)_9$—, —$(CH_2)_7$—CH=CH—$CH_2$—CH=CH—$(CH_2)_7$—, —$(CH_2)_7$—CH=CH—$CH_2$—CH=CH—$CH_2$—CH=CH—$(CH_2)_7$—, —$(CH_2)_7$—CH=CH—$CH_2$—CH=CH—$CH_2$—, or —$(CH_2)_7$—CH=CH—$CH_2$—CH=CH—$CH_2$—CH=CH—$CH_2$—CH=CH—$(CH_2)_7$—. In some further such embodiments, $X^1$ is —$(CH_2)_7$—CH=CH—$(CH_2)_7$—, —$(CH_2)_7$—CH=CH—$CH_2$—CH=CH—$(CH_2)_7$—, —$(CH_2)_7$—CH=CH—$CH_2$—CH=CH—$CH_2$—CH=CH—$(CH_2)_7$—, or —$(CH_2)_7$—CH=CH—$CH_2$—CH=CH—$CH_2$—CH=CH—$CH_2$—CH=CH—$(CH_2)_7$—.

$X^2$ can have any suitable value. In some embodiments of any of the aforementioned embodiments, $X^2$ is —$(CH_2)_{16}$—, —$(CH_2)_{18}$—, —$(CH_2)_{19}$—, —$(CH_2)_{28}$—, —$(CH_2)_{22}$—, —$(CH_2)_{24}$—, —$(CH_2)_{25}$—, —$(CH_2)_{28}$—, —$(CH_2)_7$—CH=CH—$(CH_2)_7$—, —$(CH_2)_7$—CH=CH—$CH_2$—CH=CH—$(CH_2)_7$—, —$(CH_2)_7$—CH=CH—$CH_2$—CH=CH—$CH_2$—CH=CH—$(CH_2)_7$—, —$(CH_2)_7$—CH=CH—$CH_2$—CH=CH—$CH_2$—CH=CH—$CH_2$—CH=CH—$(CH_2)_7$—, —$(CH_2)_7$—CH=CH—$CH_2$—CH=CH—$CH_2$—CH=CH—$CH_2$—, —$(CH_2)_7$—CH=CH—$CH_2$—CH=CH—$(CH_2)_7$—, —$(CH_2)_{11}$—CH=CH—$(CH_2)_{11}$—, —$(CH_2)_7$—CH=CH—$CH_2$—CH=CH—$(CH_2)_{11}$—, —$(CH_2)_{11}$—CH=CH—$CH_2$—CH=CH—$(CH_2)_7$—, —$(CH_2)_7$—CH=CH—$(CH_2)_7$—CH=CH—$CH_2$—, —$(CH_2)_7$—CH=CH—$CH_2$—CH=CH—$(CH_2)_{11}$—, —$(CH_2)_{11}$—CH=CH—$CH_2$—CH=CH—$CH_2$—CH=CH—$(CH_2)_7$—, —$(CH_2)_9$—CH=CH—$(CH_2)_7$, —$(CH_2)_7$—CH=CH—$(CH_2)_9$, —$(CH_2)_{11}$—CH=CH—$(CH_2)_7$—, or —$(CH_2)_7$—CH=CH—$(CH_2)_{11}$—. In some such embodiments, $X^2$ is —$(CH_2)_{16}$—, —$(CH_2)_{18}$—, —$(CH_2)_{19}$—, —$(CH_2)_{22}$—, —$(CH_2)_{25}$—, —$(CH_2)_{28}$—, —$(CH_2)_7$—CH=CH—$(CH_2)_7$—, —$(CH_2)_9$—CH=CH—$(CH_2)_7$—, —$(CH_2)_7$—CH=CH—$(CH_2)_9$—, —$(CH_2)_7$—CH=CH—$CH_2$—CH=CH—$(CH_2)_7$—, —$(CH_2)_7$—CH=CH—$CH_2$—CH=CH—$CH_2$—CH=CH—$(CH_2)_7$—, —$(CH_2)_7$—CH=CH—$CH_2$—CH=CH—$CH_2$—, or —$(CH_2)_7$—CH=CH—$CH_2$—CH=CH—$CH_2$—CH=CH—$CH_2$—CH=CH—$(CH_2)_7$—. In some such embodiments, $X^2$ is —$(CH_2)_{16}$—, —$(CH_2)_{19}$—, —$(CH_2)_{22}$—, —$(CH_2)_{25}$—, —$(CH_2)_{28}$—, —$(CH_2)_7$—CH=CH—$(CH_2)_7$—, —$(CH_2)_7$—CH=CH—$CH_2$—CH=CH—$(CH_2)_7$—, —$(CH_2)_7$—CH=CH—$CH_2$—CH=CH—$CH_2$—, —$(CH_2)_7$—CH=CH—$CH_2$—CH=CH—$CH_2$—CH=CH—$(CH_2)_7$—, or —$(CH_2)_7$—CH=CH—$CH_2$—CH=CH—$CH_2$—CH=CH—$CH_2$—CH=CH—$(CH_2)_7$—. In some further such embodiments, $X^2$ is —$(CH_2)_7$—CH=CH—$(CH_2)_7$—, —$(CH_2)_9$—CH=CH—$(CH_2)_7$—, —$(CH_2)_7$—CH=CH—$(CH_2)_9$—, —$(CH_2)_7$—CH=CH—$CH_2$—CH=CH—$(CH_2)_7$—, —$(CH_2)_7$—CH=CH—$CH_2$—CH=CH—$CH_2$—CH=CH—$(CH_2)_7$—, —$(CH_2)_7$—CH=CH—$CH_2$—CH=CH—$CH_2$—, or —$(CH_2)_7$—CH=CH—$CH_2$—CH=CH—$CH_2$—CH=CH—$CH_2$—CH=CH—$(CH_2)_7$—. In some further such embodiments, $X^2$ is —$(CH_2)_7$—CH=CH—$(CH_2)_7$—, —$(CH_2)_7$—CH=CH—$CH_2$—CH=CH—$(CH_2)_7$—, —$(CH_2)_7$—CH=CH—$CH_2$—CH=CH—$CH_2$—, —$(CH_2)_7$—CH=CH—$(CH_2)_7$—, —$(CH_2)_7$—CH=CH—$CH_2$—CH=CH—$CH_2$—, —$(CH_2)_7$—CH=CH—$CH_2$—CH=CH—$CH_2$—CH=CH—$(CH_2)_7$—, or —$(CH_2)_7$—CH=CH—$CH_2$—CH=CH—$CH_2$—CH=CH—$CH_2$—CH=CH—$(CH_2)_7$—.

$R^1$ can have any suitable value. In some embodiments of any of the aforementioned embodiments, $R^1$ is $C_{1-24}$ alkyl, or $C_{11-24}$ alkyl, or $C_{13-24}$ alkyl, or $C_{15-24}$ alkyl. In some such embodiments, $R^1$ is undecyl, tridecyl, pentadecyl, or heptadecyl. In some further such embodiments, $R^1$ is pentadecyl or heptadecyl. In some embodiments of any of the aforementioned embodiments, $R^1$ is $C_{2-24}$ alkenyl or $C_{9-24}$ alkenyl. In some such embodiments, $R^1$ is 8-heptadecenyl, 10-heptadecenyl, 12-heneicosenyl, 8,11-heptadecadienyl, 8,11,14-heptadecatrienyl, 8-nonenyl, 8-decenyl, 8-undecenyl, 10-undecenyl, 8-dodecenyl, 12-tridecenyl, 12-tetradecenyl, 12-pentadecenyl, 12-hexadecenyl, 9-methyl-8-decenyl, 9-methyl-8-undecenyl, 10-methyl-8-undecenyl, 13-methyl-12-tetradecenyl, 13-methyl-12-pentadecenyl, 14-methyl-12-pentadecenyl, 8,11-dodecadienyl, 8,11-tridecadienyl, 8,11-tetradecadienyl, 8,11-pentadecadienyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 8,11,14-pentadecatrienyl, 8,11,14-hexadecatrienyl, 8,11,14-heptadecatrienyl, or 8,11,14-octadecatrienyl. In some further such embodiments, $R^1$ is 8-heptadecenyl, 10-heptadecenyl, 8,11-heptadecadienyl, or 8,11,14-heptadecatrienyl. In some further such embodiments, $R^1$ is 8-heptadecenyl, 8,11-heptadecadienyl, or 8,11,14-heptadecatrienyl. In some such embodiments, $R^1$ is 8-nonenyl, 8-decenyl, 8-undecenyl, 10-undecenyl, 8-dodecenyl, 8,11-dodecadienyl, 8,11-tridecadienyl, 12-tridecenyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, $R^1$ is 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, $R^1$ is 8-nonenyl, 8-undecenyl, 8,11-dodecadienyl, 8,11-tetradecadienyl, or 8,11,14-pentadecatrienyl. In some embodiments, $R^1$ is an oligomeric glyceride moiety.

$R^2$ can have any suitable value. In some embodiments of any of the aforementioned embodiments, $R^2$ is $C_{1-24}$ alkyl, or $C_{11-24}$ alkyl, or $C_{13-24}$ alkyl, or $C_{15-24}$ alkyl. In some such embodiments, $R^2$ is undecyl, tridecyl, pentadecyl, or heptadecyl. In some further such embodiments, $R^2$ is pentadecyl or heptadecyl. In some embodiments of any of the aforementioned embodiments, $R^2$ is $C_{2-24}$ alkenyl or $C_{9-24}$ alkenyl. In some such embodiments, $R^2$ is 8-heptadecenyl, 10-heptadecenyl, 12-heneicosenyl, 8,11-heptadecadienyl, 8,11,14-heptadecatrienyl, 8-nonenyl, 8-decenyl, 8-undecenyl, 10-undecenyl, 8-dodecenyl, 12-tridecenyl, 12-tetradecenyl, 12-pentadecenyl, 12-hexadecenyl, 9-methyl-8-decenyl, 9-methyl-8-undecenyl, 10-methyl-8-undecenyl, 13-methyl-12-tetradecenyl, 13-methyl-12-pentadecenyl, 14-methyl-12-pentadecenyl, 8,11-dodecadienyl, 8,11-tridecadienyl, 8,11-tetradecadienyl, 8,11-pentadecadienyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 8,11,14-pentadecatrienyl, 8,11,14-hexadecatrienyl, 8,11,14-heptadecatrienyl, or 8,11,14-octadecatrienyl. In some further such embodiments, $R^2$ is 8-heptadecenyl, 10-heptadecenyl, 8,11-heptadecadienyl, or 8,11,14-heptadecatrienyl. In some further such embodiments, $R^2$ is 8-heptadecenyl, 8,11-heptadecadienyl, or 8,11,14-heptadecatrienyl. In some such embodiments, $R^2$ is 8-nonenyl, 8-decenyl, 8-undecenyl, 10-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, $R^2$ is 8-nonenyl, 8-decenyl, 8-undecenyl, 8-dodecenyl, 8,11-dodecadienyl, 8,11-tridecadienyl, 12-tridecenyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, $R^2$ is 8-nonenyl, 8-undecenyl, 8,11-dodecadienyl, 8,11-tetradecadienyl, or 8,11,14-pentadecatrienyl. In some embodiments, $R^2$ is an oligomeric glyceride moiety.

$R^3$ can have any suitable value. In some embodiments of any of the aforementioned embodiments, $R^3$ is $C_{1-24}$ alkyl, or $C_{11-24}$ alkyl, or $C_{13-24}$ alkyl, or $C_{15-24}$ alkyl. In some such embodiments, $R^3$ is undecyl, tridecyl, pentadecyl, or heptadecyl. In some further such embodiments, $R^3$ is pentadecyl or heptadecyl. In some embodiments of any of the aforementioned embodiments, $R^3$ is $C_{2-24}$ alkenyl or $C_{9-24}$ alkenyl. In some such embodiments, $R^3$ is 8-heptadecenyl, 10-heptadecenyl, 12-heneicosenyl, 8,11-heptadecadienyl, 8,11,14-heptadecatrienyl, 8-nonenyl, 8-decenyl, 8-undecenyl, 10-undecenyl, 8-dodecenyl, 12-tridecenyl, 12-tetradecenyl, 12-pentadecenyl, 12-hexadecenyl, 9-methyl-8-decenyl, 9-methyl-8-undecenyl, 10-methyl-8-undecenyl, 13-methyl-12-tetradecenyl, 13-methyl-12-pentadecenyl, 14-methyl-12-pentadecenyl, 8,11-dodecadienyl, 8,11-tridecadienyl, 8,11-tetradecadienyl, 8,11-pentadecadienyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 8,11,14-pentadecatrienyl, 8,11,14-hexadecatrienyl, 8,11,14-heptadecatrienyl, or 8,11,14-octadecatrienyl. In some further such embodiments, $R^3$ is 8-heptadecenyl, 10-heptadecenyl, 8,11-heptadecadienyl, or 8,11,14-heptadecatrienyl. In some further such embodiments, $R^3$ is 8-heptadecenyl, 8,11-heptadecadienyl, or 8,11,14-heptadecatrienyl. In some such embodiments, $R^3$ is 8-nonenyl, 8-decenyl, 8-undecenyl, 10-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, $R^3$ is 8-nonenyl, 8-decenyl, 8-undecenyl, 8-dodecenyl, 8,11-dodecadienyl, 8,11-tridecadienyl, 12-tridecenyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, $R^3$ is 8-nonenyl, 8-undecenyl, 8,11-dodecadienyl, 8,11-tetradecadienyl, or 8,11,14-pentadecatrienyl. In some embodiments, $R^3$ is an oligomeric glyceride moiety.

$R^4$ can, in each of its instances, have any suitable value. In some embodiments of any of the aforementioned embodiments, $R^4$, in at least one instance, is $C_{1-24}$ alkyl, or $C_{11-24}$ alkyl, or $C_{13-24}$ alkyl, or $C_{15-24}$ alkyl. In some such embodiments, $R^4$ is, in at least one instance, undecyl, tridecyl, pentadecyl, or heptadecyl. In some further such embodiments, $R^4$ is, in at least one instance, pentadecyl or heptadecyl. In some embodiments of any of the aforementioned embodiments, $R^4$ is, in at least one instance, $C_{2-24}$ alkenyl or $C_{9-24}$ alkenyl. In some such embodiments, $R^4$ is, in at least one instance, 8-heptadecenyl, 10-heptadecenyl, 12-heneicosenyl, 8,11-heptadecadienyl, 8,11,14-heptadecatrienyl, 8-nonenyl, 8-decenyl, 8-undecenyl, 10-undecenyl, 8-dodecenyl, 12-tridecenyl, 12-tetradecenyl, 12-pentadecenyl, 12-hexadecenyl, 9-methyl-8-decenyl, 9-methyl-8-undecenyl, 10-methyl-8-undecenyl, 13-methyl-12-tetradecenyl, 13-methyl-12-pentadecenyl, 14-methyl-12-pentadecenyl, 8,11-dodecadienyl, 8,11-tridecadienyl, 8,11-tetradecadienyl, 8,11-pentadecadienyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 8,11,14-pentadecatrienyl, 8,11,14-hexadecatrienyl, 8,11,14-heptadecatrienyl, or 8,11,14-octadecatrienyl. In some further such embodiments, $R^4$ is, in at least one instance, 8-heptadecenyl, 10-heptadecenyl, 8,11-heptadecadienyl, or 8,11,14-heptadecatrienyl. In some further such embodiments, $R^4$ is, in at least one instance, 8-heptadecenyl, 8,11-heptadecadienyl, or 8,11,14-heptadecatrienyl. In some such embodiments, $R^4$ is, in at least one instance, 8-nonenyl, 8-decenyl, 8-undecenyl, 10-undecenyl, 8-dodecenyl, 8,11-dodecadienyl, 8,11-tridecadienyl, 12-tridecenyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, $R^4$ is, in at least one instance, 8-nonenyl, 8-decenyl, 8-undecenyl, 8-dodecenyl, 8,11-dodecadienyl, 8,11-tridecadienyl, 12-tridecenyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, $R^4$ is, in at least one instance, 8-nonenyl, 8-undecenyl, 8,11-dodecadienyl, 8,11-tetradecadienyl, or 8,11,14-pentadecatrienyl. In some embodiments, $R^4$, in at least one instance, is an oligomeric glyceride moiety.

$R^5$ can have any suitable value. In some embodiments of any of the aforementioned embodiments, $R^5$ is $C_{1-24}$ alkyl, or $C_{11-24}$ alkyl, or $C_{13-24}$ alkyl, or $C_{15-24}$ alkyl. In some such embodiments, $R^5$ is undecyl, tridecyl, pentadecyl, or heptadecyl. In some further such embodiments, $R^5$ is pentadecyl or heptadecyl. In some embodiments of any of the aforementioned embodiments, $R^5$ is $C_{2-24}$ alkenyl or $C_{9-24}$ alkenyl. In some such embodiments, $R^5$ is 8-heptadecenyl, 10-heptadecenyl, 12-heneicosenyl, 8,11-heptadecadienyl, 8,11,14-heptadecatrienyl, 8-nonenyl, 8-decenyl, 8-undecenyl, 10-undecenyl, 8-dodecenyl, 12-tridecenyl, 12-tetradecenyl, 12-pentadecenyl, 12-hexadecenyl, 9-methyl-8-decenyl, 9-methyl-8-undecenyl, 10-methyl-8-undecenyl, 13-methyl-12-tetradecenyl, 13-methyl-12-pentadecenyl, 14-methyl-12-pentadecenyl, 8,11-dodecadienyl, 8,11-tridecadienyl, 8,11-tetradecadienyl, 8,11-pentadecadienyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 8,11,14-pentadecatrienyl, 8,11,14-hexadecatrienyl, 8,11,14-heptadecatrienyl, or 8,11,14-octadecatrienyl. In some further such embodiments, $R^5$ is 8-heptadecenyl, 10-heptadecenyl, 8,11-heptadecadienyl, or 8,11,14-heptadecatrienyl. In some further such embodiments, $R^5$ is 8-heptadecenyl, 8,11-heptadecadienyl, or 8,11,14-heptadecatrienyl. In some such embodiments, $R^5$ is 8-nonenyl, 8-decenyl, 8-undecenyl, 10-undecenyl, 8-dodecenyl, 8,11-dodecadienyl, 12-tridecenyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, $R^5$ is 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, $R^5$ is 8-nonenyl, 8-undecenyl, 8,11-dodecadienyl, 8,11-tetradecadienyl, or 8,11,14-pentadecatrienyl. In some embodiments, $R^5$ is an oligomeric glyceride moiety.

The variable n can have any suitable value. In some embodiments of any of the aforementioned embodiments, n is an integer from 3 to 250, or from 5 to 180, or from 6 to 140, or from 8 to 70, or from 9 to 40, or from 9 to 26. In some other embodiments, n is an integer from 3 to 35, or from 5 to 30, or from 7 to 25, or from 10 to 20.

In some embodiments of any of the aforementioned embodiments, the glyceride polymers include only compounds wherein at least one of $R^1$, $R^2$, $R^3$, and $R^5$, or at least one instance of $R^4$, is selected from the group consisting of: 8-nonenyl; 8-decenyl; 8-undecenyl; 10-undecenyl, 12-tridecenyl; 8-dodecenyl; 8,11-dodecadienyl; 8,11-tridecadienyl; 8,11-tetradecadienyl; 8,11-pentadecadienyl; 8,11,14-pentadecatrienyl; 8,11,14-hexadecatrienyl; 8,11,14-heptadecatrienyl; and 8,11,14-octadecatrienyl. In some other embodiments of any of the aforementioned embodiments, the glyceride polymers include only compounds wherein at least one of $R^1$, $R^2$, $R^3$, and $R^5$, or at least one instance of $R^4$, is selected from the group consisting of: 8-nonenyl; 8-decenyl; 8-undecenyl; 8-dodecenyl; 8,11-dodecadienyl; 8,11-tridecadienyl; 8,11-tetradecadienyl; 8,11-pentadecadienyl; 8,11,14-pentadecatrienyl; 8,11,14-hexadecatrienyl; 8,11,14-heptadecatrienyl; and 8,11,14-octadecatrienyl. In some other embodiments of any of the aforementioned embodiments, the glyceride polymers include only compounds wherein at least one of $R^1$, $R^2$, $R^3$, and $R^5$, or at least one instance of $R^4$, is selected from the group consisting of: 8-nonenyl; 8-undecenyl; 8,11-dodecadienyl; 8,11-tetradecadienyl; or 8,11,14-pentadecatrienyl. In some embodiments of any of the aforementioned embodiments, the glyceride polymers include only compounds wherein at least one of $R^1$, $R^2$, $R^3$, and $R^5$, or at least one instance of $R^4$, is selected from the group consisting of: 8-nonenyl; 8-decenyl; 8-undecenyl; 10-undecenyl; 12-tridecenyl; 8-dodecenyl; 8,11-dodecadienyl; 8,11-tridecadienyl; 8,11-tetradecadienyl; 8,11-pentadecadienyl; 8,11,14-pentadecatrienyl; and 8,11,14-hexadecatrienyl. In some other embodiments of any of the aforementioned embodiments, the glyceride polymers include only compounds wherein at least one of $R^1$, $R^2$, $R^3$, and $R^5$, or at least one instance of $R^4$, is selected from the group consisting of: 8-nonenyl; 8-decenyl; 8-undecenyl; 8-dodecenyl; 8,11-dodecadienyl; 8,11-tridecadienyl; 8,11-tetradecadienyl; 8,11-pentadecadienyl; 8,11,14-pentadecatrienyl; and 8,11,14-hexadecatrienyl. In some other embodiments of any of the aforementioned embodiments, the glyceride polymers include only compounds wherein at least one of $R^1$, $R^2$, $R^3$, and $R^5$, or at least one instance of $R^4$, is $C_{2-15}$ alkenyl, or $C_{2-14}$ alkenyl, or $C_{5-14}$ alkenyl, or $C_{2-13}$ alkenyl, or $C_{2-12}$ alkenyl, or $C_{5-12}$ alkenyl.

In a another aspect, glyceride copolymers, which comprises constitutional units formed from reacting two or more monomers in the presence of a metathesis catalyst, the two or more monomers comprise monomer compounds of formula (IIa):

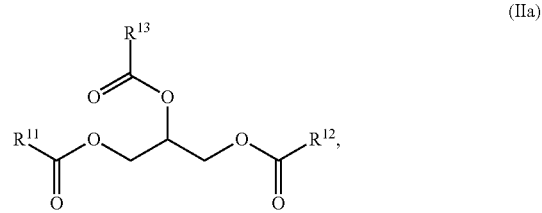

(IIa)

and monomer compounds of formula (IIb):

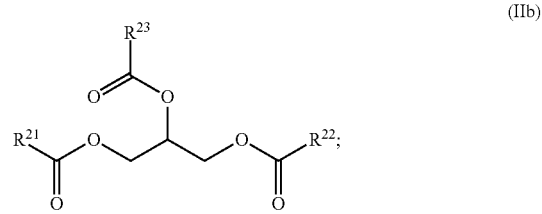

(IIb)

wherein, each $R^{11}$, $R^{12}$, and $R^{13}$ is independently a $C_{1-24}$ alkyl, a substituted $C_{1-24}$ alkyl wherein the substituent is one or more —OH moieties, a $C_{2-24}$ alkenyl, or a substituted $C_{2-24}$ alkenyl wherein the substitute is one or more —OH moieties with the proviso that at least one of $R^{11}$, $R^{12}$, and $R^{13}$ is a $C_{2-24}$ alkenyl or a substituted $C_{2-24}$ alkenyl wherein the subsitiutent is one or more —OH moieties; each $R^{21}$, $R^{22}$, and $R^{23}$ is independently a $C_{1-24}$ alkyl, a substituted $C_{1-24}$ alkyl wherein the substituent is one or more —OH moieties, a $C_{2-24}$ alkenyl, or a substituted $C_{2-24}$ alkenyl wherein the subsitiutent is one or more —OH moieties, with the proviso that at least one of $R^{21}$, $R^{22}$, and $R^{23}$ is 8-nonenyl; 8-decenyl; 8-undecenyl; 8-dodecenyl; 8,11-dodecadienyl; 8,11-tridecadienyl; 8,11-tetradecadienyl; 8,11-pentadecadienyl; 8,11,14-pentadecatrienyl; 8,11,14-hexadecatrienyl; 8,11,14-octadecatrienyl; 9-methyl-8-decenyl; 9-methyl-8-undecenyl; 10-methyl-8-undecenyl; 12-methyl-8,11-tridecadienyl; 12-methyl-8,11-tetradecadienyl; 13-methyl-8,11-tetradecadienyl; 15-methyl-8,11,14-hexadecatrienyl; 15-methyl-8,11,14-heptadecatrienyl; 16-methyl-8,11,14-heptadecatrienyl; 12-tridecenyl; 12-tetradecenyl; 12-pentadecenyl; 12-hexadecenyl; 13-methyl-12-tetradecenyl; 13-methyl-12-pentadecenyl; and 14-methyl-12-pentadecenyl.

The variables $R^{11}$, $R^{12}$, and $R^{13}$ can have any suitable value. In some embodiments, $R^{11}$, $R^{12}$, and $R^{13}$ are independently $C_{1-24}$ alkyl, or $C_{11-24}$ alkyl, or $C_{13-24}$ alkyl, or $C_{15-24}$ alkyl. In some such embodiments, $R^{11}$, $R^{12}$, and $R^{13}$ are independently undecyl, tridecyl, pentadecyl, or heptadecyl. In some further such embodiments, $R^{11}$, $R^{12}$, and $R^{13}$ are independently pentadecyl or heptadecyl. In some embodiments of any of the aforementioned embodiments, $R^{11}$, $R^{12}$, and $R^{13}$ are independently $C_{2-24}$ alkenyl, or $C_{9-24}$ alkenyl, or $C_{11-24}$ alkenyl, or $C_{13-24}$ alkenyl, or $C_{15-24}$ alkenyl. In some such embodiments, $R^{11}$, $R^{12}$, and $R^{13}$ are independently 8-heptadecenyl, 10-heptadecenyl, 8,11-heptadecadienyl or 8,11,14-heptadecatrienyl. In some further such embodiments, $R^{11}$, $R^{12}$, and $R^{13}$ are independently 8-heptadecenyl, 8,11-heptadecadienyl, or 8,11,14-heptadecatrienyl.

The variables $R^{21}$, $R^{22}$, and $R^{23}$ can have any suitable value. In some embodiments of any of the foregoing embodiments, zero, one, or two of $R^{21}$, $R^{22}$, and $R^{23}$ are independently $C_{1-24}$ alkyl, or $C_{11-24}$ alkyl, or $C_{13-24}$ alkyl, or $C_{15-24}$ alkyl. In some such embodiments, zero, one, or two of $R^{21}$, $R^{22}$, and $R^{23}$ are independently undecyl, tridecyl, pentadecyl, or heptadecyl. In some further such embodiments, zero, one, or two of $R^{21}$, $R^{22}$, and $R^{23}$ are independently pentadecyl or heptadecyl. In some embodiments of any of the aforementioned embodiments, zero, one, or two of $R^{21}$, $R^{22}$, and $R^{23}$ are independently $C_{2-24}$ alkenyl, or $C_{9-24}$ alkenyl, or $C_{11-24}$ alkenyl, or $C_{13-24}$ alkenyl, or $C_{15-24}$ alkenyl. In some such embodiments, zero, one, or two of $R^{21}$, $R^{22}$, and $R^{23}$ are independently 8-heptadecenyl, 10-heptadecenyl, 8,11-heptadecadienyl or 8,11,14-heptadecatrienyl. In some further such embodiments, zero, one, or two of $R^{21}$, $R^{22}$, and $R^{23}$ are independently 8-heptadecenyl, 8,11-heptadecadienyl, or 8,11,14-heptadecatrienyl.

In some other embodiments of any of the foregoing embodiments, one, two, or three of $R^{11}$, $R^{22}$, and $R^{23}$ are independently $C_{2-15}$ alkenyl, or $C_{2-14}$ alkenyl, $C_{5-14}$ alkenyl, or $C_{2-13}$ alkenyl, or $C_{2-12}$ alkenyl, or $C_{5-12}$ alkenyl. In some such embodiments, one, two, or three of $R^{21}$, $R^{22}$, and $R^{23}$ are independently 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-octadecatrienyl, 9-methyl-8-decenyl, 9-methyl-8-undecenyl, 10-methyl-8-undecenyl, 12-methyl-8,11-tridecadienyl, 12-methyl-8,11-tetradecadienyl, 13-methyl-8,11-tetradecadienyl, 15-methyl-8,11,14-hexadecatrienyl, 15-methyl-8,11,14-heptadecatrienyl, 16-methyl-8,11,14-heptadecatrienyl, 12-tridecenyl, 12-tetradecenyl, 12-pentadecenyl, 12-hexadecenyl, 13-methyl-12-tetradecenyl, 13-methyl-12-pentadecenyl, and 14-methyl-12-pentadecenyl, 10-undecenyl, 8,11,14-heptadecatrienyl, or 8,11,14-octadecatrienyl. In some further such embodiments, one, two, or three of $R^{21}$, $R^{22}$, and $R^{23}$ are independently 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, one, two, or three of $R^{21}$, $R^{22}$, and $R^{23}$ are independently 8-nonenyl, 8-undecenyl, 8,11-dodecadienyl, 8,11-tetradecadienyl, or 8,11,14-pentadecatrienyl.

The glyceride copolymers disclosed herein can have any suitable molecular weight. In some embodiments of any of the aforementioned embodiments, the glyceride copolymer has a weight average molecular weight ranging from 4,000 g/mol to 150,000 g/mol, or from 5,000 g/mol to 130,000 g/mol, or from 6,000 g/mol to 100,000 g/mol, or from 7,000 g/mol to 50,000 g/mol, or from 8,000 g/mol to 30,000 g/mol, or from 8,000 g/mol to 20,000 g/mol.

In some embodiments, the glyceride copolymer has a number-average molecular weight ($M_n$) from 2,000 g/mol to 150,000 g/mol, or from 3,000 g/mol to 30,000 g/mol, or from 4,000 g/mol to 20,000 g/mol.

The glyceride copolymers disclosed herein can have any suitable ratio of constitutional units formed from monomer compounds of formula (IIa) to constitutional units formed from monomer compounds of formula (IIb). In some embodiments of any of the aforementioned embodiments, the number ratio of constitutional units formed from monomer compounds of formula (IIa) to constitutional units formed from monomer compounds of formula (IIb) is no more than 10:1, or no more than 9:1, or no more than 8:1, or no more than 7:1, or no more than 6:1, or no more than 5:1, or no more than 4:1, or no more than 3:1, or no more than 2:1, or no more than 1:1. The glyceride copolymers disclosed herein can include additional constitutional units not formed from monomer compounds of either formula (IIa) or formula (IIb), including, but not limited to, constitutional units formed from other unsaturated polyol esters, such as unsaturated diols, triols, and the like.

Or, in some other embodiments of any of the foregoing embodiments, the two or more monomers are reacted in the presence of the metathesis catalyst as part of a reaction mixture, wherein the weight-to-weight ratio of the monomer compounds of formula (IIa) to the monomer compounds of formula (IIb) in the reaction mixture is no more than 10:1, or no more than 9:1, or no more than 8:1, or no more than 7:1, or no more than 6:1, or no more than 5:1, or no more than 4:1, or no more than 3:1, or no more than 2:1, or no more than 1:1. In some embodiments, the reaction mixture includes additional monomer compounds besides monomer compounds of formula (IIa) and formula (IIb).

Any suitable metathesis catalyst can be used, as described in more detail below. In some embodiments of any of the aforementioned embodiments, the metathesis catalyst is an organoruthenium compound, an organoosmium compound, an organotungsten compound, or an organomolybdenum compound.

In another aspect, the disclosure provides glyceride copolymers, which comprises constitutional units formed from reacting two or more monomers in the presence of a first metathesis catalyst; wherein the first monomer is an unsaturated natural oil glyceride, and the second monomer is an unsaturated alkenylized natural oil glyceride. In another aspect, the disclosure provides glyceride copolymers, which comprises constitutional units formed from reacting two or more monomers in the presence of a first metathesis catalyst; wherein the first monomer is an unsaturated synthetic polyol ester, and the second monomer is an unsaturated alkenylized natural oil glyceride. In another aspect, the disclosure provides glyceride copolymers, which comprises constitutional units formed from reacting two or more monomers in the presence of a first metathesis catalyst; wherein the first monomer is an unsaturated natural oil glyceride, and the second monomer is an unsaturated alkenylized synthetic polyol ester. In another aspect, the disclosure provides glyceride copolymers, which comprises constitutional units formed from reacting two or more monomers in the presence of a first metathesis catalyst; wherein the first monomer is an unsaturated synthetic polyol ester, and the second monomer is an unsaturated alkenylized synthetic polyol ester. In another aspect, the disclosure provides glyceride copolymers, which comprises constitutional units formed from reacting two or more monomers in the presence of a first metathesis catalyst; wherein the first monomer is a first unsaturated alkenylized synthetic polyol ester, and the second monomer is a second unsaturated alkenylized synthetic polyol ester. In another aspect, the disclosure provides glyceride copolymers, which comprises constitutional units formed from reacting two or more monomers in the presence of a first metathesis; wherein the first monomer is a first unsaturated alkenylized natural oil glyceride, and the second monomer is a second unsaturated alkenylized natural oil glyceride. In another aspect, the disclosure provides glyceride copolymers, which comprises constitutional units formed from reacting two or more monomers in the presence of a first metathesis; wherein the first monomer is an unsaturated alkenylized natural oil glyceride, and the second monomer is an unsaturated alkenylized synthetic polyol ester.

In some embodiments, the unsaturated alkenylized natural oil glyceride is formed from the reaction of a second unsaturated natural oil glyceride with a short-chain alkene in the presence of a second metathesis catalyst. In some such embodiments, the unsaturated alkenylized natural oil glyceride has a lower molecular weight than the second unsaturated natural oil glyceride. Any suitable short-chain alkene can be used, according to the embodiments described above. In some embodiments, the short-chain alkene is a $C_{2-8}$ olefin, or a $C_{2-6}$ olefin. In some such embodiments, the short-chain alkene is ethylene, propylene, 1-butene, 2-butene, isobutene, 1-pentene, 2-pentene, 1-hexene, 2-hexene, or 3-hexene. In some further such embodiments, the short-chain alkene is ethylene, propylene, 1-butene, 2-butene, or isobutene. In some embodiments, the short-chain alkene is ethylene. In some embodiments, the short-chain alkene is propylene. In some embodiments, the short-chain alkene is 1-butene. In some embodiments, the short-chain alkene is 2-butene. In some other embodiments, the short-chain alkene is a branched short-chain alkene. Non-limiting examples of such branched short-chain alkenes include, but are not limited to, isobutylene, 3-methyl-1-butene, 3-methyl-1-pentene, and 4-methyl-1-pentene.

The unsaturated natural oil glyceride can be obtained from any suitable natural oil source. In some embodiments of any of the aforementioned embodiments, the unsaturated natural oil glycerides are obtained from synthesized oils, natural oils (e.g., vegetable oils, algae oils, bacterial and/or fungal derived oils, and animal fats), combinations of these, and the like. In some embodiments, the natural oil is obtained from a vegetable oil, such as a seed oil. Recycled used vegetable oils may also be used. In some further embodiments, the vegetable oil is Abyssinian oil, Almond Oil, Apricot Oil, Apricot Kernel oil, Argan oil, Avocado Oil, Babassu Oil, Baobab Oil, Black Cumin Oil, Black Currant Oil, Borage Oil, Camelina oil, Carinata oil, Canola (low erucic acid rapeseed) oil, Castor oil, Cherry Kernel Oil, Coconut oil, Corn oil, Cottonseed oil, Echium Oil, Evening Primrose Oil, Flax Seed Oil, Grape Seed Oil, Grapefruit Seed Oil, Hazelnut Oil, Hemp Seed Oil, Jatropha oil, Jojoba Oil, Kukui Nut Oil, Linseed Oil, Macadamia Nut Oil, Meadowfoam Seed Oil, Moringa Oil, Mustard Seed Oil, Neem Oil, Olive Oil, Palm Oil, Palm Kernel Oil, Peach Kernel Oil, Peanut Oil, Pecan Oil, Pennycress oil, Perilla Seed Oil, Pistachio Oil, Pomegranate Seed Oil, Pongamia oil, Pumpkin Seed Oil, Raspberry Oil, Red Palm Olein, Rice Bran Oil, Rosehip Oil, Safflower Oil, Seabuckthorn Fruit Oil, Sesame Seed Oil, Shea Olein, Sunflower Oil, Soybean Oil, Tonka Bean Oil, Tung Oil, Walnut Oil, Wheat Germ Oil, High Oleoyl Soybean Oil, High Oleoyl Sunflower Oil, High Oleoyl Safflower Oil, High Erucic Acid Rapeseed Oil, and mixtures thereof. In some embodiments, the vegetable oil is palm oil. In some embodiments, the vegetable oil is soybean oil. In some embodiments, the vegetable oil is canola oil. In some embodiments, a representative, non-limiting example of animal fat is lard, tallow, chicken fat, yellow grease, fish oil, emu oil, combinations of these, and the like. In some embodiments, a representative non-limiting example of a synthesized oil includes tall oil, which is a byproduct of wood pulp manufacture. In some embodiments, the natural oil is refined, bleached, and/or deodorized.

Natural oils of the type described herein typically are composed of triglycerides of fatty acids. These fatty acids may be either saturated, monounsaturated or polyunsaturated and contain varying chain lengths ranging from $C_8$ to $C_{30}$. The most common fatty acids include saturated fatty acids such as lauric acid (dodecanoic acid), myristic acid (tetradecanoic acid), palmitic acid (hexadecanoic acid), stearic acid (octadecanoic acid), arachidic acid (eicosanoic acid), and lignoceric acid (tetracosanoic acid); unsaturated acids include such fatty acids as palmitoleic (a $C_{16}$ acid), and oleic acid (a $C_{18}$ acid); polyunsaturated acids include such fatty acids as linoleic acid (a di-unsaturated $C_{18}$ acid), linolenic acid (a tri-unsaturated $C_{18}$ acid), and arachidonic acid (a tetra-unsubstituted $C_{20}$ acid). The natural oils are further comprised of esters of these fatty acids in random placement onto the three sites of the trifunctional glycerine molecule. Different natural oils will have different ratios of these fatty acids, and within a given natural oil there is a range of these acids as well depending on such factors as where a vegetable or crop is grown, maturity of the vegetable or crop, the weather during the growing season, etc. Thus, it is difficult to have a specific or unique structure for any given natural oil, but rather a structure is typically based on some statistical average. For example soybean oil contains a mixture of predominantly $C_{16}$ and $C_{18}$ acid groups where stearic acid, oleic acid, linoleic acid, and linolenic acid are in the ratio of about 15:24:50:11, and an average number of double bonds of 4.4-4.7 per triglyceride. One method of quantifying the number of double bonds is the iodine value (IV) which is defined as the number of grams of iodine that will react with 100 grams of oil. Therefore for soybean oil, the average iodine value range is from 120-140. Soybean oil may comprise about 95% by weight or greater (e.g., 99% weight or greater) triglycerides of fatty acids. Major fatty acids in the polyol esters of soybean oil include saturated fatty acids, as a non-limiting example, palmitic acid (hexadecanoic acid) and stearic acid (octadecanoic acid), and unsaturated fatty acids, as a non-limiting example, oleic acid (9-octadecenoic acid), linoleic acid (9,12octadecadienoic acid), and linolenic acid (9,12,15-octadecatrienoic acid).

In an exemplary embodiment, the vegetable oil is canola oil, for example, refined, bleached, and deodorized canola oil (i.e., RBD canola oil). Canola oil is an unsaturated polyol ester of glycerol that typically comprises about 95% weight or greater (e.g., 99% weight or greater) triglycerides of fatty acids. Major fatty acids in the polyol esters of canola oil include saturated fatty acids, for example, palmitic acid (hexadecanoic acid) and stearic acid (octadecanoic acid), and unsaturated fatty acids, for example, oleic acid (9-octadecenoic acid), linoleic acid (9,12-octadecadienoic acid), and linolenic acid (9,12,15-octadecatrienoic acid). Canola oil is a highly unsaturated vegetable oil with many of the triglyceride molecules having at least two unsaturated fatty acids (i.e., a polyunsaturated triglyceride).

In some embodiments, the unsaturated alkenylized synthetic polyol ester is formed from the reaction of an unsaturated synthetic polyol ester with a short-chain alkene in the presence of a second metathesis catalyst. In some such embodiments, the unsaturated alkenylized synthetic polyol ester has a lower molecular weight than the second unsaturated synthetic polyol ester. Any suitable short-chain alkene can be used, according to the embodiments described above. In some embodiments, the short-chain alkene is a $C_{2-8}$ olefin, or a $C_{2-6}$ olefin. In some such embodiments, the short-chain alkene is ethylene, propylene, 1-butene, 2-butene, isobutene, 1-pentene, 2-pentene, 1-hexene, 2-hexene, or 3-hexene. In some further such embodiments, the short-chain alkene is ethylene, propylene, 1-butene, 2-butene, or isobutene. In some embodiments, the short-chain alkene is ethylene. In some embodiments, the short-chain alkene is propylene. In some embodiments, the short-chain alkene is 1-butene. In some embodiments, the short-chain alkene is 2-butene. In some other embodiments, the short-chain alkene is a branched short-chain alkene. Non-limiting examples of such branched short-chain alkenes include, but are not limited to, isobutylene, 3-methyl-1-butene, 3-methyl-1-pentene, and 4-methyl-1-pentene.

The unsaturated synthetic polyol ester includes esters such as those derived from ethylene glycol or propylene glycol, polyethylene glycol, polypropylene glycol, or poly(tetramethylene ether) glycol, esters such as those derived from pentaerythritol, dipentaerythritol, tripentaerythritol, trimethylolpropane, or neopentyl glycol, or sugar esters such as SEFOSE®. Sugar esters such as SEFOSE® include one or more types of sucrose polyesters, with up to eight ester groups that could undergo a metathesis exchange reaction. Sucrose polyesters are derived from a natural resource and therefore, the use of sucrose polyesters can result in a positive environmental impact. Sucrose polyesters are polyester materials, having multiple substitution positions around the sucrose backbone coupled with the chain length, saturation, and derivation variables of the fatty chains. Such sucrose polyesters can have an esterification ("IBAR") of greater than about 5. In one embodiment the sucrose polyester may have an IBAR of from about 5 to about 8. In another embodiment the sucrose polyester has an IBAR of about 5-7, and in another embodiment the sucrose polyester has an IBAR of about 6. In yet another embodiment the sucrose polyester has an IBAR of about 8. As sucrose polyesters are derived from a natural resource, a distribution in the IBAR and chain length may exist. For example a sucrose polyester having an IBAR of 6, may contain a mixture of mostly IBAR of about 6, with some IBAR of about 5 and some IBAR of about 7. Additionally, such sucrose polyesters may have an unsaturation or iodine value ("IV") of about 3 to about 140. In another embodiment the sucrose polyester may have an IV of about 10 to about 120. In yet another embodiment the sucrose polyester may have an IV of about 20 to 100. Further, such sucrose polyesters have a chain length of about $C_{12-20}$ but are not limited to these chain lengths.

Non-limiting examples of sucrose polyesters suitable for use include SEFOSE® 1618S, SEFOSE® 1618U, SEFOSE® 1618H, Sefa Soyate IMF 40, Sefa Soyate LP426, SEFOSE® 2275, SEFOSE® C1695, SEFOSE® C18:0 95, SEFOSE® C1495, SEFOSE® 1618H B6, SEFOSE® 1618S B6, SEFOSE® 1618U B6, Sefa Cottonate, SEFOSE® C1295, Sefa C895, Sefa C1095, SEFOSE® 1618S B4.5, all available from The Procter and Gamble Co. of Cincinnati, Ohio.

Other examples of suitable unsaturated polyol esters may include but not be limited to sorbitol esters, maltitol esters, sorbitan esters, maltodextrin derived esters, xylitol esters, polyglycerol esters, and other sugar derived esters.

The glyceride copolymers disclosed herein can have any suitable molecular weight. In some embodiments of any of the aforementioned embodiments, the glyceride copolymer has a weight average molecular weight ranging from 4,000 g/mol to 150,000 g/mol, or from 5,000 g/mol to 130,000 g/mol, or from 6,000 g/mol to 100,000 g/mol, or from 7,000 g/mol to 50,000 g/mol, or from 8,000 g/mol to 30,000 g/mol, or from 8,000 g/mol to 20,000 g/mol.

In some embodiments, the glyceride copolymer has a number-average molecular weight ($M_n$) from 2,000 g/mol to 150,000 g/mol, or from 3,000 g/mol to 30,000 g/mol, or from 4,000 g/mol to 20,000 g/mol.

The glyceride copolymers disclosed herein can have any suitable ratio of constitutional units formed from the first monomer to constitutional units formed from the second monomer. In some embodiments of any of the aforementioned embodiments, the number ratio of constitutional units formed from the first monomer to constitutional units formed from the second monomer is no more than 10:1, or no more than 9:1, or no more than 8:1, or no more than 7:1, or no more than 6:1, or no more than 5:1, or no more than 4:1, or no more than 3:1, or no more than 2:1, or no more than 1:1. The glyceride copolymers disclosed herein can include additional constitutional units not formed from the first monomer or the second monomer, including, but not limited to, constitutional units formed from other unsaturated polyol esters, such as unsaturated diols, triols, and the like.

Or, in some other embodiments of any of the foregoing embodiments, the two or more monomers are reacted in the presence of the metathesis catalyst as part of a reaction mixture, wherein the weight-to-weight ratio of the first monomer to the second monomer in the reaction mixture is no more than 10:1, or no more than 9:1, or no more than 8:1, or no more than 7:1, or no more than 6:1, or no more than 5:1, or no more than 4:1, or no more than 3:1, or no more than 2:1, or no more than 1:1. In some embodiments, the reaction mixture includes additional monomer compounds besides the first monomer and the second monomer.

Any suitable metathesis catalyst can be used as either the first metathesis catalyst or the second metathesis catalyst, as described in more detail below. In some embodiments of any of the aforementioned embodiments, the first and second metathesis catalysts are an organoruthenium compound, an organoosmium compound, an organo-tungsten compound, or an organomolybdenum compound.

Additional glyceride copolymers are contemplated as products of the synthetic methods and examples disclosed herein.

Synthetic Methods

In a fifth aspect, the disclosure provides methods of forming a glyceride copolymer composition, the methods comprising: (a) providing a reaction mixture comprising a metathesis catalyst and monomer compounds of formula (IIIa):

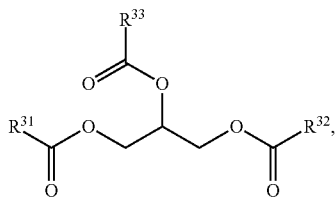

and monomer compounds of formula (IIIb):

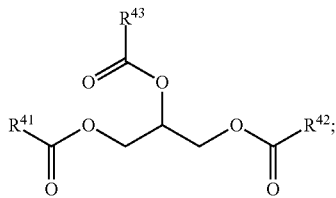

wherein, $R^{31}$, $R^{32}$, and $R^{33}$ are independently $C_{1-24}$ alkyl or $C_{2-24}$ alkenyl, each of which is optionally substituted one or more times by —OH, provided that at least one of $R^{31}$, $R^{32}$, and $R^{33}$ is $C_{2-24}$ alkenyl, which is optionally substituted one or more times by —OH; and $R^{41}$, $R^{42}$, and $R^{43}$ are independently $C_{1-24}$ alkyl or $C_{2-24}$ alkenyl, each of which is optionally substituted one or more times by —OH, provided that at least one of $R^{41}$, $R^{42}$, and $R^{43}$ is 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl; and (b) reacting the monomer compounds of formula (IIIa) with the monomer compounds of formula (IIIb) in the presence of the metathesis catalyst to form the glyceride polymer composition.

The variables $R^{31}$, $R^{32}$, and $R^{33}$ can have any suitable value. In some embodiments, $R^{31}$, $R^{32}$, and $R^{33}$ are independently $C_{1-24}$ alkyl, or $C_{11-24}$ alkyl, or $C_{13-24}$ alkyl, or $C_{15-24}$ alkyl. In some such embodiments, $R^{31}$, $R^{32}$, and $R^{33}$ are independently undecyl, tridecyl, pentadecyl, or heptadecyl. In some further such embodiments, $R^{31}$, $R^{32}$, and $R^{33}$ are independently pentadecyl or heptadecyl. In some embodiments of any of the aforementioned embodiments, $R^{31}$, $R^{32}$, and $R^{33}$ are independently $C_{2-24}$ alkenyl, or $C_{9-24}$ alkenyl, or $C_{11-24}$ alkenyl, or $C_{13-24}$ alkenyl, or $C_{15-24}$ alkenyl. In some such embodiments, $R^{31}$, $R^{32}$, and $R^{33}$ are independently 8-heptadecenyl, 10-heptadecadienyl, 8,11-heptadecadienyl or 8,11,14-heptadecatrienyl. In some further such embodiments, $R^{31}$, $R^{32}$, and $R^{33}$ are independently 8-heptadecenyl, 8,11-heptadecadienyl, or 8,11,14-heptadecatrienyl.

The variables $R^{41}$, $R^{42}$, and $R^{43}$ can have any suitable value. In some embodiments of any of the foregoing embodiments, zero, one, or two of $R^{41}$, $R^{42}$, and $R^{43}$ are independently $C_{1-24}$ alkyl, or $C_{11-24}$ alkyl, or $C_{13-24}$ alkyl, or $C_{15-24}$ alkyl. In some such embodiments, zero, one, or two of $R^{41}$, $R^{42}$, and $R^{43}$ are independently undecyl, tridecyl, pentadecyl, or heptadecyl. In some further such embodiments, zero, one, or two of $R^{41}$, $R^{42}$, and $R^{43}$ are independently pentadecyl or heptadecyl. In some embodiments of any of the aforementioned embodiments, zero, one, or two of $R^{41}$, $R^{42}$, and $R^{43}$ are independently $C_{2-24}$ alkenyl, or $C_{9-24}$ alkenyl, or $C_{11-24}$ alkenyl, or $C_{13-24}$ alkenyl, or $C_{15-24}$ alkenyl. In some such embodiments, zero, one, or two of $R^{41}$, $R^{42}$, and $R^{43}$ are independently 8-heptadecenyl, 10-heptadecenyl, 8,11-heptadecadienyl or 8,11,14-heptadecatrienyl. In some further such embodiments, zero, one, or two of $R^{41}$, $R^{42}$, and $R^{43}$ are independently 8-heptadecenyl, 8,11-heptadecadienyl, or 8,11,14-heptadecatrienyl.

In some other embodiments of any of the foregoing embodiments, one, two, or three of $R^{41}$, $R^{42}$, and $R^{43}$ are independently $C_{2-15}$ alkenyl, or $C_{2-14}$ alkenyl, or $C_{2-13}$ alkenyl, or $C_{2-12}$ alkenyl, or $C_{5-12}$ alkenyl. In some such embodiments, one, two, or three of $R^{41}$, $R^{42}$, and $R^{43}$ are independently 8-nonenyl, 8-decenyl, 8-undecenyl, 10-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, one, two, or three of $R^{41}$, $R^{42}$, and $R^{43}$ are independently 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, one, two, or three of $R^{41}$, $R^{42}$, and $R^{43}$ are independently 8-nonenyl, 8-undecenyl, 8,11-dodecadienyl, 8,11-tetradecadienyl, or 8,11,14-pentadecatrienyl.

The glyceride copolymers formed by the methods disclosed herein can have any suitable molecular weight. In some embodiments of any of the aforementioned embodiments, the glyceride copolymer has a weight average molecular weight ranging from 4,000 g/mol to 150,000 g/mol, or from 5,000 g/mol to 130,000 g/mol, or from 6,000 g/mol to 100,000 g/mol, or from 7,000 g/mol to 50,000 g/mol, or from 8,000 g/mol to 30,000 g/mol, or from 8,000 g/mol to 20,000 g/mol.

The glyceride copolymers formed by the methods disclosed herein can have any suitable ratio of constitutional units formed from monomer compounds of formula (IIIa) to constitutional units formed from monomer compounds of formula (IIIb). In some embodiments of any of the aforementioned embodiments, the number ratio of constitutional units formed from monomer compounds of formula (IIIa) to constitutional units formed from monomer compounds of formula (IIIb) is no more than 10:1, or no more than 9:1, or no more than 8:1, or no more than 7:1, or no more than 6:1, or no more than 5:1, or no more than 4:1, or no more than 3:1, or no more than 2:1, or no more than 1:1. The glyceride copolymers disclosed herein can include additional constitutional units not formed from monomer compounds of either formula (IIIa) or formula (IIIb).

Or, in some other embodiments of any of the foregoing embodiments, the two or more monomers are reacted in the presence of the metathesis catalyst as part of a reaction mixture, wherein the weight-to-weight ratio of the monomer compounds of formula (IIIa) to the monomer compounds of formula (IIIb) in the reaction mixture is no more than 10:1, or no more than 9:1, or no more than 8:1, or no more than 7:1, or no more than 6:1, or no more than 5:1, or no more than 4:1, or no more than 3:1, or no more than 2:1, or no more than 1:1. In some embodiments, the reaction mixture includes additional monomer compounds besides monomer compounds of formula (IIIa) and formula (IIIb).

Any suitable metathesis catalyst can be used, as described in more detail below. In some embodiments of any of the aforementioned embodiments, the metathesis catalyst is an organoruthenium compound, an organoosmium compound, an organotungsten compound, or an organomolybdenum compound.

The methods disclosed herein can include additional chemical and physical treatment of the resulting glyceride copolymers. For example, in some embodiments, the resulting glyceride copolymers are subjected to full or partial hydrogenation, such as diene-selective hydrogenation. Also, in some embodiments, the unspent metathesis catalyst and/or the spent metathesis catalyst residues are recovered. In some embodiments of any of the foregoing embodiments, the resulting glyceride polymers are subjected to methods that induce isomerization, such as olefin isomerization.

In another aspect, the disclosure provides methods of forming a glyceride copolymer, the methods comprising: (a) providing a reaction mixture comprising a first metathesis catalyst, unsaturated natural oil glycerides, and unsaturated alkenylized natural oil glycerides; and (b) reacting the unsaturated natural oil glycerides and unsaturated alkenylized natural oil glycerides in the presence of the first metathesis catalyst to form the glyceride copolymer.

In some embodiments, the unsaturated alkenylized natural oil glyceride is formed from the reaction of a second unsaturated natural oil glyceride with a short-chain alkene in the presence of a second metathesis catalyst. In some such embodiments, the unsaturated alkenylized natural oil glyceride has a lower molecular weight than the second unsaturated natural oil glyceride. Any suitable short-chain alkene can be used, according to the embodiments described above. In some embodiments, the short-chain alkene is a $C_{2-14}$ olefin, $C_{2-12}$ olefin, $C_{2-10}$ olefin, $C_{2-8}$ olefin, $C_{2-6}$ olefin, or a $C_{2-4}$ olefin. In some such embodiments, the short-chain alkene may comprise at least one of the following: ethylene, propylene, 1-butene, 2-butene, isobutene, 1-pentene, 2-pentene, 1-hexene, 2-hexene, 3-hexene, cyclohexene, 2-methyl-1-butene, 2-methyl-2-butene, 3-methyl-1-butene, cyclopentene, 2-methyl-1-pentene, 3-methyl-1-pentene, 4-methyl-1-pentene, 2-methyl-2-pentene, 3-methyl-2-pentene, 4-methyl-2-pentene, or 4,4-dimethyl-2-pentene. In some further such embodiments, the short-chain alkene is ethylene, propylene, 1-butene, 2-butene, or isobutene. In some embodiments, the short-chain alkene is ethylene. In some embodiments, the short-chain alkene is propylene. In some embodiments, the short-chain alkene is 1-butene. In some embodiments, the short-chain alkene is 2-butene.

As noted, it is possible to use a mixture of various linear or branched low-molecular-weight olefins in the reaction to achieve the desired metathesis product distribution. In one embodiment, a mixture of butenes (1-butene, 2-butenes, and, optionally, isobutene) may be employed as the low molecular-weight olefin, offering a low cost, commercially available feedstock instead a purified source of one particular butene. Such low cost mixed butene feedstocks are typically diluted with n-butane and/or isobutane.

The first unsaturated natural oil glyceride and the second unsaturated natural oil glyceride can be obtained from any suitable natural oil source. In some embodiments of any of the aforementioned embodiments, the first or second unsaturated natural oil glycerides are obtained from a vegetable oil, such as a seed oil. In some further embodiments, the vegetable oil is rapeseed oil, canola oil (low erucic acid rapeseed oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, or castor oil. In some embodiments, the vegetable oil is palm oil. In some embodiments, the vegetable oil is soybean oil. In some embodiments, the vegetable oil is canola oil.

The glyceride copolymers formed by the methods disclosed herein can have any suitable molecular weight. In some embodiments of any of the aforementioned embodiments, the glyceride copolymer has a weight average molecular weight ranging from 4,000 g/mol to 150,000 g/mol, or from 5,000 g/mol to 130,000 g/mol, or from 6,000 g/mol to 100,000 g/mol, or from 7,000 g/mol to 50,000 g/mol, or from 8,000 g/mol to 30,000 g/mol, or from 8,000 g/mol to 20,000 g/mol.

In some embodiments, the glyceride copolymer has a number-average molecular weight ($M_n$) from 2,000 g/mol to 150,000 g/mol, or from 3,000 g/mol to 30,000 g/mol, or from 4,000 g/mol to 20,000 g/mol.

The glyceride copolymers formed by the methods disclosed herein can have any suitable ratio of constitutional units formed from the first monomer to constitutional units formed from the second monomer. In some embodiments of any of the aforementioned embodiments, the number ratio of constitutional units formed from the first monomer to constitutional units formed from the second monomer is no more than 10:1, or no more than 9:1, or no more than 8:1, or no more than 7:1, or no more than 6:1, or no more than 5:1, or no more than 4:1, or no more than 3:1, or no more than 2:1, or no more than 1:1. The glyceride copolymers disclosed herein can include additional constitutional units not formed from the first monomer or the second monomer.

Or, in some other embodiments of any of the foregoing embodiments, the two or more monomers are reacted in the presence of the metathesis catalyst as part of a reaction mixture, wherein the weight-to-weight ratio of the first monomer to the second monomer in the reaction mixture is no more than 10:1, or no more than 9:1, or no more than 8:1, or no more than 7:1, or no more than 6:1, or no more than 5:1, or no more than 4:1, or no more than 3:1, or no more than 2:1, or no more than 1:1. In some embodiments, the reaction mixture includes additional monomer compounds besides the first monomer and the second monomer.

Any suitable metathesis catalyst can be used as either the first metathesis catalyst or the second metathesis catalyst, as described in more detail below. In some embodiments of any of the aforementioned embodiments, the first and second metathesis catalysts are an organoruthenium compound, an organoosmium compound, an organo-tungsten compound, or an organomolybdenum compound.

The methods disclosed herein can include additional chemical and physical treatment of the resulting glyceride copolymers. For example, in some embodiments, the resulting glyceride copolymers are subjected to full or partial hydrogenation, such as diene-selective hydrogenation.

Derivation from Renewable Sources

The compounds employed in any of the aspects or embodiments disclosed herein can, in certain embodiments, be derived from renewable sources, such as from various natural oils or their derivatives. Any suitable methods can be used to make these compounds from such renewable sources.

Olefin metathesis provides one possible means to convert certain natural oil feedstocks into olefins and esters that can be used in a variety of applications, or that can be further modified chemically and used in a variety of applications. In some embodiments, a composition (or components of a composition) may be formed from a renewable feedstock, such as a renewable feedstock formed through metathesis reactions of natural oils and/or their fatty acid or fatty ester derivatives. When compounds containing a carbon-carbon double bond undergo metathesis reactions in the presence of a metathesis catalyst, some or all of the original carbon-carbon double bonds are broken, and new carbon-carbon double bonds are formed. The products of such metathesis reactions include carbon-carbon double bonds in different locations, which can provide unsaturated organic compounds having useful chemical properties.

A wide range of natural oils, or derivatives thereof, can be used in such metathesis reactions. Examples of suitable natural oils include, but are not limited to, vegetable oils, algae oils, fish oils, animal fats, tall oils, derivatives of these oils, combinations of any of these oils, and the like. Representative non-limiting examples of vegetable oils include low erucic acid rapeseed oil (canola oil), high erucic acid rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

The natural oil may include canola or soybean oil, such as refined, bleached and deodorized soybean oil (i.e., RBD soybean oil). Soybean oil typically includes about 95 percent by weight (wt %) or greater (e.g., 99 wt % or greater) triglycerides of fatty acids. Major fatty acids in the polyol esters of soybean oil include but are not limited to saturated fatty acids such as palmitic acid (hexadecanoic acid) and stearic acid (octadecanoic acid), and unsaturated fatty acids such as oleic acid (9-octadecenoic acid), linoleic acid (9,12-octadecadienoic acid), and linolenic acid (9,12,15-octadecatrienoic acid).

Such natural oils, or derivatives thereof, contain esters, such as triglycerides, of various unsaturated fatty acids. The identity and concentration of such fatty acids varies depending on the oil source, and, in some cases, on the variety. In some embodiments, the natural oil comprises one or more esters of oleic acid, linoleic acid, linolenic acid, or any combination thereof. When such fatty acid esters are metathesized, new compounds are formed. For example, in embodiments where the metathesis uses certain short-chain alkenes, e.g., ethylene, propylene, or 1-butene, and where the natural oil includes esters of oleic acid, an amount of 1-decene and 1-decenoid acid (or an ester thereof), among other products, are formed.

In some embodiments, the natural oil can be subjected to various pre-treatment processes, which can facilitate their utility for use in certain metathesis reactions. Useful pre-treatment methods are described in United States Patent Application Publication Nos. 2011/0113679, 2014/0275595, and 2014/0275681, all three of which are hereby incorporated by reference as though fully set forth herein.

In certain embodiments, prior to the metathesis reaction, the natural oil and/or unsaturated polyol ester feedstock may be treated to render the natural oil more suitable for the subsequent metathesis reaction. In one embodiment, the treatment of the natural oil and/or unsaturated polyol ester involves the removal of catalyst poisons, such as peroxides, which may potentially diminish the activity of the metathesis catalyst. Non-limiting examples of the natural oil and/or unsaturated polyol ester feedstock treatment methods to diminish catalyst poisons include those described in PCT/US2008/09604, PCT/US2008/09635, and U.S. patent application Ser. Nos. 12/672,651 and 12/672,652, herein incorporated by reference in their entireties. In certain embodiments, the natural oil and/or unsaturated polyol ester feedstock is thermally treated by heating the feedstock to a temperature greater than 100° C. in the absence of oxygen and held at the temperature for a time sufficient to diminish catalyst poisons in the feedstock. In other embodiments, the temperature is between approximately 100° C. and 300° C., between approximately 120° C. and 250° C., between approximately 150° C. and 210° C., or approximately between 190 and 200° C. In one embodiment, the absence of oxygen is achieved by sparging the natural oil and/or unsaturated polyol ester feedstock with nitrogen, wherein the nitrogen gas is pumped into the feedstock treatment vessel at a pressure of approximately 10 atm (150 psig).

In certain embodiments, the natural oil and/or unsaturated polyol ester feedstock is chemically treated under conditions sufficient to diminish the catalyst poisons in the feedstock through a chemical reaction of the catalyst poisons. In certain embodiments, the feedstock is treated with a reducing agent or a cation-inorganic base composition. Non-limiting examples of reducing agents include bisulfate, borohydride, phosphine, thiosulfate, and combinations thereof.

In certain embodiments, the natural oil and/or unsaturated polyol ester feedstock is treated with an adsorbent to remove catalyst poisons. In one embodiment, the feedstock is treated with a combination of thermal and adsorbent methods. In another embodiment, the feedstock is treated with a combination of chemical and adsorbent methods. In another embodiment, the treatment involves a partial hydrogenation treatment to modify the natural oil and/or unsaturated polyol ester feedstock's reactivity with the metathesis catalyst. Additional non-limiting examples of feedstock treatment are also described below when discussing the various metathesis catalysts.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions.

In some embodiments, the natural oil is winterized. Winterization refers to the process of: (1) removing waxes and other non-triglyceride constituents, (2) removing naturally occurring high-melting triglycerides, and (3) removing high-melting triglycerides formed during partial hydrogenation. Winterization may be accomplished by known methods including, for example, cooling the oil at a controlled rate in order to cause crystallization of the higher melting components that are to be removed from the oil. The crystallized high melting components are then removed from the oil by filtration resulting in winterized oil. Winterized soybean oil is commercially available from Cargill, Incorporated (Minneapolis, Minn.).

The conditions for such metathesis reactions, and the reactor design, and suitable catalysts are as described below with reference to the metathesis of the olefin esters. That discussion is incorporated by reference as though fully set forth herein.

Olefin Metathesis

In some embodiments, one or more of the unsaturated monomers can be made by metathesizing a natural oil or natural oil derivative. The terms "metathesis" or "metathesizing" can refer to a variety of different reactions, including, but not limited to, cross-metathesis, self-metathesis, ring-opening metathesis, ring-opening metathesis polymerizations ("ROMP"), ring-closing metathesis ("RCM"), and acyclic diene metathesis ("ADMET"). Any suitable metathesis reaction can be used, depending on the desired product or product mixture.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linoleic acid, or combinations thereof. In some other embodiments, the unsaturated glyceride is the product of the partial hydrogenation and/or the metathesis of another unsaturated glyceride (as described above).

In some embodiments, the unsaturated polyol ester is partially hydrogenated before being metathesized. For example, in some embodiments, the unsaturated polyol ester is partially hydrogenated to achieve an iodine value (IV) of about 120 or less before subjecting the partially hydrogenated polyol ester to metathesis.

The metathesis process can be conducted under any conditions adequate to produce the desired metathesis products. For example, stoichiometry, atmosphere, solvent, temperature, and pressure can be selected by one skilled in the art to produce a desired product and to minimize undesirable byproducts. In some embodiments, the metathesis process may be conducted under an inert atmosphere. Similarly, in embodiments where a reagent is supplied as a gas, an inert gaseous diluent can be used in the gas stream. In such embodiments, the inert atmosphere or inert gaseous diluent typically is an inert gas, meaning that the gas does not interact with the metathesis catalyst to impede catalysis to a substantial degree. For example, non-limiting examples of inert gases include helium, neon, argon, methane, and nitrogen, used individually or with each other and other inert gases.

The rector design for the metathesis reaction can vary depending on a variety of factors, including, but not limited to, the scale of the reaction, the reaction conditions (heat, pressure, etc.), the identity of the catalyst, the identity of the materials being reacted in the reactor, and the nature of the feedstock being employed. Suitable reactors can be designed by those of skill in the art, depending on the relevant factors, and incorporated into a refining process such, such as those disclosed herein.

The metathesis reactions disclosed herein generally occur in the presence of one or more metathesis catalysts. Such methods can employ any suitable metathesis catalyst. The metathesis catalyst in this reaction may include any catalyst or catalyst system that catalyzes a metathesis reaction. Any known or future developed metathesis catalyst may be used, alone or in combination with one or more additional catalysts. Examples of metathesis catalysts and process conditions are described in US 2011/0160472, incorporated by reference herein in its entirety, except that in the event of any inconsistent disclosure or definition from the present specification, the disclosure or definition herein shall be deemed to prevail. A number of the metathesis catalysts described in US 2011/0160472 are presently available from Materia, Inc. (Pasadena, Calif.).

In some embodiments, the metathesis catalyst includes a Grubbs-type olefin metathesis catalyst and/or an entity derived therefrom. In some embodiments, the metathesis catalyst includes a first-generation Grubbs-type olefin metathesis catalyst and/or an entity derived therefrom. In some embodiments, the metathesis catalyst includes a second-generation Grubbs-type olefin metathesis catalyst and/or an entity derived therefrom. In some embodiments, the metathesis catalyst includes a first-generation Hoveyda-Grubbs-type olefin metathesis catalyst and/or an entity derived therefrom. In some embodiments, the metathesis catalyst includes a second-generation Hoveyda-Grubbs-type olefin metathesis catalyst and/or an entity derived therefrom. In some embodiments, the metathesis catalyst includes one or a plurality of the ruthenium carbene metathesis catalysts sold by Materia, Inc. of Pasadena, Calif. and/or one or more entities derived from such catalysts. Representative metathesis catalysts from Materia, Inc. for use in accordance with the present teachings include but are not limited to those sold under the following product numbers as well as combinations thereof: product no. C823 (CAS no. 172222-30-9), product no. C848 (CAS no. 246047-72-3), product no. C601 (CAS no. 203714-71-0), product no. C627 (CAS no. 301224-40-8), product no. C571 (CAS no. 927429-61-6), product no. C598 (CAS no. 802912-44-3), product no. C793 (CAS no. 927429-60-5), product no. C801 (CAS no. 194659-03-9), product no. C827 (CAS no. 253688-91-4), product no. C884 (CAS no. 900169-53-1), product no. C833 (CAS no. 1020085-61-3), product no. C859 (CAS no. 832146-68-6), product no. C711 (CAS no. 635679-24-2), product no. C933 (CAS no. 373640-75-6).

In some embodiments, the metathesis catalyst includes a molybdenum and/or tungsten carbene complex and/or an entity derived from such a complex. In some embodiments, the metathesis catalyst includes a Schrock-type olefin metathesis catalyst and/or an entity derived therefrom. In some embodiments, the metathesis catalyst includes a high-oxidation-state alkylidene complex of molybdenum and/or an entity derived therefrom. In some embodiments, the metathesis catalyst includes a high-oxidation-state alkylidene complex of tungsten and/or an entity derived therefrom. In some embodiments, the metathesis catalyst includes molybdenum (VI). In some embodiments, the metathesis catalyst includes tungsten (VI). In some embodiments, the metathesis catalyst includes a molybdenum- and/or a tungsten-containing alkylidene complex of a type described in one or more of (a) Angew. Chem. Int. Ed. Engl., 2003, 42, 4592-4633; (b) Chem. Rev., 2002, 102, 145-179; and/or (c) Chem. Rev., 2009, 109, 3211-3226, each of which is incorporated by reference herein in its entirety, except that in the event of any inconsistent disclosure or definition from the present specification, the disclosure or definition herein shall be deemed to prevail.

Suitable homogeneous metathesis catalysts include combinations of a transition metal halide or oxo-halide (e.g., $WOCl_4$ or $WCl_6$) with an alkylating cocatalyst (e.g., $Me_4Sn$), or alkylidene (or carbene) complexes of transition metals, particularly Ru or W. These include first and second-generation Grubbs catalysts, Grubbs-Hoveyda catalysts, and the like. Suitable alkylidene catalysts have the general structure: $M[X^1X^2L^1L^2(L^3)_n]=C_m=C(R^1)R^2$ where M is a Group 8 transition metal, $L^1$, $L^2$, and $L^3$ are neutral electron donor ligands, n is 0 (such that $L^3$ may not be present) or 1, m is 0, 1, or 2, $X^1$ and $X^2$ are anionic ligands, and $R^1$ and $R^2$ are independently selected from H, hydrocarbyl, substituted hydrocarbyl, heteroatom-containing hydrocarbyl, substituted heteroatom-containing hydrocarbyl, and functional groups. Any two or more of $X^1$, $X^2$, $L^1$, $L^2$, $L^3$, $R^1$ and $R^2$ can form a cyclic group and any one of those groups can be attached to a support.

First-generation Grubbs catalysts fall into this category where m=n=0 and particular selections are made for n, $X^1$, $X^2$, $L^1$, $L^2$, $L^3$, $R^1$ and $R^2$ as described in U.S. Pat. Appl. Publ. No. 2010/0145086, the teachings of which related to all metathesis catalysts are incorporated herein by reference.

Second-generation Grubbs catalysts also have the general formula described above, but $L^1$ is a carbene ligand where the carbene carbon is flanked by N, O, S, or P atoms, and/or by two N atoms. Usually, the carbene ligand is part of a cyclic group. Examples of suitable second-generation Grubbs catalysts also appear in the '086 publication.

In another class of suitable alkylidene catalysts, $L^1$ is a strongly coordinating neutral electron donor as in first- and second-generation Grubbs catalysts, and $L^2$ and $L^3$ are weakly coordinating neutral electron donor ligands in the form of optionally substituted heterocyclic groups. Thus, $L^2$ and $L^3$ are pyridine, pyrimidine, pyrrole, quinoline, thiophene, or the like.

In yet another class of suitable alkylidene catalysts, a pair of substituents is used to form a bi- or tridentate ligand, such as a biphosphine, dialkoxide, or alkyldiketonate. Grubbs-Hoveyda catalysts are a subset of this type of catalyst in which $L^2$ and $R^2$ are linked. Typically, a neutral oxygen or nitrogen coordinates to the metal while also being bonded to a carbon that is α-, β-, or γ- with respect to the carbene carbon to provide the bidentate ligand. Examples of suitable Grubbs-Hoveyda catalysts appear in the '086 publication.

The structures below provide just a few illustrations of suitable catalysts that may be used:

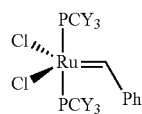
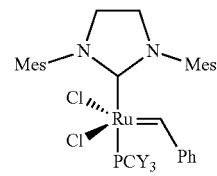
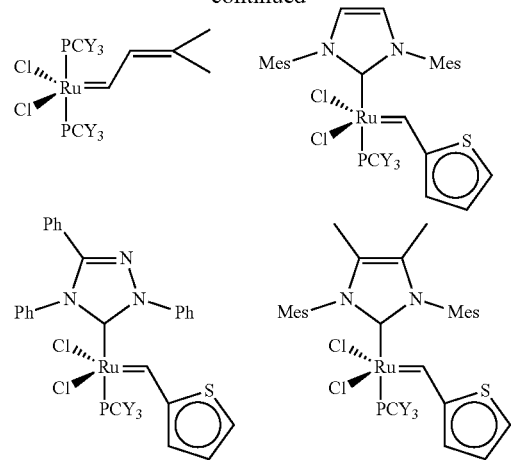

An immobilized catalyst can be used for the metathesis process. An immobilized catalyst is a system comprising a catalyst and a support, the catalyst associated with the support. Exemplary associations between the catalyst and the support may occur by way of chemical bonds or weak interactions (e.g. hydrogen bonds, donor acceptor interactions) between the catalyst, or any portions thereof, and the support or any portions thereof. Support is intended to include any material suitable to support the catalyst. Typically, immobilized catalysts are solid phase catalysts that act on liquid or gas phase reactants and products. Exemplary supports are polymers, silica or alumina. Such an immobilized catalyst may be used in a flow process. An immobilized catalyst can simplify purification of products and recovery of the catalyst so that recycling the catalyst may be more convenient.

Any useful amount of the selected metathesis catalyst can be used in the process. For example, the molar ratio of the unsaturated polyol ester to catalyst may range from about 5:1 to about 10,000,000:1 or from about 50:1 to 500,000:1. In some embodiments, an amount of about 1 to about 20 ppm, or about 2 ppm to about 15 ppm, of the metathesis catalyst per double bond of the starting composition (i.e., on a mole/mole basis) is used.

In some embodiments, the metathesis reaction is catalyzed by a system containing both a transition and a non-transition metal component. The most active and largest number of catalyst systems are derived from Group 6 and Group 8 transition metals, for example, tungsten, molybdenum, and ruthenium.

In certain embodiments, the metathesis catalyst is dissolved in a solvent prior to conducting the metathesis reaction. In certain such embodiments, the solvent chosen may be selected to be substantially inert with respect to the metathesis catalyst. For example, substantially inert solvents include, without limitation: aromatic hydrocarbons, such as benzene, toluene, xylenes, etc.; halogenated aromatic hydrocarbons, such as chlorobenzene and dichlorobenzene; aliphatic solvents, including pentane, hexane, heptane, cyclohexane, etc.; and chlorinated alkanes, such as dichloromethane, chloroform, dichloroethane, etc. In some embodiments, the solvent comprises toluene.

In other embodiments, the metathesis catalyst is not dissolved in a solvent prior to conducting the metathesis reaction. The catalyst, instead, for example, can be slurried with the natural oil or unsaturated ester, where the natural oil or unsaturated ester is in a liquid state. Under these conditions, it is possible to eliminate the solvent (e.g., toluene) from the process and eliminate downstream olefin losses when separating the solvent. In other embodiments, the metathesis catalyst may be added in solid state form (and not slurried) to the natural oil or unsaturated ester (e.g., as an auger feed).

In certain embodiments, a ligand may be added to the metathesis reaction mixture. In many embodiments using a ligand, the ligand is selected to be a molecule that stabilizes the catalyst, and may thus provide an increased turnover number for the catalyst. In some cases the ligand can alter reaction selectivity and product distribution. Examples of ligands that can be used include Lewis base ligands, such as, without limitation, trialkylphosphines, for example tricyclohexylphosphine and tributyl phosphine; triarylphosphines, such as triphenylphosphine; diarylalkylphosphines, such as, diphenylcyclohexylphosphine; pyridines, such as 2,6-dimethylpyridine, 2,4,6-trimethylpyridine; as well as other Lewis basic ligands, such as phosphine oxides and phosphinites. Additives may also be present during metathesis that increase catalyst lifetime.

The metathesis reaction temperature may, in some instances, be a rate-controlling variable where the temperature is selected to provide a desired product at an acceptable rate. In certain embodiments, the metathesis reaction temperature is greater than about −40° C., or greater than about −20° C., or greater than about 0° C., or greater than about 10° C. In certain embodiments, the metathesis reaction temperature is less than about 200° C., or less than about 150° C., or less than about 120° C. In some embodiments, the metathesis reaction temperature is between about 0° C. and about 150° C., or is between about 10° C. and about 120° C.

The metathesis reaction can be run under any desired pressure. Typically, it will be desirable to maintain a total pressure that is high enough to keep the cross-metathesis reagent in solution. Therefore, as the molecular weight of the cross-metathesis reagent increases, the lower pressure range typically decreases since the boiling point of the cross-metathesis reagent increases. The total pressure may be selected to be greater than about 0.1 atm (10 kPa), in some embodiments greater than about 0.3 atm (30 kPa), or greater than about 1 atm (100 kPa). Typically, the reaction pressure is no more than about 70 atm (7000 kPa), in some embodiments no more than about 30 atm (3000 kPa). A non-limiting exemplary pressure range for the metathesis reaction is from about 1 atm (100 kPa) to about 30 atm (3000 kPa). In certain embodiments it may be desirable to run the metathesis reactions under an atmosphere of reduced pressure. Conditions of reduced pressure or vacuum may be used to remove olefins as they are generated in a metathesis reaction, thereby driving the metathesis equilibrium towards the formation of less volatile products. In the case of a self-metathesis of a natural oil, reduced pressure can be used to remove C12 or lighter olefins including, but not limited to, hexene, nonene, and dodecene, as well as byproducts including, but not limited to cyclohexadiene and benzene as the metathesis reaction proceeds. The removal of these species can be used as a means to drive the reaction towards the formation of diester groups and cross linked triglycerides.

In some embodiments, after metathesis has occurred, the metathesis catalyst is removed from the resulting product. One method of removing the catalyst is treatment of the metathesized product with an adsorbent bed. Representative adsorbents for use in accordance with the present teachings include but are not limited to carbon, silica, silica-alumina, alumina, clay, magnesium silicates (e.g., Magnesols), the synthetic silica adsorbent sold under the tradename TRISYL by W. R. Grace & Co., diatomaceous earth, polystyrene, macroporous (MP) resins, and the like, and combinations thereof. In one embodiment, the adsorbent is a clay bed. The clay bed will adsorb the metathesis catalyst, and after a filtration step, the metathesized product can be sent to a separation unit for further processing. The separation unit may comprise a distillation unit. In some embodiments, the distillation may be conducted, for example, by steam stripping the metathesized product. Distilling may be accomplished by sparging the mixture in a vessel, typically agitated, by contacting the mixture with a gaseous stream in a column that may contain typical distillation packing (e.g., random or structured), by vacuum distillation, or evaporating the lights in an evaporator such as a wiped film evaporator. Typically, steam stripping will be conducted at reduced pressure and at temperatures ranging from about 100° C. to 250° C. The temperature may depend, for example, on the level of vacuum used, with higher vacuum allowing for a lower temperature and allowing for a more efficient and complete separation of volatiles.

In another embodiment, the adsorbent is a water soluble phosphine reagent such as tris hydroxymethyl phosphine (THMP). THMP may be added at a rate equivalent to at least 1:1, 5:1, 10:1, 25:1, or 50:1 molar ratio relative to the catalyst. Catalyst may be separated with a water soluble phosphine through known liquid-liquid extraction mechanisms by decanting the aqueous phase from the organic phase. In other embodiments, the catalyst separation comprises washing or extracting the mixture with a polar solvent (e.g., particularly, though not exclusively, for embodiments in which the reagent is at least partially soluble in the polar solvent). Representative polar solvents for use in accordance with the present teachings include but are not limited to water, alcohols (e.g., methanol, ethanol, etc.), ethylene glycol, glycerol, DMF, multifunctional polar compounds including but not limited to polyethylene glycols and/or glymes, ionic liquids, and the like, and combinations thereof. In some embodiments, the mixture is extracted with water. In some embodiments, when a phosphite ester that is at least partially hydrolyzable (e.g., in some embodiments, a phosphite ester having a low molecular weight, including but not limited to trimethyl phosphite, triethyl phosphite, and a combination thereof) is used as a reagent, washing the mixture with water may convert the phosphite ester into a corresponding acid. In other embodiments, the metathesized product may be contacted with a reactant to deactivate or to extract the catalyst.

The metathesis reaction also results in the formation of internal olefin compounds that may be linear or cyclic. If the metathesized polyol ester is fully or partially hydrogenated, the linear and cyclic olefins would typically be fully or partially converted to the corresponding saturated linear and cyclic hydrocarbons. The linear/cyclic olefins and saturated linear/cyclic hydrocarbons may remain in the metathesized polyol ester or they may be removed or partially removed from the metathesized polyol ester using one or more known stripping techniques, including but not limited to wipe film evaporation, falling film evaporation, rotary evaporation, steam stripping, vacuum distillation, etc.

Multiple, sequential metathesis reaction steps may be employed. For example, the glyceride copolymer product may be made by reacting an unsaturated polyol ester in the presence of a metathesis catalyst to form a first glyceride copolymer product. The first glyceride copolymer product may then be reacted in a self-metathesis reaction to form another glyceride copolymer product. Alternatively, the first glyceride copolymer product may be reacted in a cross-metathesis reaction with a unsaturated polyol ester to form another glyceride copolymer product. Also in the alternative, the transesterified products, the olefins and/or esters may be further metathesized in the presence of a metathesis catalyst. Such multiple and/or sequential metathesis reactions can be performed as many times as needed, and at least one or more times, depending on the processing/compositional requirements as understood by a person skilled in the art. As used herein, a "glyceride copolymer product" may include products that have been once metathesized and/or multiply metathesized. These procedures may be used to form metathesis dimers, metathesis trimers, metathesis tetramers, metathesis pentamers, and higher order metathesis oligomers (e.g., metathesis hexamers, metathesis heptamers, metathesis octamers, metathesis nonamers, metathesis decamers, and higher than metathesis decamers). These procedures can be repeated as many times as desired (for example, from 2 to about 50 times, or from 2 to about 30 times, or from 2 to about 10 times, or from 2 to about 5 times, or from 2 to about 4 times, or 2 or 3 times) to provide the desired metathesis oligomer or polymer which may comprise, for example, from 2 to about 100 bonded groups, or from 2 to about 50, or from 2 to about 30, or from 2 to about 10, or from 2 to about 8, or from 2 to about 6 bonded groups, or from 2 to about 4 bonded groups, or from 2 to about 3 bonded groups. In certain embodiments, it may be desirable to use the glyceride copolymer products produced by cross metathesis of an unsaturated polyol ester, or blend of unsaturated polyol esters, with a $C_{2-14}$ olefin, and/or $C_{2-6}$ olefin, and/or $C_4$ olefin, and mixtures and isomers thereof, as the reactant in a self-metathesis reaction to produce another glyceride copolymer product. Alternatively, metathesized products produced by cross metathesis of an unsaturated polyol ester, or blend of unsaturated polyol esters, with a $C_{2-14}$ olefin, and/or $C_{2-6}$ olefin, and/or $C_4$ olefin, and mixtures and isomers thereof, can be combined with an unsaturated polyol ester, or blend of unsaturated polyol esters, and further metathesized to produce another glyceride copolymer product.

In some embodiments, the glyceride copolymer may be hydrogenated (e.g., fully or partially hydrogenated) in order to improve the stability of the oil or to modify its viscosity or other properties. Representative techniques for hydrogenating unsaturated polyol esters are known in the art and are discussed herein.

In other embodiments, the glyceride copolymers can be used as a blend with one or more fabric care benefit agents and/or fabric softening actives.

Hydrogenation:

In some embodiments, the unsaturated polyol ester is partially hydrogenated before it is subjected to the metathesis reaction. Partial hydrogenation of the unsaturated polyol ester reduces the number of double bonds that are available for in the subsequent metathesis reaction. In some embodiments, the unsaturated polyol ester is metathesized to form a glyceride copolymer, and the glyceride copolymer is then hydrogenated (e.g., partially or fully hydrogenated) to form a hydrogenated glyceride copolymer.

Hydrogenation may be conducted according to any known method for hydrogenating double bond-containing compounds such as vegetable oils. In some embodiments, the unsaturated polyol ester, natural oil or glyceride copolymer is hydrogenated in the presence of a nickel catalyst that has been chemically reduced with hydrogen to an active state. Commercial examples of supported nickel hydrogenation catalysts include those available under the trade designations "NYSOFACT", "NYSOSEL", and "NI 5248 D" (from Englehard Corporation, Iselin, N.H.). Additional supported nickel hydrogenation catalysts include those commercially available under the trade designations "PRICAT 9910", "PRICAT 9920", "PRICAT 9908", "PRICAT 9936" (from Johnson Matthey Catalysts, Ward Hill, Mass.).

In some embodiments, the hydrogenation catalyst comprising, for example, nickel, copper, palladium, platinum, molybdenum, iron, ruthenium, osmium, rhodium, or iridium. Combinations of metals may also be used. Useful catalyst may be heterogeneous or homogeneous. In some embodiments, the catalysts are supported nickel or sponge nickel type catalysts.

In some embodiments, the hydrogenation catalyst comprises nickel that has been chemically reduced with hydrogen to an active state (i.e., reduced nickel) provided on a support. In some embodiments, the support comprises porous silica (e.g., kieselguhr, infusorial, diatomaceous, or siliceous earth) or alumina. The catalysts are characterized by a high nickel surface area per gram of nickel.

In some embodiments, the particles of supported nickel catalyst are dispersed in a protective medium comprising hardened triacylglyceride, edible oil, or tallow. In an exemplary embodiment, the supported nickel catalyst is dispersed in the protective medium at a level of about 22 wt. % nickel.

Hydrogenation may be carried out in a batch or in a continuous process and may be partial hydrogenation or complete hydrogenation. In a representative batch process, a vacuum is pulled on the headspace of a stirred reaction vessel and the reaction vessel is charged with the material to be hydrogenated (e.g., RBD soybean oil or metathesized RBD soybean oil). The material is then heated to a desired temperature. Typically, the temperature ranges from about 50 deg. C. to 350 deg. C., for example, about 100 deg. C. to 300 deg. C. or about 150 deg. C. to 250 deg. C. The desired temperature may vary, for example, with hydrogen gas pressure. Typically, a higher gas pressure will require a lower temperature. In a separate container, the hydrogenation catalyst is weighed into a mixing vessel and is slurried in a small amount of the material to be hydrogenated (e.g., RBD soybean oil or metathesized RBD soybean oil). When the material to be hydrogenated reaches the desired temperature, the slurry of hydrogenation catalyst is added to the reaction vessel. Hydrogen gas is then pumped into the reaction vessel to achieve a desired pressure of $H_2$ gas. Typically, the $H_2$ gas pressure ranges from about 15 to 3000 psig or, for example, about 15 psig to 150 psig. As the gas pressure increases, more specialized high-pressure processing equipment may be required. Under these conditions the hydrogenation reaction begins and the temperature is allowed to increase to the desired hydrogenation temperature (e.g., about 120 deg. C. to 200 deg. C.) where it is maintained by cooling the reaction mass, for example, with cooling coils. When the desired degree of hydrogenation is reached, the reaction mass is cooled to the desired filtration temperature.

The amount of hydrogenation catalysts is typically selected in view of a number of factors including, for example, the type of hydrogenation catalyst used, the amount of hydrogenation catalyst used, the degree of unsaturation in the material to be hydrogenated, the desired rate of hydrogenation, the desired degree of hydrogenation (e.g., as measure by iodine value (IV)), the purity of the reagent, and the $H_2$ gas pressure. In some embodiments, the hydrogenation catalyst is used in an amount of about 10 wt. % or less, for example, about 5 wt. % or less or about 1 wt. % or less.

After hydrogenation, the hydrogenation catalyst may be removed from the hydrogenated product using known techniques, for example, by filtration. In some embodiments, the hydrogenation catalyst is removed using a plate and frame filter such as those commercially available from Sparkler Filters, Inc., Conroe Tex. In some embodiments, the filtration is performed with the assistance of pressure or a vacuum. In order to improve filtering performance, a filter aid may be used. A filter aid may be added to the metathesized product directly or it may be applied to the filter. Representative examples of filtering aids include diatomaceous earth, silica, alumina, and carbon. Typically, the filtering aid is used in an amount of about 10 wt. % or less, for example, about 5 wt. % or less or about 1 wt. % or less. Other filtering techniques and filtering aids may also be employed to remove the used hydrogenation catalyst. In other embodiments the hydrogenation catalyst is removed using centrifugation followed by decantation of the product.

Potential Processing Aids and/or Impurities

Unsaturated polyol esters, particularly those derived or synthesized from natural sources, are known to those skilled in the art to contain a wide range of minor components and impurities. These may include tocopherols, carotenes, free fatty acids, free glycerin, sterols, glucosinolates, phospholipids, peroxides, aldehydes and other oxidation products, and the like. The impurities and reactions products present in a wide range of natural oils are described in "Bailey's Industrial Oil and Fat Products," Fifth edition, Y. H. Hui, Ed., Wiley (1996) and references cited therein; "Lipid Analysis in Oil and Fats," R. J. Hamilton, Ed., Chapman Hall (1998) and references cited therein; and "Flavor Chemistry of Fats and Oils," D. B. Min and T. H. Smouse, Ed., American Oil Chemists Society (1985) and references cited therein.

It is understood by one skilled in the art that any of these methods of making the glyceride copolymers claimed and described in this specification may result in the presence of impurities in the final glyceride copolymer and in the compositions/consumer products claimed and described in this specification as a result of the use of the glyceride coplymers. These nonlimiting examples include metathesis catalysts including metals and ligands described herein; immobilized catalyst supports including silica or alumina; oil pretreatment agents including reducing agents, cation-inorganic base compositions and adsorbents; structures which result from oil thermal pretreatment; process aids including solvents such as aromatic hydrocarbons, halogenated aromatic hydrocarbons, aliphatic solvents, and chlorinated alkanes; aliphatic olefins including hexane, nonene, dodecene, and cyclohexadiene; catalyst kill agents and/or catalyst removal agents including adsorbents such as clay, carbon, silica, silica-alumina, alumina, clay, magnesium silicates, synthetic silica, diatomaceous earth, polystyrene, macroporous (MP) resins, or water soluble phosphine reagents such as tris hydroxymethyl phosphine (THMP); polar solvents including water, alcohols (e.g., methanol, ethanol, etc.), ethylene glycol, glycerol, DMF, multifunctional polar compounds including but not limited to polyethylene glycols and/or glymes, or ionic liquids; phosphite ester hydolysis byproducts; hydrogenation catalysts, including metals and ligands described herein; immobilized hydrogenation catalyst supports including porous silica or alumina; adjuncts necessary to protect, activate and/or remove the hydrogenation catalyst; and/or water.

The glyceride coplymers claimed and described in this specification may contain the following processing aids and/or impurities:

TABLE 1

| Potential Processing Aids and/or Impurities in Glyceride copolymers | | |
|---|---|---|
| Processing aids and/or impurities | Range (ppm by weight) | Preferred Range (ppm by weight) |
| Ruthenium | 0-100 | 0-30 |
| Phosphorus | 1-2000 | 2-100 |
| Chloride | 2-200 | 3-20 |

The following processing aids and/or impurities may be brought into or generated during storage in the compositions/consumer products claimed and described in this specification as a result of the use of the glyceride coplymers, at the levels provided in this specification:

TABLE 2

| Potential Processing Aids and/or Impurities in Consumer Products Arising from Glyceride Copolymers | | | |
|---|---|---|---|
| Processing aids and/or impurities | Range (ppm by weight) | Preferred Range (ppm by weight) | More Preferred Range (ppm by weight) |
| Ruthenium (ppmwt) | 0-50 | 0-10 | 0-3 |
| Phosphorus (ppmwt) | 0.5-1000 | 0.1-200 | 0.2-10 |
| Chloride (ppmwt) | 1-100 | 0.2-20 | 0.3-2 |

Additional Surface Softening Agents

In addition to the glyceride copolymer, other non-limiting examples of suitable surface softening agents that can be present in the surface softening composition of the present invention can be selected from the group consisting of: polymers such as polyethylene and derivatives thereof, hydrocarbons, waxes, oils, silicones, organosilicones (oil compatible), quaternary ammonium compounds, fluorocarbons, substituted $C_{10}$-$C_{22}$ alkanes, substituted $C_{10}$-$C_{22}$ alkenes, in particular derivatives of fatty alcohols and fatty acids (such as fatty acid amides, fatty acid condensates and fatty alcohol condensates), polyols, derivatives of polyols (such as esters and ethers), sugar derivatives (such as ethers and esters), polyglycols (such as polyethyleneglycol) and mixtures thereof.

In one example, the surface softening composition of the present invention is a microemulsion and/or a macroemulsion of a surface softening agent (for example an aminofunctional polydimethylsiloxane, specifically an aminoethylaminopropyl polydimethylsiloxane) in water. In such an example, the concentration of the surface softening agent within the surface softening composition may be from about 3% to about 60% and/or from about 4% to about 50% and/or from about 5% to about 40%. Non-limiting examples of such microemulsions are commercially available from Wacker Chemie (MR1003, MR103, MR102). A non-limiting example of such a macroemulsion is commercially available from Momentive, Columbus, Ohio (CM849).

Non-limiting examples of suitable waxes may be selected from the group consisting of: paraffin, polyethylene waxes, beeswax and mixtures thereof.

Non-limiting examples of suitable oils may be selected from the group consisting of: mineral oil, silicone oil, silicone gels, petrolatum and mixtures thereof.

Non-limiting examples of suitable silicones may be selected from the group consisting of: polydimethylsiloxanes, aminosilicones, cationic silicones, quaternary silicones, silicone betaines and mixtures thereof.

Non-limiting examples of suitable polysiloxanes and/or monomeric/oligomeric units may be selected from the compounds having monomeric siloxane units of the following structure:

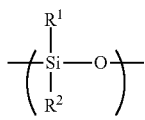

wherein, $R^1$ and $R^2$, for each independent siloxane monomeric unit can each independently be hydrogen or any alkyl, aryl, alkenyl, alkaryl, arakyl, cycloalkyl, halogenated hydrocarbon, or other radical. Any of such radical can be substituted or unsubstituted. $R^1$ and $R^2$ radicals of any particular monomeric unit may differ from the corresponding functionalities of the next adjoining monomeric unit. Additionally, the polysiloxane can be either a straight chain, a branched chain or have a cyclic structure. The radicals $R^1$ and $R^2$ can additionally independently be other silaceous functionalities such as, but not limited to siloxanes, polysiloxanes, silanes, and polysilanes. The radicals $R^1$ and $R^2$ may contain any of a variety of organic functionalities including, for example, alcohol, carboxylic acid, phenyl, and amine functionalities. The end groups can be reactive (alkoxy or hydroxyl) or nonreactive (trimethylsiloxy). The polymer can be branched or unbranched.

In one example, suitable polysiloxanes include straight chain organopolysiloxane materials of the following general formula:

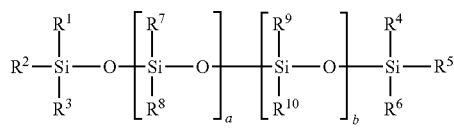

wherein each $R^1$-$R^9$ radical can independently be any $C_1$-$C_{10}$ unsubstituted alkyl or aryl radical, and $R^{10}$ of any substituted $C_1$-$C_{10}$ alkyl or aryl radical. In one example, each $R^1$-$R^9$ radical is independently any $C_1$-$C_4$ unsubstituted alkyl group. Those skilled in the art will recognize that technically there is no difference whether, for example, $R^9$ or $R^{10}$ is the substituted radical. In another example, the mole ratio of b to (a+b) is between 0 and about 20% and/or between 0 and about 10% and/or between about 1% and about 5%.

A non-limiting example of a cationic silicone polymer that can be used as a surface softening agent comprises one or more polysiloxane units, and/or polydimethylsiloxane units of formula —{$(CH_3)_2SiO$}$_c$— having a degree of polymerization, c, of from about 1 to about 1000 and/or from about 20 to about 500 and/or from about 50 to about 300 and/or from about 100 to about 200, and organosilicone-free units comprising at least one diquaternary unit. In one example, the cationic silicone polymer has from about 0.05 to about 1.0 and/or from about 0.2 to about 0.95 and/or from about 0.5 to about 0.9 mole fraction of the organosilicone-free units selected from cationic divalent organic moieties. The cationic divalent organic moiety may be selected from N,N,N',N'-tetramethyl-1,6-hexanediammonium units.

The cationic silicone polymer may contain from about 0 to about 0.95 and/or from about 0.001 to about 0.5 and/or from about 0.05 to about 0.2 mole fraction of the total of organosilicone-free units, polyalkyleneoxide amines of the following formula:

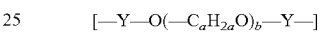

wherein Y is a divalent organic group comprising a secondary or tertiary amine, such as a $C_1$ to $C_8$ alkylenamine residue; a is from 2 to 4, and b is from 0 to 100.

Such polyalkyleneoxide amine—containing units can be obtained by introducing in the silicone polymer structure, compounds such as those sold under the tradename Jeffamine® from Huntsman Corporation. A preferred Jeffamine is Jeffamine ED-2003.

The cationic silicone polymer may contain from about 0 and/or from about 0.001 to about 0.2 mole fraction, of the total of organosilicone-free units, of —$NR_3+$ wherein R is alkyl, hydroxyalkyl or phenyl. These units can be thought of as end-caps.

Moreover the cationic silicone polymer generally contains anions, selected from inorganic and organic anions.

A non-limiting example of a cationic silicone polymer comprises one or more polysiloxane units and one or more quaternary nitrogen moieties, and includes polymers wherein the cationic silicone polymer has the formula:

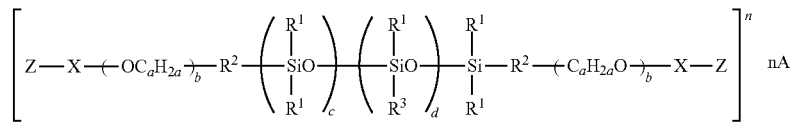

wherein:

$R^1$ is independently selected from the group consisting of: $C_{1-22}$ alkyl, $C_{2-22}$ alkenyl, $C_{6-22}$ alkylaryl, aryl, cycloalkyl, and mixtures thereof;

$R^2$ is independently selected from the group consisting of: divalent organic moieties that may contain one or more oxygen atoms (such moieties and/or consist essentially of C and H or of C, H and O);

X is independently selected from the group consisting of ring-opened epoxides;

$R^3$ is independently selected from polyether groups having the formula:

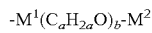

wherein $M^1$ is a divalent hydrocarbon residue; $M^2$ is independently selected from the group consisting of H, $C_{1-22}$ alkyl, $C_{2-22}$ alkenyl, $C_{6-22}$ alkylaryl, aryl, cycloalkyl, $C_{1-22}$ hydroxyalkyl, polyalkyleneoxide, (poly)alkoxy alkyl, and mixtures thereof;

Z is independently selected from the group consisting of monovalent organic moieties comprising at least one quaternized nitrogen atom;

a is from 2 to 4; b is from 0 to 100; c is from 1 to 1000 and/or greater than 20 and/or greater than 50 and/or less than 500 and/or less than 300 and/or from 100 to 200; d is from 0 to 100; n is the number of positive charges associated with the cationic silicone polymer, which is greater than or equal to 2; and A is a monovalent anion.

Another non-limiting example of a cationic silicone polymer comprises one or more polysiloxane units and one or more quaternary nitrogen moieties, and includes polymers wherein the cationic silicone polymer has the formula:

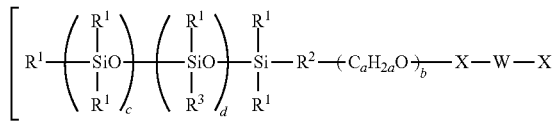 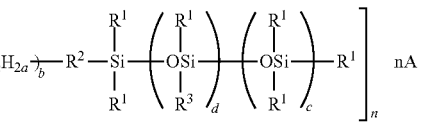

wherein:
$R^1$ is independently selected from the group consisting of: $C_{1-22}$ alkyl, $C_{2-22}$ alkenyl, $C_{6-22}$ alkylaryl, aryl, cycloalkyl, and mixtures thereof;

$R^2$ is independently selected from the group consisting of: divalent organic moieties that may contain one or more oxygen atoms;

X is independently selected from the group consisting of ring-opened epoxides;

$R^3$ is independently selected from polyether groups having the formula:

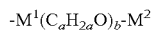

wherein $M^1$ is a divalent hydrocarbon residue; $M^2$ is independently selected from the group consisting of H, $C_{1-22}$ alkyl, $C_{2-22}$ alkenyl, $C_{6-22}$ alkylaryl, aryl, cycloalkyl, $C_{1-22}$ hydroxyalkyl, polyalkyleneoxide, (poly)alkoxy alkyl, and mixtures thereof;

X is independently selected from the group consisting of ring-opened epoxides;

W is independently selected from the group consisting of divalent organic moieties comprising at least one quaternized nitrogen atom;

a is from 2 to 4; b is from 0 to 100; c is from 1 to 1000 and/or greater than 20 and/or greater than 50 and/or less than 500 and/or less than 300 and/or from 100 to 200; d is from 0 to 100; n is the number of positive charges associated with the cationic silicone polymer, which is greater than or equal to 1; and A is a monovalent anion, in other words, a suitable counterion.

References disclosing non-limiting examples of suitable polysiloxanes include U.S. Pat. Nos. 2,826,551, 3,964,500, 4,364,837, 5,059,282, 5,529,665, 5,552,020 and British Patent No. 849,433 and *Silicone Compounds*, pp. 181-217, distributed by Petrach Systems, Inc., which contains an extensive listing and description of polysiloxanes in general.

Viscosity of polysiloxanes useful for this invention may vary as widely as the viscosity of polysiloxanes in general vary, so long as the polysiloxane can be rendered into a form which can be applied to the fibrous structures herein. This includes, but is not limited to, viscosity as low as about 10 centistokes to about 20,000,000 centistokes or even higher.

Non-limiting examples of suitable quaternary ammonium compounds may be selected from compounds having the formula:

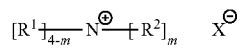

wherein:
m is 1 to 3; each $R^1$ is independently a $C_1$-$C_6$ alkyl group, hydroxyalkyl group, hydrocarbyl or substituted hydrocarbyl group, alkoxylated group, benzyl group, or mixtures thereof; each $R^2$ is independently a $C_{14}$-$C_{22}$ alkyl group, hydroxyalkyl group, hydrocarbyl or substituted hydrocarbyl group, alkoxylated group, benzyl group, or mixtures thereof; and $X^-$ is any quaternary ammonium-compatible anion.

In another example, the quaternary ammonium compounds may be mono or diester variations having the formula:

$(R^1)_{4-m}$—N+—[$(CH_2)_n$—Y—$R^3$]$_m$$X^-$ wherein:
Y is —O—(O)C—, or —C(O)—O—, or —NH—C(O)—, or —C(O)—NH—; m is 1 to 3; n is 0 to 4; each $R^1$ is independently a $C_1$-$C_6$ alkyl group, hydroxyalkyl group, hydrocarbyl or substituted hydrocarbyl group, alkoxylated group, benzyl group, or mixtures thereof each $R^3$ is independently a $C_{13}$-$C_{21}$ alkyl group, hydroxyalkyl group, hydrocarbyl or substituted hydrocarbyl group, alkoxylated group, benzyl group, or mixtures thereof, and $X^-$ is any quaternary ammonium-compatible anion.

In another example, the quaternary ammonium compound may be an imidazolinium compound, such as an imidazolinium salt.

As mentioned above, $X^-$ can be any quaternary ammonium-compatible anion, for example, acetate, chloride, bromide, methyl sulfate, formate, sulfate, nitrate and the like can also be used in the present invention. In one example, $X^-$ is chloride or methyl sulfate.

The surface softening composition may comprise additional ingredients such as a vehicle as described herein below which may not be present on the fibrous structure and/or sanitary tissue product comprising such fibrous structure. In one example, the surface softening composition may comprise a surface softening agent and a vehicle such as water to facilitate the application of the surface softening agent onto the surface of the fibrous structure.

Non-limiting examples of quaternary ammonium compounds suitable for use in the present invention include the well-known dialkyldimethylammonium salts such as ditallowdimethylammonium chloride, ditallowdimethylammonium methylsulfate, di(hydrogenated tallow)dimethylammonium chloride. In one example, the surface softening composition comprises di(hydrogenated tallow)dimethylammonium chloride, commercially available from Witco Chemical Company Inc. of Dublin, Ohio as Varisoft 137®.

Non-limiting examples of ester-functional quaternary ammonium compounds having the structures named above and suitable for use in the present invention include the well-known diester dialkyl dimethyl ammonium salts such as diester ditallow dimethyl ammonium chloride, monoester ditallow dimethyl ammonium chloride, diester ditallow dimethyl ammonium methyl sulfate, diester di(hydrogenated) tallow dimethyl ammonium methyl sulfate, diester di(hydrogenated)tallow dimethyl ammonium chloride, and mixtures thereof. In one example, the surface softening composition comprises diester ditallow dimethyl ammonium chloride and/or diester di(hydrogenated)tallow dimethyl ammonium chloride, both commercially available from Witco Chemical Company Inc. of Dublin, Ohio under the tradename "ADOGEN SDMC".

Lotion Composition

In addition to the surface softening composition of the present invention, the fibrous structure may comprise a lotion composition. The lotion composition may comprise oils and/or emollients and/or waxes and/or immobilizing agents. In one example, the lotion composition comprises from about 10% to about 90% and/or from about 30% to about 90% and/or from about 40% to about 90% and/or from about 40% to about 85% of an oil and/or emollient. In another example, the lotion composition comprises from about 10% to about 50% and/or from about 15% to about 45% and/or from about 20% to about 40% of an immobilizing agent. In another example, the lotion composition comprises from about 0% to about 60% and/or from about 5% to about 50% and/or from about 5% to about 40% of petrolatum.

The lotion compositions may be heterogeneous. They may contain solids, gel structures, polymeric material, a multiplicity of phases (such as oily and water phase) and/or emulsified components. It may be difficult to determine precisely the melting temperature of the lotion composition, i.e. difficult to determine the temperature of transition between the liquid form, the quasi-liquid from, the quasi-solid form and the solid form. The terms melting temperature, melting point, transition point and transition temperature are used interchangeably in this document and have the same meaning.

The lotion compositions may be semi-solid, of high viscosity so they do not substantially flow without activation during the life of the product or gel structures.

The lotion compositions may be shear thinning and/or they may strongly change their viscosity around skin temperature to allow for transfer and easy spreading on a user's skin.

The lotion compositions may be in the form of emulsions and/or dispersions.

In one example of a lotion composition, the lotion composition has a water content of less than about 20% and/or less than 10% and/or less than about 5% or less than about 0.5%.

In another example, the lotion composition may have a solids content of at least about 15% and/or at least about 25% and/or at least about 30% and/or at least about 40% to about 100% and/or to about 95% and/or to about 90% and/or to about 80%.

A non-limiting example of a suitable lotion composition of the present invention comprises a chemical softening agent, such as an emollient, that softens, soothes, supples, coats, lubricates, or moisturizes the skin. The lotion composition may sooth, moisturize, and/or lubricate a user's skin.

The lotion composition may comprise an oil and/or an emollient. Non-limiting examples of suitable oils and/or emollients include glycols (such as propylene glycol and/or glycerine), polyglycols (such as triethylene glycol), petrolatum, fatty acids, fatty alcohols, fatty alcohol ethoxylates, fatty alcohol esters and fatty alcohol ethers, fatty acid ethoxylates, fatty acid amides and fatty acid esters, hydrocarbon oils (such as mineral oil), squalane, fluorinated emollients, silicone oil (such as dimethicone) and mixtures thereof.

Non-limiting examples of emollients useful in the present invention can be petroleum-based, fatty acid ester type, alkyl ethoxylate type, or mixtures of these materials. Suitable petroleum-based emollients include those hydrocarbons, or mixtures of hydrocarbons, having chain lengths of from 16 to 32 carbon atoms. Petroleum based hydrocarbons having these chain lengths include petrolatum (also known as "mineral wax," "petroleum jelly" and "mineral jelly"). Petrolatum usually refers to more viscous mixtures of hydrocarbons having from 16 to 32 carbon atoms. A suitable Petrolatum is available from Witco, Corp., Greenwich, Conn. as White Protopet® 1 S.

Suitable fatty acid ester emollients include those derived from long chain $C_{12}$-$C_{28}$ fatty acids, such as $C_{16}$-$C_{22}$ saturated fatty acids, and short chain $C_1$-$C_8$ monohydric alcohols, such as $C_1$-$C_3$ monohydric alcohols. Non-limiting examples of suitable fatty acid ester emollients include methyl palmitate, methyl stearate, isopropyl laurate, isopropyl myristate, isopropyl palmitate, and ethylhexyl palmitate. Suitable fatty acid ester emollients can also be derived from esters of longer chain fatty alcohols ($C_{12}$-$C_{28}$, such as $C_{12}$-$C_{16}$) and shorter chain fatty acids e.g., lactic acid, such as lauryl lactate and cetyl lactate.

Suitable fatty acid ester type emollients include those derived from $C_{12}$-$C_{28}$ fatty acids, such as $C_{16}$-$C_{22}$ saturated fatty acids, and short chain ($C_1$-$C_8$ and/or $C_1$-$C_3$) monohydric alcohols. Representative examples of such esters include methyl palmitate, methyl stearate, isopropyl laurate, isopropyl myristate, isopropyl palmitate, and ethylhexyl palmitate. Suitable fatty acid ester emollients can also be derived from esters of longer chain fatty alcohols ($C_{12}$-$C_{28}$ and/or $C_{12}$-$C_{16}$) and shorter chain fatty acids e.g., lactic acid, such as lauryl lactate and cetyl lactate.

Suitable alkyl ethoxylate type emollients include $C_{12}$-$C_{18}$ fatty alcohol ethoxylates having an average of from 3 to 30 oxyethylene units, such as from about 4 to about 23. Non-limiting examples of such alkyl ethoxylates include laureth-3 (a lauryl ethoxylate having an average of 3 oxyethylene units), laureth-23 (a lauryl ethoxylate having an average of 23 oxyethylene units), ceteth-10 (acetyl ethoxylate having an average of 10 oxyethylene units), steareth-2 (a stearyl ethoxylate having an average of 2 oxyethylene units) and steareth-10 (a stearyl ethoxylate having an average of 10 oxyethylene units). These alkyl ethoxylate emollients are typically used in combination with the petroleum-based emollients, such as petrolatum, at a weight ratio of alkyl ethoxylate emollient to petroleum-based emollient of from about 1:1 to about 1:3, and/or from about 1:1.5 to about 1:2.5.

The lotion compositions of the present invention may include an "immobilizing agent", so-called because they are believed to act to prevent migration of the emollient so that it can remain primarily on the surface of the fibrous structure to which it is applied so that it may deliver maximum softening benefit as well as be available for transferability to the user's skin. Suitable immobilizing agents for the present invention can comprise polyhydroxy fatty acid esters, polyhydroxy fatty acid amides, and mixtures thereof. To be useful as immobilizing agents, the polyhydroxy moiety of the ester or amide should have at least two free hydroxy groups. It is believed that these free hydroxy groups are the ones that co-crosslink through hydrogen bonds with the cellulosic fibers of the tissue paper web to which the lotion composition is applied and homo-crosslink, also through hydrogen bonds, the hydroxy groups of the ester or amide, thus entrapping and immobilizing the other components in the lotion matrix. Non-limiting examples of suitable esters and amides will have three or more free hydroxy groups on the polyhydroxy moiety and are typically nonionic in character. Because of the skin sensitivity of those using paper products to which the lotion composition is applied, these esters and amides should also be relatively mild and non-irritating to the skin.

Suitable polyhydroxy fatty acid esters for use in the present invention will have the formula:

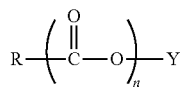

wherein R is a $C_5$-$C_{31}$ hydrocarbyl group, such as a straight chain $C_7$-$C_{19}$ alkyl or alkenyl and/or a straight chain $C_9$-$C_{17}$ alkyl or alkenyl and/or a straight chain $C_{11}$-$C_{17}$ alkyl or alkenyl, or mixture thereof; Y is a polyhydroxyhydrocarbyl moiety having a hydrocarbyl chain with at least 2 free hydroxyls directly connected to the chain; and n is at least 1. Suitable Y groups can be derived from polyols such as glycerol, pentaerythritol; sugars such as raffinose, maltodextrose, galactose, sucrose, glucose, xylose, fructose, maltose, lactose, mannose and erythrose; sugar alcohols such as erythritol, xylitol, malitol, mannitol and sorbitol; and anhydrides of sugar alcohols such as sorbitan.

One class of suitable polyhydroxy fatty acid esters for use in the present invention comprises certain sorbitan esters, such as sorbitan esters of $C_{16}$-$C_{22}$ saturated fatty acids.

Immobilizing agents include agents that are may prevent migration of the emollient into the fibrous structure such that the emollient remain primarily on the surface of the fibrous structure and/or sanitary tissue product and/or on the surface softening composition on a surface of the fibrous structure and/or sanitary tissue product and facilitate transfer of the lotion composition to a user's skin. Immobilizing agents may function as viscosity increasing agents and/or gelling agents.

Non-limiting examples of suitable immobilizing agents include waxes (such as ceresin wax, ozokerite, microcrystalline wax, petroleum waxes, fisher tropsh waxes, silicone waxes, paraffin waxes), fatty alcohols (such as cetyl, cetaryl, cetearyl and/or stearyl alcohol), fatty acids and their salts (such as metal salts of stearic acid), mono and polyhydroxy fatty acid esters, mono and polyhydroxy fatty acid amides, silica and silica derivatives, gelling agents, thickeners and mixtures thereof.

In one example, the lotion composition comprises at least one immobilizing agent and at least one emollient.

Skin Benefit Agent

One or more skin benefit agents may be included in the lotion composition of the present invention. If a skin benefit agent is included in the lotion composition, it may be present in the lotion composition at a level of from about 0.5% to about 80% and/or 0.5% to about 70% and/or from about 5% to about 60% by weight of the lotion.

Non-limiting examples of skin benefit agents include zinc oxide, vitamins, such as Vitamin B3 and/or Vitamin E, sucrose esters of fatty acids, such as Sefose 1618S (commercially available from Procter & Gamble Chemicals), antiviral agents, anti-inflammatory compounds, lipid, inorganic anions, inorganic cations, protease inhibitors, sequestration agents, chamomile extracts, aloe vera, *Calendula officinalis*, alpha bisalbolol, Vitamin E acetate and mixtures thereof.

Non-limiting examples of suitable skin benefit agents include fats, fatty acids, fatty acid esters, fatty alcohols, triglycerides, phospholipids, mineral oils, essential oils, sterols, sterol esters, emollients, waxes, humectants and combinations thereof.

In one example, the skin benefit agent may be any substance that has a higher affinity for oil over water and/or provides a skin health benefit by directly interacting with the skin. Suitable examples of such benefits include, but are not limited to, enhancing skin barrier function, enhancing moisturization and nourishing the skin.

The skin benefit agent may be alone, included in a lotion composition and/or included in a surface softening composition. A commercially available lotion composition comprising a skin benefit agent is Vaseline® Intensive Care Lotion (Chesebrough-Pond's, Inc.).

The lotion composition may be a transferable lotion composition. A transferable lotion composition comprises at least one component that is capable of being transferred to an opposing surface such as a user's skin upon use. In one example, at least 0.1% of the transferable lotion present on the user contacting surface transfers to the user's skin during use.

Other Ingredients

Other optional ingredients that may be included in the lotion composition include vehicles, perfumes, especially long lasting and/or enduring perfumes, antibacterial actives, antiviral actives, disinfectants, pharmaceutical actives, film formers, deodorants, opacifiers, astringents, solvents, cooling sensate agents, such as camphor, thymol and menthol.

Vehicle

As used herein a "vehicle" is a material that can be used to dilute and/or emulsify agents forming the surface softening composition and/or lotion composition to form a dispersion/emulsion. A vehicle may be present in the surface softening composition and/or lotion composition, especially during application of the surface softening composition and/or to the fibrous structure. A vehicle may dissolve a component (true solution or micellar solution) or a component may be dispersed throughout the vehicle (dispersion or emulsion). The vehicle of a suspension or emulsion is typically the continuous phase thereof. That is, other components of the dispersion or emulsion are dispersed on a molecular level or as discrete particles throughout the vehicle.

Suitable materials for use as the vehicle of the present invention include hydroxyl functional liquids, including but not limited to water. In one example, the lotion composition comprises less than about 20% and/or less than about 10% and/or less than about 5% and/or less than about 0.5% w/w of a vehicle, such as water. In one example, the surface softening composition comprises greater than about 50% and/or greater than about 70% and/or greater than about 85% and/or greater than about 95% and/or greater than about 98% w/w of a vehicle, such as water.

Process Aids

Process aids may also be used in the lotion compositions of the present invention. Non-limiting examples of suitable process aids include brighteners, such as TINOPAL CBS-X®, obtainable from CIBA-GEIGY of Greensboro, N.C.

Non-Limiting Examples

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

Non-limiting examples of product formulations disclosed in the present specification are summarized below.

EXAMPLES

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

Non-limiting examples of product formulations disclosed in the present specification are summarized below.

Example 1—Reaction with Butenylyzed Canola Oil (BCO): Effect of BCO Content

The experimental apparatus consisted of a three-necked round-bottom flask equipped with a magnetic stir bar, a septum cap, and an outlet to a vacuum system. External heating was provided via a silicone oil bath. The septum was used to add metathesis catalyst and withdraw samples. The vacuum system consisted of a TEFLON diaphragm pump and a pressure controller.

Butenylyzed canola oil (BCO) was made by cross-metathesizing canola oil (Wesson) with 1-butene (1 mol of 1-butene per mol of C=C double bonds in the oil) according to the methods described in U.S. Pat. No. 8,957,268. The BCO was mixed with canola oil (Wesson) and charged to a 500-mL round-bottom flask. The oil mixture was purged with nitrogen gas (Airgas, UHP) for about 15 minutes. The reaction flask was heated to about 70° C. and evacuated to the desired pressure (see below: 200 or 450 torr absolute.) A toluene (Sigma-Aldrich, anhydrous 99.8%) solution of C827 metathesis catalyst (10 mg/mL; Materia, Inc., Pasadena, Calif., USA) was added to the oil mixture to achieve a catalyst level of 100 ppmwt. The reaction was held at 70° C. while maintaining a dynamic vacuum at the desired pressure for 2 hours. A small sample of the reaction mixture was removed by syringe, quenched with ethyl vinyl ether (Sigma-Aldrich), and analyzed by GPC to determine the weight-average molecular weight ($M_w$) of the resulting glyceride oligomers. Table 5 shows the resulting weight average $M_w$ for 13 different reactions, where the percentage of BCO was increased. The percentage of BCO reported is a weight percentage of BCO relative to the total weight of oil (BCO and canola oil combined). The weight average molecular weights are reported in units of g/mol.

TABLE 5

| Percentage BCO (wt %) | $M_w$ 450 Torr (absolute) Experiments | $M_w$ 200 Torr (absolute) Experiments |
|---|---|---|
| 0 | 11,700 | 12,300 |
| 10 | 12,800 | 13,100 |
| 30 | 13,600 | 14,800 |
| 50 | 14,400 | 18,000 |
| 70 | 14,100 | 22,500 |
| 90 | 14,500 | — |
| 100 | 25,900 | 56,600 |

Example 2—Reaction with Butenylyzed Canola Oil (BCO): Effect of Reaction Time

Using the same apparatus and procedures as those described in Example 1, 50 wt %/50 wt % mixtures of BCO and canola oil were reacted for four hours while maintaining a dynamic vacuum at either 200 or 450 torr (absolute) with samples being taken hourly. Table 6 shows the weight averaged molecular weight ($M_w$) over time. The molecular weight ($M_w$) is reported in units of g/mol.

TABLE 6

| Time (hr) | $M_w$ 450 Torr (absolute) Experiments | $M_w$ 200 Torr (absolute) Experiments |
|---|---|---|
| 1 | 13,600 | 16,100 |
| 2 | 13,600 | 18,000 |
| 3 | 13,100 | 19,000 |
| 4 | 13,000 | 20,000 |

Example 3—Cross-Metathesis of Canola Oil with Butenylyzed Palm Oil (BPO): Effect of Feedstock Composition Using the same apparatus and procedures as those described in Example 1, mixtures of BPO (Wilmar) and Canola oil were reacted for two hours. Table 7 shows the molecular weight ($M_w$) after two hours. The molecular weight ($M_w$) is reported in units of g/mol.

TABLE 7

| Percentage BPO (wt %) | $M_w$ 200 Torr (absolute) Experiment |
|---|---|
| 15 | 9,400 |
| 25 | 8,100 |
| 35 | 5,900 |

Example 4—Canola Oil Self-Metathesis (Comparative Example)

Using the same apparatus (except that a two-stage rotary vane pump was used for experiments run under dynamic vacuums of less than 10 torr absolute and procedure described in Example 1, canola oil was reacted for two hours. Table 8 shows the molecular weight ($M_w$) after two hours. The molecular weight ($M_w$) is reported in units of g/mol.

TABLE 8

| Absolute Pressure (Torr) | 100-g Scale ($M_w$) | 1-kg Scale ($M_w$) |
|---|---|---|
| 450 | 11,700 | — |
| 200 | 12,300 | — |
| 75 | 12,600 | — |
| 8 | 14,500 | 13,600 |
| 3.2 | — | 15,100 |
| 2.5 | — | 15,900 |

A portion (473 g) of the product from the 1 kg experiment run at 2.5 torr was diluted with heptane (BDH, laboratory reagent, 500 mL). Magnesol-600-R (Dallas Group of Am., 10 g) was added and the resulting mixture was stirred under nitrogen at ambient temperature for 30 minutes. The Magnesol-600-R was removed by vacuum filtration. A fresh charge of Magnesol-600-R (10 g) was added and the resulting mixture was stirred under nitrogen at ambient temperature for 30 minutes. Heptane was removed by rotovap. Olefins were removed by vacuum distillation in a 1 L three-neck round-bottom equipped with a short-path distillation head; a condenser chilled to 5° C.; a 20 mL round bottom flask chiller with dry-ice/isopropanol; a magnetic stir bar; and thermometers to measure liquid temperature and vapor temperature. Heating was supplied through a resistive heating mantle. Vacuum was supplied by a two-stage rotary vane vacuum pump. The bulk of olefinic material was removed by gradually increasing the heat input. A very small nitrogen purge was maintained on the system for the initial part of the distillation. The final pressure was about 0.1 torr absolute and the final liquid temperature was 192° C. The olefin content was less than 1% by mass. A sample of the final product was trans-esterified and analyzed by GC to determine the Fatty Acid Residues as described above. See Table 9 (below).

Example 5—Cross-Metathesis of Canola with Butenylyzed Canola Oil (BCO) on One-Kilogram Scale with Catalyst Removal and Olefin Stripping Using a similar metathesis procedure and apparatus to the one described in Example 1, a 1 kg mixture of BCO and canola oil (50 wt %/50 wt %) was reacted for two hours. Catalyst removal was accomplished by THMP treatment. THMP treatments consisted of adding 1 M tris(hydroxymethyl)phosphine (THMP, 1.0 M, 50 mol THMP/mol C827) in water, stirring at ambient temperature for 2 hours, and then washing the product with water (2×100 mL) in a separatory funnel. Olefin by-products and traces of residual water were removed from the product by the same procedure and distillation apparatus as described in Example 4 except that no nitrogen purge was used. The final pressure was about 0.2 torr absolute and the final liquid temperature was 195° C. The olefin content was less than 1% by mass and the $M_w$ of the glyceride oligomer was 16,700 g/mol. A sample of the final product was trans-esterified and analyzed by GC to determine the Fatty Acid Residues as described above. See Table 9 (below).

Example 6—Cross-Metathesis of Soybean Oil with Butenylyzed Soybean Oil (BSO) on a Two-Kilogram Scale with Catalyst Removal and Olefin Stripping Using the same procedure and an apparatus similar to that described in Example 1 except that a 3 L flask was used in place of the 500 mL flask, a 1 kg, 50/50 wt % mixture of butenylyzed soybean oil and soybean oil (Costco) was reacted for about four hours using 100 ppm wt C827 catalyst. An additional 40 ppm of catalyst was added and after about two more hours the reaction was quenched with ethyl vinyl ether. Olefin by-products and traces of residual water were removed from a 265 g sample of the product by a similar distillation procedure and apparatus as described in Example 5. The final pressure was about 0.1 torr absolute and the final liquid temperature was 195° C. The olefin content was less than 1% by mass. A sample of the final product was trans-esterified and analyzed by GC to determine the Fatty Acid Residues as described above. See Table 9 (below).

Example 7—Cross-Metathesis of Canola Oil with Butenylyzed Canola Oil (BCO) on a Twelve-Kilogram Scale with Catalyst Removal and Olefin Stripping This example was conducted in a 5 gallon Stainless Steel Reactor (Parr) equipped with an impeller, a port for air-free catalyst addition, and a Strahman valve for sampling. The reactor system was completely purged with nitrogen before beginning.

The BCO (6.16 kg) was produced by a procedure similar to that used in Example 1 and mixed with canola oil (6.12 kg) and charged to the reactor. The oil mixture was stirred at 200 rpm while purging with nitrogen gas for about 30 minutes through a dip tube at a rate of 0.5 SCFM. The reactor was evacuated to 200 torr (absolute) and heated to 70° C. The C827 metathesis catalyst (1.0 g, Materia, Inc., Pasadena, Calif., USA) was suspended in canola oil (50 mL) and added to the oil mixture. The reaction was maintained at 70° C. and at 200 torr for four hours. An additional charge of C827 catalyst (0.25 g) suspended in canola oil (50 mL) was added to the reaction. After an additional two hours, the reactor was back filled with nitrogen.

Catalyst removal was conducted in a 5 gallon jacketed glass reactor equipped with an agitator, a bottom drain valve, and ports for adding reagents. A 0.12 M aqueous solution of THMP (0.31 kg) was charged to the glass reactor and pre-heated to about 90° C. The crude metathesis reaction product, still at 70° C., was transferred to the glass reactor and the mixture was stirred (150 rpm) at about 80-90° C. for 20 minutes. The following wash procedure was done twice. Deionized water (1.9 kg at 60° C.) was added to the reactor which was heated to 80-90° C. and the resulting mixture was stirred (100 rpm) for 20 minutes. The stirrer was stopped and the reactor contents were allowed to settle for 16 hours at a constant temperature of 80-90° C. The bottom aqueous layer was carefully drained off. Following the second wash, the washed product was cooled and then drained to a container.

The washed product was divided into two portions to remove olefins and residual water, which was done using a similar distillation procedure and apparatus as described in Example 5. The final distillation pressure was about 0.1 torr absolute and the final liquid temperature was about 190° C. Following distillation, the two portions were recombined. A small sample of the recombined product was trans-esterified and analyzed by GC to determine the Fatty Acid Residues as described above. See Table 9 (below).

The fatty acid residues in the final glyceride oligomer products produced in examples 4, 5, 6, and 7 were analyzed by the method described above after olefins were vacuum distilled to below 1% by weight. The $C_{10-14}$ unsaturated fatty acid esters, $C_{10-13}$ unsaturated fatty acid esters, and $C_{10-11}$ unsaturated fatty acid esters were calculated and are reported in Table 10.

TABLE 9

| Fatty Acid Methyl Ester Component | Example 4 Product (wt %) | Example 5 Product (wt %) | Example 6 Product (wt %) | Example 7 Product (wt %) |
| --- | --- | --- | --- | --- |
| C10:1 | — | 6.72 | 2.97 | 4.58 |
| C12:1 | 1.74 | 7.33 | 4.77 | 6.25 |
| C13:2 | — | 1.33 | 0.71 | 0.72 |
| C15:1 | 8.53 | 5.05 | 12.21 | 5.05 |
| C16:0 | 5.89 | 6.12 | 14.69 | 5.65 |
| C16:1 | 1.97 | 1.08 | 0.43 | 1.06 |
| C18:0 | 2.53 | 2.65 | 6.05 | 2.58 |
| C18:1 | 35.87 | 19.52 | 6.31 | 19.80 |
| C18:2 | 0.80 | 1.33 | 3.46 | 0.89 |
| C18:3 | 0.64 | 0.39 | 0.42 | 0.27 |
| C20:0 | 1.30 | 0.85 | 0.48 | 0.90 |
| C20:1 | 2.10 | 1.08 | 0.29 | 1.15 |
| C21:2 | 2.82 | 3.59 | 1.76 | 3.61 |
| C22:0 | 0.53 | 0.56 | 0.08 | 0.60 |
| C18:1 diester | 26.80 | 29.10 | 21.84 | 29.85 |
| C20:1 diester | 3.09 | 3.11 | 1.02 | 3.08 |
| C21:2 diester | 1.00 | 5.10 | 6.40 | 4.95 |

TABLE 10

| Unsaturated Fatty Acid Ester Component | Example 4 Product (wt %) | Example 5 Product (wt %) | Example 6 Product (wt %) | Example 7 Product (wt %) |
| --- | --- | --- | --- | --- |
| $C_{10-14}$ unsaturated fatty acid esters | 1.74 | 15.38 | 8.45 | 11.55 |
| $C_{10-13}$ unsaturated fatty acid esters | 1.74 | 15.38 | 8.45 | 11.55 |
| $C_{10-11}$ unsaturated fatty acid esters | — | 6.72 | 2.97 | 4.58 |

Example 8—Diene-Selective Hydrogenation of Crude Glyceride Polymer

In a 600 mL Parr reactor, 170 g of crude metathesis product from Example 6, 170 g of n-decane (Sigma-Aldrich, anhydrous, ≥99%), and 0.60 g PRICAT 9908 (Johnson Matthey Catalysts); saturated triglyceride wax removed before reaction via a toluene wash) were purged with $N_2$, then $H_2$, for 15 minutes each, then reacted at 160° C. under 100 psig Hz (Airgas, UHP) with 1000 rpm stirring with a gas dispersion impeller. The Hz pressure was monitored and the reactor was refilled to 100 psig when it decreased to about 70 psig. After six hours, the reaction was cooled below 50° C. and the hydrogen was displaced by nitrogen gas. The reaction mixture was vacuum filtered through diatomaceous earth to remove the catalyst solids. Olefin by-products and n-decane were removed from the product by a similar distillation procedure and apparatus as described in Example 5. The final distillation pressure was about 0.1 torr absolute and the final liquid temperature was 195° C. The olefin content was less than 1% by mass. A sample of the final product was trans-esterified with methanol and analyzed by GC. The level of polyunsaturated C18 fatty acid methyl esters (C18:2 plus C18:3) were reduced from 3.88% in the starting material to 1.13% and the C21:2 diester was reduced from 6.40% in the starting material to 3.72%.

Non-Limiting Examples of Surface Softening Compositions

Example 9

The glyceride copolymer can be in the form of an emulsion. Non-limiting emulsion compositions are in the table below. The emulsions are prepared by heating the glyceride copolymer with the emulsifiers and Tinopal process aid to a temperature between 45° C. and 70° C. in a suitable container using a high shear mixer such as an IKA Ultra Turrax. Water and PEG400 are mixed in a separate vessel, and then added in small increments to the oil phase while mixing at high shear. Each increment of water is worked-in before adding the next increment. After the total water addition, the resultant emulsion has a glyceride copolymer content of 20%.

One of ordinary skill in the art appreciates that other emulsion forms and/or components thereof, such as different emulsifying agents, may be formed and/or used, and that other process equipment suitable for forming emulsions may be used.

| EXAMPLE COMPOSITION | A | B | C | D | E | F | G | H |
| --- | --- | --- | --- | --- | --- | --- | --- | --- |
| Glyceride copolymer according to any one of Examples 1-8 | 20 | 20 | 20 | 20 | 20 | 20 | 20 | 20 |
| Process aid Tinopal OB CO | 0.01 | 0.01 | 0.01 | 0.01 | 0.01 | 0.01 | 0.01 | 0.01 |
| PEG 400 | 8.6 | | 8.6 | | 8.6 | | 8.6 | |
| Emulsifier 1[1] | 0.9 | 0.9 | 0.9 | 0.9 | 0.9 | 0.9 | 0.9 | 0.9 |
| Emulsifier 2[2] | 0.35 | 0.35 | 0.35 | 0.35 | 0.35 | 0.35 | 0.35 | 0.35 |
| Water, suds suppressor, stabilizers, pH control agents, buffers, dyes & other optional ingredients | q.s. to 100% | q.s. to 100% | q.s. to 100% | q.s. to 100% | q.s. to 100% | q.s. to 100% | q.s. to 100% | q.s. to 100% |

[1]Brij S2, available from Croda USA, Edison, NJ
[2]Brij S10, available from Croda USA, Edison, NJ Example 10

The emulsions from Example 9 may be combined with additional surface softening agents as follows:

| EXAMPLE COMPOSITION | A | B | C | D | E | F | G |
| --- | --- | --- | --- | --- | --- | --- | --- |
| Glyceride copolymer according to any one of Examples 1-8 | 10 | 10 | 10 | 16 | 10 | 16 | 10 |
| Additional Surface Softening Agent[1] (MR1003 - Silicone) | | | 10 | 4 | 10 | 4 | 5 |
| Quaternary ammonium compound[2] | 10 | 10 | | | | | 5 |

-continued

| EXAMPLE COMPOSITION | A | B | C | D | E | F | G |
|---|---|---|---|---|---|---|---|
| PEG 400 | 8.6 | 8.6 | | | | | |
| Water, emulsifiers, suds suppressor, process aids, stabilizers, pH control agents, buffers, dyes & other optional ingredients | q.s. to 100% | q.s. to 100% | q.s. to 100% | q.s. to 100% | q.s. to 100% | q.s. to 100% | q.s. to 100% |

[1]MR1003, available from Wacker Chemie
[2]Diester ditallow dimethyl ammonium methyl sulfate Non-Limiting Examples of Fibrous Structures of the Present Invention Example 11

A 3% by weight aqueous slurry of NSK (northern softwood Kraft) is made in a conventional re-pulper. The NSK slurry is refined, and a 2% solution of Kymene 557LX is added to the NSK stock pipe at a rate sufficient to deliver 1% Kymene 557LX by weight of the dry fibers. The absorption of the wet strength resin is enhanced by passing the treated slurry though an in-line mixer. KYMENE 557LX is supplied by Hercules Corp of Wilmington, Del. A 1% solution of carboxy methyl cellulose is added after the in-line mixer at a rate of 0.15% by weight of the dry fibers to enhance the dry strength of the fibrous structure. The aqueous slurry of NSK fibers passes through a centrifugal stock pump to aid in distributing the CMC. An aqueous dispersion of DiTallow DiMethyl Ammonium Methyl Sulfate (DTDMAMS) (170° F./76.6° C.) at a concentration of 1% by weight is added to the NSK stock pipe at a rate of about 0.05% by weight DTDMAMS per ton of dry fiber weight.

A 3% by weight aqueous slurry of eucalyptus fibers is made in a conventional re-pulper. A 2% solution of Kymene 557LX is added to the eucalyptus stock pipe at a rate sufficient to deliver 0.25% Kymene 557LX by weight of the dry fibers. The absorption of the wet strength resin is enhanced by passing the treated slurry though an in-line mixer.

The NSK fibers are diluted with white water at the inlet of a fan pump to a consistency of about 0.15% based on the total weight of the NSK fiber slurry. The eucalyptus fibers, likewise, are diluted with white water at the inlet of a fan pump to a consistency of about 0.15% based on the total weight of the eucalyptus fiber slurry. The eucalyptus slurry and the NSK slurry are directed to a multi-channeled headbox suitably equipped with layering leaves to maintain the streams as separate layers until discharged onto a traveling Fourdrinier wire. A three-chambered headbox is used. The eucalyptus slurry containing 65% of the dry weight of the tissue ply is directed to the chamber leading to the layer in contact with the wire, while the NSK slurry comprising 35% of the dry weight of the ultimate tissue ply is directed to the chamber leading to the center and inside layer. The NSK and eucalyptus slurries are combined at the discharge of the headbox into a composite slurry.

The composite slurry is discharged onto the traveling Fourdrinier wire and is dewatered assisted by a deflector and vacuum boxes. The Fourdrinier wire is of a 5-shed, satin weave configuration having 105 machine-direction and 107 cross-machine-direction monofilaments per inch. The speed of the Fourdrinier wire is about 800 fpm (feet per minute).

The embryonic wet web is dewatered to a consistency of about 15% just prior to transfer to a patterned drying fabric made in accordance with U.S. Pat. No. 4,529,480. The speed of the patterned drying fabric is the same as the speed of the Fourdrinier wire. The drying fabric is designed to yield a pattern-densified tissue with discontinuous low-density deflected areas arranged within a continuous network of high density (knuckle) areas. This drying fabric is formed by casting an impervious resin surface onto a fiber mesh supporting fabric. The supporting fabric is a 45×52 filament, dual layer mesh. The thickness of the resin cast is about 9 mil above the supporting fabric. The drying fabric for forming the paper web has about 562 discrete deflection regions per square inch. The area of the continuous network is about 50 percent of the surface area of the drying fabric.

Further dewatering is accomplished by vacuum assisted drainage until the web has a fiber consistency of about 25%. While remaining in contact with the patterned drying fabric, the web is pre-dried by air blow-through pre-dryers to a fiber consistency of about 65% by weight. The web is then adhered to the surface of a yankee dryer, and removed from the surface of the dryer by a doctor blade at a consistency of about 97 percent. The Yankee dryer is operated at a surface speed of about 800 feet per minute. The dry web is passed through a rubber-on-steel calendar nip. The dry web is wound onto a roll at a speed of 680 feet per minute to provide dry foreshortening of about 15 percent. The resulting web has between about 562 and about 650 relatively low density domes per square inch (the number of domes in the web is between zero percent to about 15 percent greater than the number of cells in the drying fabric, due to dry foreshortening of the web).

Two plies are combined with the wire side facing out with plybond glue and/or mechanical polybonding wheels, to make the product. During the converting process, one or more surface softening compositions is applied via spraying and/or slot extruding to one or both outside surfaces of the product. The surface softening composition comprises a surface softening agent of the present invention; namely, one or more glyceride copolymers. Optionally, the product surface may comprise another surface softening composition, in combination with or discrete from the glyceride copolymers, that comprises a quaternary ammonium compound and/or a silicone softening agent. The surface softening composition is applied to the product at a rate of 10% by weight. The product may be wound into a product roll, such as for toilet paper and/or paper towels, or can be slit, and then folded into finished 2-ply facial tissue product. The product(s) are tested in accordance with the test methods described below.

Example 12

A sheet with 32%×33%×35% layering consist of fabric layer, center layer and wire layer. The entire sheet has 70% by weight on a dry fiber basis of eucalyptus pulp fibers of the present invention and 30% by weight on a dry fiber basis of northern softwood kraft (NSK) pulp fibers is made.

An aqueous slurry of the eucalyptus pulp fibers is prepared at about 3% by weight using a conventional repulper. Separately, an aqueous slurry of the NSK pulp fibers of about 3% by weight is made up using a conventional repulper.

In order to impart temporary wet strength to the finished fibrous structure, a 1% dispersion of a temporary wet strength additive (e.g., Parez® commercially available from Kemira) is prepared and is added to the NSK fiber stock pipe at a rate sufficient to deliver 0.3% temporary wet strength additive based on the dry weight of the NSK pulp fibers. The absorption of the temporary wet strength additive is enhanced by passing the treated NSK pulp fiber slurry through an in-line mixer.

The eucalyptus pulp fiber slurry is diluted with white water at the inlet of a fan pump to a consistency of about 0.15% based on the total weight of the eucalyptus pulp fiber slurry. The NSK pulp fibers, likewise, are diluted with white water at the inlet of a fan pump to a consistency of about 0.15% based on the total weight of the NSK pulp fiber slurry. The eucalyptus pulp fiber slurry and the NSK pulp fiber slurry are both directed to a layered headbox capable of maintaining the slurries as separate streams until they are deposited onto a forming fabric on the Fourdrinier.

"DC 2310" (Dow Corning, Midland, Mich.) antifoam is dripped into the wirepit to control foam to maintain white water levels of 10 ppm.

The paper making machine has a layered headbox with a top chamber, a center chamber, and a bottom chamber. The eucalyptus pulp fiber slurry is pumped through the top and bottom headbox chambers and, simultaneously, the NSK pulp fiber slurry is pumped through the center headbox chamber and delivered in superposed relation onto a Fourdrinier wire to form thereon a three-layer embryonic web, of which about 70% is made up of the eucalyptus pulp fibers and about 30% is made up of the NSK pulp fibers. Dewatering occurs through the Fourdrinier wire and is assisted by a deflector and vacuum boxes. The Fourdrinier wire is of a 5-shed, satin weave configuration having 87 machine-direction and 76 cross-machine-direction monofilaments per inch, respectively. The speed of the Fourdrinier wire is about 750 fpm (feet per minute).

The embryonic wet web is transferred from the Fourdrinier wire, at a fiber consistency of about 15% at the point of transfer, to a patterned drying fabric. The speed of the patterned drying fabric is about the same as the speed of the Fourdrinier wire. The drying fabric is designed to yield a pattern densified tissue with discontinuous low-density deflected areas arranged within a continuous network of high density (knuckle) areas. This drying fabric is formed by casting an impervious resin surface onto a fiber mesh supporting fabric. The supporting fabric is a 98×62 filament, dual layer mesh. The thickness of the resin cast is about 12 mils above the supporting fabric.

Further de-watering is accomplished by vacuum assisted drainage until the web has a fiber consistency of about 30%.

While remaining in contact with the patterned drying fabric, the web is pre-dried by air blow-through pre-dryers to a fiber consistency of about 65% by weight.

After the pre-dryers, the semi-dry web is transferred to the Yankee dryer and adhered to the surface of the Yankee dryer with a sprayed creping adhesive. The creping adhesive is an aqueous dispersion with the actives consisting of about 22% polyvinyl alcohol, about 11% CREPETROL A3025, and about 67% CREPETROL R6390. CREPETROL A3025 and CREPETROL R6390 are commercially available from Hercules Incorporated of Wilmington, Del. The creping adhesive is delivered to the Yankee surface at a rate of about 0.15% adhesive solids based on the dry weight of the web. The fiber consistency is increased to about 97% before the web is dry creped from the Yankee with a doctor blade.

The doctor blade has a bevel angle of about 25 degrees and is positioned with respect to the Yankee dryer to provide an impact angle of about 81 degrees. The Yankee dryer is operated at a temperature of about 350° F. and a speed of about 800 fpm. The fibrous structure is wound in a roll using a surface driven reel drum having a surface speed of about 656 feet per minute.

Two plies are combined with the wire side facing out with plybond glue and/or mechanical polybonding wheels, to make the product. During the converting process, one or more surface softening compositions is applied via spraying and/or slot extruding to one or both outside surfaces of the product. The surface softening composition comprises a surface softening agent of the present invention; namely, one or more glyceride copolymers. Optionally, the product surface may comprise another surface softening composition, in combination with or discrete from the glyceride copolymers, that comprises a quaternary ammonium compound and/or a silicone softening agent. The surface softening composition is applied to the product at a rate of 10% by weight. The product may be wound into a product roll, such as for toilet paper and/or paper towels, or can be slit, and then folded into finished 2-ply facial tissue product. The product(s) are tested in accordance with the test methods described below.

Example 13

A first stock chest of 100% eucalyptus fiber is prepared with a conventional pulper to have a consistency of about 3.0% by weight. The thick stock of the first hardwood chest is directed through a thick stock line where a wet-strength additive, HERCOBOND 1194 (commercially available from Ashland Inc.), is added in-line to the thick stock at about 0.5 lbs. per ton of dry fiber as it moves to the first fan pump.

A second stock chest of 100% eucalyptus fiber is prepared with a conventional pulper to have a consistency of about 3.0% by weight. The thick stock of the second chest is directed through a thick stock line where a wet-strength additive, HERCOBOND 1194, is added in-line to the thick stock at about 0.5 lbs. per ton of dry fiber as it moves to the second fan pump.

A third stock chest is prepared with 100% NSK fiber with a final consistency of about 3.0% by weight. The blended thick stock is directed to a disk refiner where it is refined to a Canadian Standard Freeness of about 580 to 625. The refined, NSK thick stock of the third stock chest is then directed through a thick stock line where a wet-strength additive, HERCOBOND 1194, is added to the thick stock at about 1.5 lbs. per ton of dry fiber. The refined, 100% NSK thick stock is then blended in-line with the eucalyptus thick stock from the second stock chest to yield a blended thick stock of about 55% eucalyptus and 45% NSK fiber as it is directed to the second fan pump.

A fourth stock chest of 100% trichome fiber is prepared with a conventional pulper to have a consistency of about 1.0% by weight. The thick stock of the fourth chest is directed through a thick stock line where it is blended in-line with the eucalyptus of the first stock chest to yield a blend of about 81% eucalyptus and 19% trichome fiber as it is directed to the first fan pump.

The blended eucalyptus and trichome fiber slurry diluted by the first fan pump is directed through the bottom headbox chamber (Yankee-side layer). The blend of eucalyptus fiber and NSK fiber slurry diluted by the second fan pump is directed through the center headbox chamber and to the top headbox chamber (Fabric-side) and is delivered in superposed relation to the fixed-roof former's forming wire to form thereon a three-layer embryonic web, of which about 34.5% of the top side is made up of blend of eucalyptus and NSK fibers, center is made up of about 34.5% of a blend of eucalyptus and NSK fibers and the bottom side (Yankee-side) is made up of about 31% of eucalyptus fibers and trichome fibers. Dewatering occurs through the outer wire and the inner wire and is assisted by wire vacuum boxes. Forming wire is an 84M design traveling at a speed of 800 fpm (feet per minute).

The embryonic wet web is transferred from the carrier (inner) wire, at a fiber consistency of about 24% at the point of transfer, to a patterned drying fabric. The speed of the patterned drying fabric is about 800 fpm (feet per minute). The drying fabric is designed to yield a pattern of substantially machine direction oriented linear channels having a continuous network of high density (knuckle) areas, such linear channels being the structure which imparts line elements to the web. This drying fabric is formed by casting an impervious resin surface onto a fiber mesh supporting fabric. The supporting fabric is a 127×52 filament, dual layer mesh. The thickness of the resin cast is about 12 mils above the supporting fabric.

While remaining in contact with the patterned drying fabric, the web is pre-dried by air blow-through pre-dryers to a fiber consistency of about 60% by weight.

After the pre-dryers, the semi-dry web is transferred to the Yankee dryer through a nip formed by the pressure roll surface and the Yankee surface where the Yankee surface has been pre-treated with a sprayed a creping adhesive coating. The coating is a blend consisting of Georgia Pacific's UNICREPE 457T20 and Vinylon Works' VINYLON 8844 at a ratio of about 92 to 8, respectively. The fiber consistency is increased to about 97% before the web is dry creped from the Yankee with a doctor blade.

The web is removed from the Yankee surface by a creping blade having a bevel angle of about 25 degrees and is positioned with respect to the Yankee dryer to provide an impact angle of about 81 degrees. The Yankee dryer is operated at a temperature of about 350° F. (177° C.) and a speed of about 800 fpm. The fibrous structure is wound in a roll using a surface driven reel drum having a surface speed of about 700 fpm (feet per minute). A surface softening composition is applied to at least one surface of the fibrous structure. The surface softening composition comprises a surface softening agent of the present invention; namely, one or more glyceride copolymers. Optionally, the product surface may comprise another surface softening composition, in combination with or discrete from the glyceride copolymers, that comprises a quaternary ammonium compound and/or a silicone softening agent. In addition, the fibrous structure may be subjected to post treatments such as embossing and/or tuft generating. The fibrous structure may be subsequently converted into a two-ply sanitary tissue product having a basis weight of about 39 g/m². The plies of the two ply product are converted with Yankee-side surfaces out in order to form the consumer facing surfaces of the two-ply sanitary tissue product.

Example 14

A first stock chest of 100% eucalyptus fiber is prepared with a conventional pulper to have a consistency of about 3.0% by weight. The thick stock of the first hardwood chest is directed through a thick stock line where a wet-strength additive, HERCOBOND 1194 (commercially available from Ashland Inc.), is added in-line to the thick stock at about 0.5 lbs. per ton of dry fiber as it moves to the first fan pump.

Additionally, a second stock chest of 100% eucalyptus fiber is prepared with a conventional pulper to have a consistency of about 3.0% by weight. The thick stock of the second hardwood chest is directed through a thick stock line where a wet-strength additive, HERCOBOND 1194, is added in-line to the thick stock at about 0.5 lbs. per ton of dry fiber as it moves to the second fan pump.

A third stock chest is prepared with 100% NSK fiber with a final consistency of about 3.0%. The blended thick stock is directed to a disk refiner where it is refined to a Canadian Standard Freeness of about 580 to 625. The NSK thick stock of the third stock chest is then directed through a thick stock line where a wet-strength additive, HERCOBOND 1194, is added to the thick stock at about 1.5 lbs. per ton of dry fiber. The refined, 100% NSK thick stock is then directed to a third fan pump.

A fourth stock chest of 100% trichome fiber is prepared with a conventional pulper to have a consistency of about 1.0% by weight. The thick stock of the fourth chest is directed through a thick stock line where it is blended in-line with the eucalyptus fiber thick stock from the first stock chest to yield a blend of about 81% eucalyptus and 19% trichome fiber as it is directed to the first fan pump.

The blended eucalyptus and trichome fiber slurry diluted by the first fan pump is directed through the bottom headbox chamber (Yankee-side layer). The NSK fiber slurry diluted by the third fan pump is directed through the center headbox chamber. The eucalyptus fiber slurry diluted by the second fan pump directed to the top headbox chamber (Fabric-side) and delivered in superposed relation to the fixed-roof former's forming wire to form thereon a three-layer embryonic web, of which about 34.5% of the top side is made up of pure eucalyptus fibers, center is made up of about 34.5% of a NSK fiber and the bottom side (Yankee-side) is made up of about 31% of pure eucalyptus fiber. Dewatering occurs through the outer wire and the inner wire and is assisted by wire vacuum boxes. Forming wire is an 84M design traveling at a speed of 800 fpm (feet per minute).

The embryonic wet web is transferred from the carrier (inner) wire, at a fiber consistency of about 24% at the point of transfer, to a patterned drying fabric. The speed of the patterned drying fabric is about 800 fpm (feet per minute). The drying fabric is designed to yield a pattern of substantially machine direction oriented linear channels having a continuous network of high density (knuckle) areas. This drying fabric is formed by casting an impervious resin surface onto a fiber mesh supporting fabric. The supporting fabric is a 127×52 filament, dual layer mesh. The thickness of the resin cast is about 12 mils above the supporting fabric.

While remaining in contact with the patterned drying fabric, the web is pre-dried by air blow-through pre-dryers to a fiber consistency of about 60% by weight.

After the pre-dryers, the semi-dry web is transferred to the Yankee dryer through a nip formed by the pressure roll surface and the Yankee surface where the Yankee surface has been pre-treated with a sprayed a creping adhesive coating. The coating is a blend consisting of Georgia Pacific's UNICREPE 457T20 and Vinylon Works' VINYLON 8844 at a ratio of about 92 to 8, respectively. The fiber consistency is increased to about 97% before the web is dry creped from the Yankee with a doctor blade.

The web is removed from the Yankee surface by a creping blade having a bevel angle of about 25 degrees and is positioned with respect to the Yankee dryer to provide an impact angle of about 81 degrees. The Yankee dryer is operated at a temperature of about 350° F. (177° C.) and a speed of about 800 fpm. The fibrous structure is wound in a roll using a surface driven reel drum having a surface speed of about 700 fpm (feet per minute). A surface softening composition is applied to at least one surface of the fibrous structure. The surface softening composition comprises a surface softening agent of the present invention; namely, one or more glyceride copolymers. Optionally, the product surface may comprise another surface softening composition, in combination with or discrete from the glyceride copolymers, that comprises a quaternary ammonium compound and/or a silicone softening agent. The product(s) are tested in accordance with the test methods described below. In addition, the fibrous structure may be subjected to post treatments such as embossing and/or tuft generating. The fibrous structure may be subsequently converted into a two-ply sanitary tissue product having a basis weight of about 48.8 g/m². The plies of the two ply product are converted with Yankee-side surfaces out in order to form the consumer facing surfaces of the two-ply sanitary tissue product.

Test Methods

Unless otherwise specified, all tests described herein including those described under the Definitions section and the following test methods are conducted on samples that have been conditioned in a conditioned room (CTCH room) at a temperature of 23° C.±1.0° C. and a relative humidity of 50%±2% for a minimum of 2 hours prior to the test. All plastic and paper board packaging articles of manufacture must be carefully removed from the paper samples prior to testing. The samples tested are "usable units." "Usable units" as used herein means sheets, flats from roll stock, pre-converted flats, and/or single or multi-ply products. Except where noted all tests are conducted in such conditioned room, all tests are conducted under the same environmental conditions and in such conditioned room. Discard any damaged product. Do not test samples that have defects such as wrinkles, tears, holes, and like. Samples conditioned as described herein are considered dry samples (such as "dry filaments") for testing purposes. All instruments are calibrated according to manufacturer's specifications.

Slip Stick Coefficient of Friction Test Method

Background

Friction is the force resisting the relative motion of solid surfaces, fluid layers, and material elements sliding against each other. Of particular interest here, 'dry' friction resists relative lateral motion of two solid surfaces in contact. Dry friction is subdivided into static friction between non-moving surfaces, and kinetic friction between moving surfaces. "Slip Stick", as applied here, is the term used to describe the dynamic variation in kinetic friction.

Friction is not itself a fundamental force but arises from fundamental electromagnetic forces between the charged particles constituting the two contacting surfaces. Textured surfaces also involve mechanical interactions, as is the case when sandpaper drags against a fibrous substrate. The complexity of these interactions makes the calculation of friction from first principles impossible and necessitates the use of empirical methods for analysis and the development of theory. As such, a specific sled material and test method was identified, and has shown correlation to human perception of surface feel.

Figure 2:
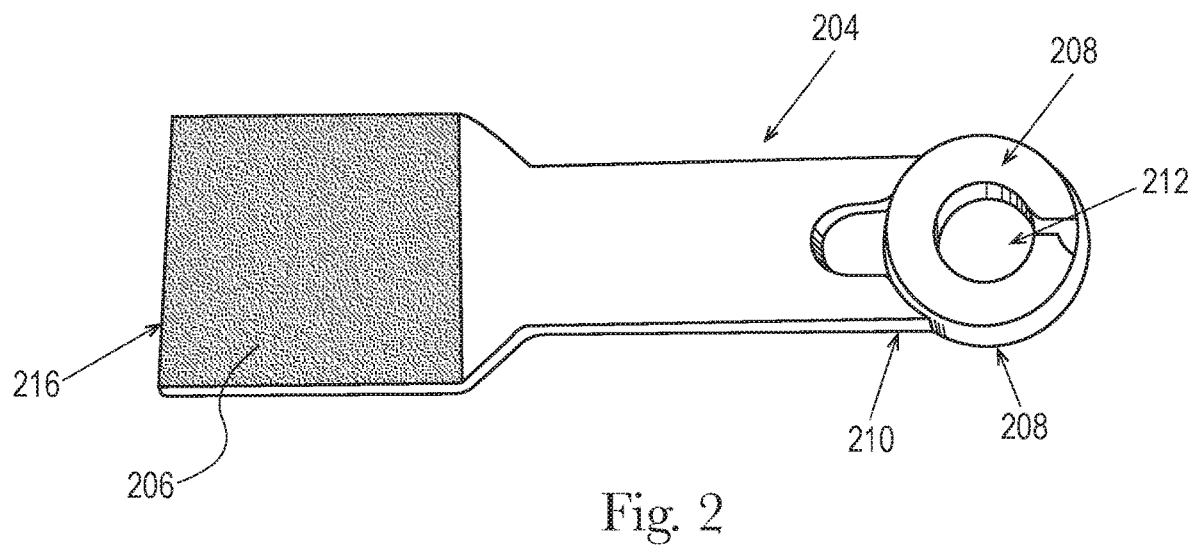
FIG. 2 is an image of a friction sled for use in the Slip Stick Coefficient of Friction Test Method.
Figure 3:
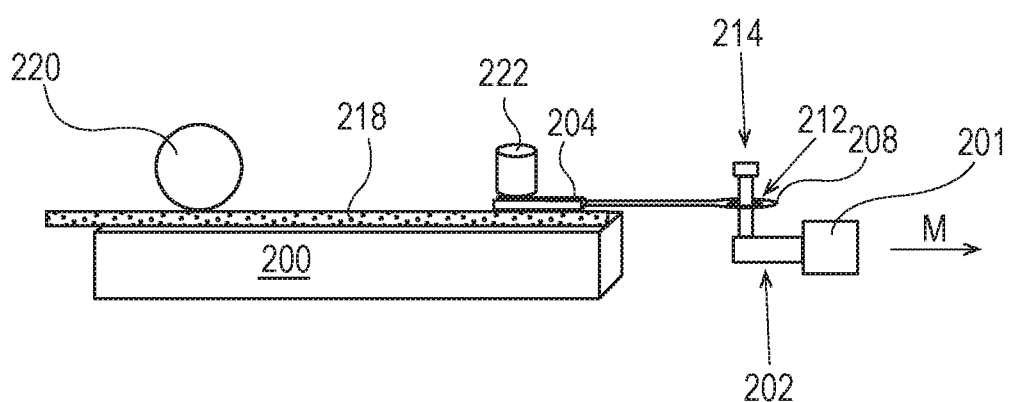
FIG. 3 is a schematic side view representation of a Slip Stick Coefficient of Friction Test Method set-up.

This Slip Stick Coefficient of Friction Test Method measures the interaction of a diamond file (120-140 grit) against a surface of a test sample, in this case a fibrous structure and/or sanitary tissue product, at a pressure of about 32 g/in² as shown in FIGS. 1-3. The friction measurements are highly dependent on the exactness of the sled material surface properties, and since each sled has no 'standard' reference, sled-to-sled surface property variation is accounted for by testing a test sample with multiple sleds, according to the equipment and procedure described below.

Equipment and Set-up

A Thwing-Albert (14 W. Collings Ave., West Berlin, N.J.) friction/peel test instrument (model 225-1) or equivalent if no longer available, is used, equipped with data acquisition software and a calibrated 2000 gram load cell that moves horizontally across the platform. Attached to the load cell is a small metal fitting (defined here as the "load cell arm") which has a small hole near its end, such that a sled string can be attached (for this method, however, no string will be used). Into this load cell arm hole, insert a cap screw (¾ inch #8-32) by partially screwing it into the opening, so that it is rigid (not loose) and pointing vertically, perpendicular to the load cell arm.

After turning instrument on, set instrument test speed to 2 inches/min, test time to 10 seconds, and wait at least 5 minutes for instrument to warm up before re-zeroing the load cell (with nothing touching it) and testing. Force data from the load cell is acquired at a rate of 52 points per second, reported to the nearest 0.1 gram force. Press the 'Return' button to move crosshead 201 to its home position.

A smooth surfaced metal test platform 200, with dimensions of 5 inches by 4 inches by ¾ inch thick, is placed on top of the test instrument platen surface, on the left hand side of the load cell 203, with one of its 4 inch by ¾ inch sides facing towards the load cell 203, positioned 1.125 inches d from the left most tip of the load cell arm 202 as shown in FIGS. 1 and 3.

Sixteen test sleds 204 are required to perform this test (32 different sled surface faces). Each is made using a dual sided, wide faced diamond file 206 (25 mm×25 mm, 120/140 grit, 1.2 mm thick, McMaster-Carr part number 8142A14) with 2 flat metal washers 208 (approximately ¹¹⁄₁₆th inch outer diameter and about ¹¹⁄₃₂nd inch inner diameter). The combined weight of the diamond file 206 and 2 washers 208 is 11.7 grams+/−0.2 grams (choose different washers until weight is within this range). Using a metal bonding adhesive (Loctite 430, or similar), adhere the 2 washers 208 to the c-shaped end 210 of the diamond file 206 (one each on either face), aligned and positioned such that the opening 212 is large enough for the cap screw 214 to easily fit into, and to make the total length of sled 204 to approximately 3 inches long. Clean sled 204 by dipping it, diamond face end 216 only, into an acetone bath, while at the same time gently brushing with soft bristled toothbrush 3-6 times on both sides of the diamond file 206. Remove from acetone and pat dry each side with Kimwipe tissue (do not rub tissue on diamond surface, since this could break tissue pieces onto sled surface). Wait at least 15 minutes before using sled 204 in a test. Label each side of the sled 204 (on the arm or washer, not on the diamond face) with a unique identifier (i.e., the first sled is labeled "1a" on one side, and "1b" on its other side). When all 16 sleds 204 are created and labeled, there are then 32 different diamond face surfaces for available for testing, labeled 1a and 1b through 16a and 16b. These sleds 204 must be treated as fragile (particularly the diamond surfaces) and handled carefully; thus, they are stored in a slide box holder, or similar protective container.

Sample Prep

If sample to be tested is bath tissue, in perforated roll form, then gently remove 8 sets of 2 connected sheets from the roll, touching only the corners (not the regions where the test sled will contact). Use scissors or other sample cutter if needed. If sample is in another form, cut 8 sets of sample approximately 8 inches long in the MD, by approximately 4 inches long in the CD, one usable unit thick each. Make note and/or a mark that differentiates both face sides of each sample (e.g., fabric side or wire side, top or bottom, etc.). When sample prep is complete, there are 8 sheets prepared with appropriate marking that differentiates one side from the other. These will be referred to hereinafter as: sheets #1 through #8, each with a top side and a bottom side.

Test Operation

Press the 'Return' button to ensure crosshead 201 is in its home position.

Without touching test area of sample, place sheet #1 218 on test platform 200, top side facing up, aligning one of the sheet's CD edges (i.e. edge that is parallel to the CD) along the platform 218 edge closest to the load cell 202 (+/−1 mm). This first test (pull), of 32 total, will be in the MD direction on the top side of the sheet 218. Place a brass bar weight or equivalent 220 (1 inch diameter, 3.75 inches long) on the sheet 218, near its center, aligned perpendicular to the sled pull direction, to prevent sheet 218 from moving during the test. Place test sled "1a" 204 over cap screw head 214 (i.e., sled washer opening 212 over cap screw head 214, and sled side 1a is facing down) such that the diamond file 206 surface is laying flat and parallel on the sheet 218 surface and the cap screw 214 is touching the inside edge of the washers 208.

Gently place a cylindrically shaped brass 20 gram (+/−0.01 grams) weight 222 on top of the sled 204, with its edge aligned and centered with the sled's back end as shown in FIGS. 2 and 3. Initiate the sled movement M and data acquisition by pressing the 'Test' button on the instrument. The test set up is shown in FIG. 3. The computer collects the force (grams) data and, after approximately 10 seconds of test time, this first of 32 test pulls of the overall test is complete.

As shown in FIGS. 2 and 3, if the test pull was set-up correctly, the diamond file 206 face (25 mm by 25 mm square) stays in contact with the sheet 218 during the entire 10 second test time (i.e., does not overhang over the sheet 218 or test platform 200 edge). Also, if at any time during the test the sheet 218 moves, the test is invalid, and must be rerun on another untouched portion of the sheet 218, using a heavier brass bar weight or equivalent 220 to hold sheet 218 down. If the sheet 218 rips or tears, rerun the test on another untouched portion of the sheet 218 (or create a new sheet 218 from the sample). If it rips again, then replace the sled 204 with a different one (giving it the same sled name as the one it replaced). These statements apply to all 32 test pulls.

For the second of 32 test pulls (also an MD pull, but in the opposite direction on the sheet), first remove the 20 gram weight 222, the sled 204, and the brass bar weight or equivalent 220 from the sheet 218. Press the 'Return' button on the instrument to reset the crosshead 201 to its home position. Rotate the sheet 218 180° (with top side still facing up), and replace the brass bar weight or equivalent 220 onto the sheet 218 (in the same position described previously). Place test sled "1b" 204 over the cap screw head 214 (i.e., sled washer opening 212 over cap screw head 214, and sled side 1b is facing down) and the 20 gram weight 222 on the sled 204, in the same manner as described previously. Press the 'Test' button to collect the data for the second test pull.

The third test pull will be in the CD direction. After removing the sled 204, weights 220, 222, and returning the crosshead 201, the sheet 218 is rotated 90° from its previous position (with top side still facing up), and positioned so that its MD edge is aligned with the test platform 200 edge (+/−1 mm). Position the sheet 218 such that the sled 204 will not touch any perforation, if present, or touch the area where the brass bar weight or equivalent 220 rested in previous test pulls. Place the brass bar weight or equivalent 220 onto the sheet 218 near its center, aligned perpendicular to the sled pull direction m. Place test sled "2a" 204 over the cap screw head 214 (i.e., sled washer opening 212 over cap screw head 214, and sled side 2a is facing down) and the 20 gram weight 222 on the sled 204, in the same manner as described previously. Press the 'Test' button to collect the data for the third test pull.

The fourth test pull will also be in the CD, but in the opposite direction and on the opposite half section of the sheet 218. After removing the sled 204, weights 220, 222, and returning the crosshead 201, the sheet 218 is rotated 180° from its previous position (with top side still facing up), and positioned so that its MD edge is again aligned with the test platform 200 edge (+/−1 mm). Position the sheet 218 such that the sled 204 will not touch any perforation, if present, or touch the area where the brass bar weight or equivalent 220 rested in previous test pulls. Place the brass bar weight or equivalent 220 onto the sheet 218 near its center, aligned perpendicular to the sled pull direction m. Place test sled "2b" 204 over the cap screw head 214 (i.e., sled washer opening 212 over cap screw head 214, and sled side 2b is facing down) and the 20 gram weight 222 on the sled 204, in the same manner as described previously. Press the 'Test' button to collect the data for the fourth test pull.

After the fourth test pull is complete, remove the sled 204, weights 220, 222, and return the crosshead 201 to the home position. Sheet #1 218 is discarded.

Test pulls 5-8 are performed in the same manner as 1-4, except that sheet #2 218 has its bottom side now facing upward, and sleds 3a, 3b, 4a, and 4b are used.

Test pulls 9-12 are performed in the same manner as 1-4, except that sheet #3 218 has its top side facing upward, and sleds 5a, 5b, 6a, and 6b are used.

Test pulls 13-16 are performed in the same manner as 1-4, except that sheet #4 218 has its bottom side facing upward, and sleds 7a, 7b, 8a, and 8b are used.

Test pulls 17-20 are performed in the same manner as 1-4, except that sheet #5 218 has its top side facing upward, and sleds 9a, 9b, 10a, and 10b are used.

Test pulls 21-24 are performed in the same manner as 1-4, except that sheet #6 218 has its bottom side facing upward, and sleds 11a, 11b, 12a, and 12b are used.

Test pulls 25-28 are performed in the same manner as 1-4, except that sheet #7 218 has its top side facing upward, and sleds 13a, 13b, 14a, and 14b are used.

Test pulls 29-32 are performed in the same manner as 1-4, except that sheet #8 218 has its bottom side facing upward, and sleds 15a, 15b, 16a, and 16b are used.

Calculations and Results

The collected force data (grams) is used to calculate Slip Stick COF for each of the 32 test pulls, and subsequently the overall average Slip Stick COF for the sample being tested. In order to calculate Slip Stick COF for each test pull, the following calculations are made. First, the standard deviation is calculated for the force data centered on 131st data point (which is 2.5 seconds after the start of the test)+/−26 data points (i.e., the 53 data points that cover the range from 2.0 to 3.0 seconds). This standard deviation calculation is repeated for each subsequent data point, and stopped after the 493rd point (about 9.5 sec). The numerical average of these 363 standard deviation values is then divided by the sled weight (31.7 g) and multiplied by 10,000 to generate the Slip Stick COF*10,000 for each test pull. This calculation is repeated for all 32 test pulls. The numerical average of these 32 Slip Stick COF*10,000 values is the reported value of the Slip Stick COF*10,000 for the sample. For simplicity, it is referred to as just Slip Stick COF, or more simply as Slip Stick, without units (dimensionless), and is reported to the nearest 1.0.

Outliers and Noise

It is not uncommon, with this described method, to observe about one out of the 32 test pulls to exhibit force data with a harmonic wave of vibrations superimposed upon it. For whatever reason, the pulled sled periodically gets into a relatively high frequency, oscillating 'shaking' mode, which can be seen in graphed force vs. time. The sine wave-like noise was found to have a frequency of about 10 sec-1 and amplitude in the 3-5 grams force range. This adds a bias to the true Slip Stick result for that test; thus, it is appropriate for this test pull be treated as an outlier, the data removed, and replaced with a new test of that same scenario (e.g., CD top face) and sled number (e.g. 3a).

To get an estimate of the overall measurement noise, 'blanks' were run on the test instrument without any touching the load cell (i.e., no sled). The average force from these tests is zero grams, but the calculated Slip Stick COF was 66. Thus, it is speculated that, for this instrument measurement system, this value represents that absolute lower limit for Slip Stick COF.

Softness Test Method

TS7 and TS750 values are measured using an EMTEC Tissue Softness Analyzer ("Emtec TSA") (Emtec Electronic GmbH, Leipzig, Germany) interfaced with a computer running Emtec TSA software (version 3.19 or equivalent). According to Emtec, the TS7 value correlates with the real material softness, while the TS750 value correlates with the felt smoothness/roughness of the material. The Emtec TSA comprises a rotor with vertical blades which rotate on the test sample at a defined and calibrated rotational speed (set by manufacturer) and contact force of 100 mN. Contact between the vertical blades and the test piece creates vibrations, which create sound that is recorded by a microphone within the instrument. The recorded sound file is then analyzed by the Emtec TSA software. The sample preparation, instrument operation and testing procedures are performed according the instrument manufacture's specifications.

Sample Preparation

Test samples are prepared by cutting square or circular samples from a finished product. Test samples are cut to a length and width (or diameter if circular) of no less than about 90 mm, and no greater than about 120 mm, in any of these dimensions, to ensure the sample can be clamped into the TSA instrument properly. Test samples are selected to avoid perforations, creases or folds within the testing region. Prepare 8 substantially similar replicate samples for testing. Equilibrate all samples at TAPPI standard temperature and relative humidity conditions (23° C.±2 C.° and 50%±2%) for at least 1 hour prior to conducting the TSA testing, which is also conducted under TAPPI conditions.

Testing Procedure

Calibrate the instrument according to the manufacturer's instructions using the 1-point calibration method with Emtec reference standards ("ref. 2 samples"). If these reference samples are no longer available, use the appropriate reference samples provided by the manufacturer. Calibrate the instrument according to the manufacturer's recommendation and instruction, so that the results will be comparable to those obtained when using the 1-point calibration method with Emtec reference standards ("ref. 2 samples").

Mount the test sample into the instrument, and perform the test according to the manufacturer's instructions. When complete, the software displays values for TS7 and TS750. Record each of these values to the nearest 0.01 dB $V^2$ rms. The test piece is then removed from the instrument and discarded. This testing is performed individually on the top surface (outer facing surface of a rolled product) of four of the replicate samples, and on the bottom surface (inner facing surface of a rolled product) of the other four replicate samples.

The four test result values for TS7 and TS750 from the top surface are averaged (using a simple numerical average); the same is done for the four test result values for TS7 and TS750 from the bottom surface. Report the individual average values of TS7 and TS750 for both the top and bottom surfaces on a particular test sample to the nearest 0.01 dB $V^2$ rms. Additionally, average together all eight test value results for TS7 and TS750, and report the overall average values for TS7 and TS750 on a particular test sample to the nearest 0.01 dB $V^2$ rms.

Molecular Weight Distribution Test Method

Weight-average molecular weight ($M_w$) values were determined as follows. Sample molecular weights were determined on an Agilent 1260 HPLC system equipped with autosampler, column oven, and refractive index detector. The operating system was OpenLAB CDS ChemStation Workstation (A.01.03). Data storage and analysis were performed with Cirrus GPC offline, GPC/SEC Software for ChemStation, version 3.4. Chromatographic conditions are given in Table 3. In carrying out the calculation, the results were calibrated using polystyrene reference samples having known molecular weights. Measurements of $M_w$ values vary by 5% or less. The molecular weight analyses were determined using a chloroform mobile phase.

TABLE 3

| Parameter | Conditions |
| --- | --- |
| Column Set | Three ResiPore columns (Agilent #1113-6300) in series with guard column (Agilent #1113-1300) Particle size: 3 μm Column dimensions: 300 × 7.5 mm |
| Mobile Phase | Chloroform |
| Flow Rate | 1 mL/min, needle wash is included |
| Column Temperature | 40° C. |
| Injection Volume | 20 μL |
| Detector | Refractive Index |
| Detector Temperature | 40° C. |

Table 4 shows the molecular weights and the retention times of the polystyrene standards.

TABLE 4

| Standard Number | Average Reported MW | Retention Time (min) |
| --- | --- | --- |
| 1 | 150,000 | 19.11 |
| 2 | 100,000 | 19.63 |
| 3 | 70,000 | 20.43 |
| 4 | 50,000 | 20.79 |
| 5 | 30,000 | 21.76 |
| 6 | 9,000 | 23.27 |
| 7 | 5,000 | 23.86 |
| 8 | 1,000 | 27.20 |
| 9 | 500 | 28.48 |

Iodine Value

Another aspect of the invention provides a method to measure the iodine value of the glyceride copolymer. The iodine value is determined using AOCS Official Method Cd 1-25 with the following modifications: carbon tetrachloride solvent is replaced with chloroform (25 ml), an accuracy check sample (oleic acid 99%, Sigma-Aldrich; IV=89.86±2.00 cg/g) is added to the sample set, and the reported IV is corrected for minor contribution from olefins identified when determining the free hydrocarbon content of the glyceride copolymer.

Gas Chromatographic Analysis of Fatty Acid Residues in Glyceride Copolymer

The final glyceride oligomer products described in Examples 4, 5, 6, and 7 were analyzed by gas chromatography after olefins were vacuum distilled to below 1% by weight and the resulting oligomer products were transesterified to methyl esters by the following procedure.

A sample 0.10±0.01 g was weighed into a 20 mL scintillation vial. A 1% solution of sodium methoxide in methanol (1.0 mL) was transferred by pipette into the vial and the vial was capped. The capped vial was placed in a sample shaker and shaken at 250 rpm and 60° C. until the sample was completely homogeneous and clear. The sample was removed from the shaker and 5 ml of brine solution followed by 5 ml of ethyl acetate were added by pipette. The vial was vortex mixed for one minute to thoroughly to mix the solution thoroughly. The mixed solution was allowed to sit until the two layers separated. The top (ethyl acetate) layer (1 mL) was transferred to a vial for gas chromatographic analysis. Their normalized compositions, based on a select group of components, are shown in Table 9 in units of wt %.

Gas chromatographic data were collected using an Agilent 6850 instrument equipped with an Agilent DB-WAXETR column (122-7332E, 30 m×250 um×0.25 um film thickness) and a Flame Ionization Detector. The methods and the conditions used are described as follows: The GC method "Fast_FAME.M" was used for the analyses of all samples in Examples 1 through 7.

| Method FAST_FAME.M |
| --- |
| OVEN |

Initial temp: 40° C. (On)
Initial time: 0.00 min

| Ramps: | | | |
| --- | --- | --- | --- |
| # | Rate (° C./min) | Final temp (° C.) | Final time (min) |
| 1 | 20.00 | 240 | 20.00 |
| 2 | 0 (Off) | | |

Post temp: 0° C.
Post time: 0.00 min
Run time: 30.00 min
Maximum temp: 260° C.
Equilibration time: 0.10 min
INLET (SPLIT/SPLITLESS)

Mode: Split
Initial temp: 250° C. (On)
Pressure: 6.06 psi (On)
Split ratio: 150:1
Split flow: 149.9 mL/min
Total flow: 157.5 mL/min
Gas saver: On
Saver flow: 20.0 mL/min
Saver time: 2.00 min
Gas type: Hydrogen
DETECTOR (FID)

Temperature: 300° C. (On)
Hydrogen flow: 40.0 mL/min (On)

| Method FAST_FAME.M |
| --- |

Airflow: 450.0 mL/min (On)
Mode: Constant makeup flow
Makeup flow: 30.0 mL/min (On)
Makeup Gas Type: Nitrogen
Flame: On
Electrometer: On
Lit offset: 2.0 pA
COLUMN Capillary Column
Model Number: DB-WAXETR
Description: 122-7332E
Max temperature: 260° C.
Nominal length: 30.0 m
Nominal diameter: 250.00 um
Nominal film thickness: 0.25 um
Mode: constant flow
Initial flow: 1.0 mL/min
Nominal init pressure: 6.06 psi
Average velocity: 29 cm/sec
Source: Inlet
Outlet: Detector
Outlet pressure: ambient
SIGNAL Data rate: 20 Hz
Type: detector
Save Data: On
INJECTOR Sample pre-washes: 3
Sample pumps: 1
Sample volume (uL): 1.000
Syringe size (uL): 10.0
Pre washes from bottle A: 3
Pre washes from bottle B: 3
Post washes from bottle A: 3
Post washes from bottle B: 3
Viscosity delay (seconds): 0
Pre injection dwell (min): 0.00
Post injection dwell (min): 0.00
Sample skim depth (mm): 0.0(Off)
NanoLiter Adapter Installed
Solvent Wash Mode: A, B
Plunger Speed: Fast
Solvent saver: Off The weight percentage of $C_{10-14}$ unsaturated fatty acid esters in the glyceride copolymer is calculated by summing the weight percentages of all $C_{10}$, $C_{11}$, $C_{12}$, $C_{13}$, and $C_{14}$ unsaturated fatty acid esters obtained in the above analysis. The weight percentage of $C_{10-13}$ unsaturated fatty acid esters in the glyceride copolymer is calculated by summing the weight percentages of all $C_{10}$, $C_{11}$, $C_{12}$, and $C_{13}$ unsaturated fatty acid esters obtained in the above analysis. The weight percentage of $C_{10-11}$ unsaturated fatty acid esters in the glyceride copolymer is calculated by summing the weight percentages of all $C_{10}$ and $C_{11}$ unsaturated fatty acid esters obtained in the above analysis.

Free Hydrocarbon Content

Another aspect of this invention provides a method to determine both the free hydrocarbon content of the glyceride copolymer. The method combines gas chromatography/mass spectroscopy (GC/MS) to confirm identity of the free hydrocarbon homologs and gas chromatography with flame ionization detection (GC/FID) to quantify the free hydrocarbon present in the glyceride copolymer.

Sample Prep: The sample to be analyzed was typically trans-esterified by diluting (e.g. 400:1) in methanolic KOH (e.g. 0.1N) and heating in a closed container until the reaction was complete (i.e. 90° C. for 30 min.) then cooled to room temperature. The sample solution could then be treated with 15% boron tri-fluoride in methanol and again heated in a closed vessel until the reaction was complete (i.e. at 60° C. for 30 min.) both to acidify (methyl orange-red) and to methylate any free acid present in the sample. After allowing to cool to room temperature, the reaction was quenched by addition of saturated NaCl in water. An organic extraction solvent such as cyclohexane containing a known level internal standard (e.g. 150 ppm dimethyl adipate) was then added to the vial and mixed well. After the layers separated, a portion of the organic phase was transferred to a vial suitable for injection to the gas chromatograph. This sample extraction solution was analyzed by GC/MS to confirm identification of peaks matching hydrocarbon retention times by comparing to reference spectra and then by GC/FID to calculate concentration of hydrocarbons, fatty acid, and fatty diacid by comparison to standard FID response factors.

A hydrocarbon standard of known concentrations, such as 50 ppm each, of typically observed hydrocarbon compounds (i.e. 1-dodecene, 1-tridecene, 1-tetradecene, 1-pentadecene, 1-hexadecene, 1-heptadecene, 1-octadecene, dodecane, tridecane, tetradecane, pentadecane, hexadecane, heptadecane and octadecane) was prepared by dilution in the same solvent containing internal standard as was used to extract the sample reaction mixture. This hydrocarbon standard was analyzed by GC/MS to generate retention times and reference spectra and then by GC/FID to generate retention times and response factors.

GC/MS: An Agilent 7890 GC equipped with a split/splitless injection port coupled with a Waters QuattroMicroGC mass spectrometer set up in EI+ ionization mode was used to carry out qualitative identification of peaks observed. A non-polar DB1-HT column (15 m×0.25 mm×0.1 um df) was installed with 1.4 mL/min helium carrier gas. In separate runs, 1 uL of the hydrocarbon standard and the sample extract solution were injected to a 300° C. injection port with a split ratio of 25:1. The oven was held at 40° C. for 1 minute then ramped 15 C.°/minute to a final temperature of 325° C. which was held for 10 minutes resulting in a total run time of 30 minutes. The transfer line was kept at 330° C. and the temperature of the EI source was 230° C. The ionization energy was set at 70 eV and the scan range was 35-550 m/z.

GC/FID: An Agilent 7890 GC equipped with a split/splitless injection port and a flame ionization detector was used for quantitative analyses. A non-polar DB1-HT column (5 m×0.25 mm×0.1 um df) was installed with 1.4 mL/min helium carrier gas. In separate runs, 1 uL of the hydrocarbon standard and the sample extract solution was injected to a 330° C. injection port with a split ratio of 100:1. The oven was held at 40° C. for 0.5 minutes then ramped at 40 C.°/minute to a final temperature of 380° C. which was held for 3 minutes resulting in a total run time of 12 minutes. The FID was kept at 380° C. with 40 mL/minute hydrogen gas flow and 450 mL/min air flow. Make up gas was helium at 25 mL/min. The hydrocarbon standard was used to create calibration tables in the Chemstation Data Analysis software including known concentrations to generate response factors. These response factors were applied to the corresponding peaks in the sample chromatogram to calculate total amount of free hydrocarbon found in each sample.

All documents cited in the Detailed Description of the Invention are, in relevant part, incorporated by reference herein; the citation of any document is not to be construed as an admission that it is prior art with respect to the present invention. To the extent that any meaning or definition of the term in this written document conflicts with any meaning or definition of the term in a document incorporated by reference, the meaning or definition assigned to the term in this written document shall govern.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fibrous structure comprising papermaking fibers, and comprising a surface comprising a surface softening composition comprising a glyceride copolymer having formula (I):

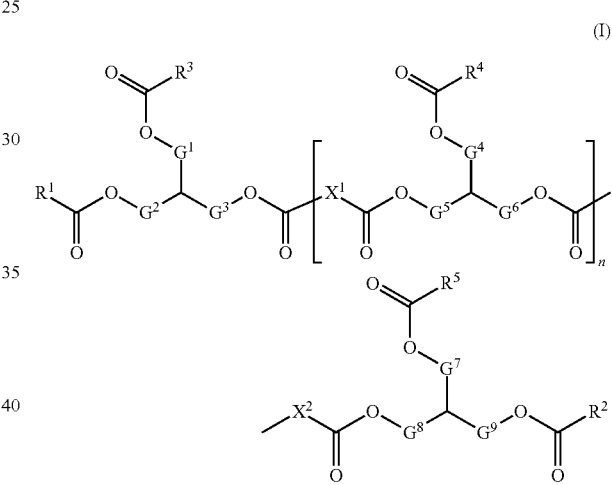

wherein:
each $R^1$, $R^2$, $R^3$, $R^4$, and $R^5$ in the glyceride copolymer is independently selected from the group consisting of an oligomeric glyceride moiety, a $C_{1-24}$ alkyl, a substituted $C_{1-24}$ alkyl wherein the substituent is one or more —OH moieties, a $C_{2-24}$ alkenyl, or a substituted $C_{2-24}$ alkenyl wherein the substituent is one or more —OH moieties; wherein each of the following combinations of moieties may each independently be covalently linked:
$R^1$ and $R^3$,
$R^2$ and $R^5$,
$R^1$ and an adjacent $R^4$,
$R^2$ and an adjacent $R^4$,
$R^3$ and an adjacent $R^4$,
$R^5$ and an adjacent $R^4$, or
any two adjacent $R^4$;
such that the covalently linked moieties form an alkenylene moiety;
each $X^1$ and $X^2$ in said glyceride copolymer is independently selected from the group consisting of a $C_{1-32}$ alkylene, a substituted $C_{1-32}$ alkylene wherein the substituent is one or more —OH moieties, a $C_{2-32}$ alkenylene or a substituted $C_{2-32}$ alkenylene wherein the substituent is one or more —OH moieties;

two of $G^1$, $G^2$, and $G^3$ are —$CH_2$—, and one of $G^1$, $G^2$, and $G^3$ is a direct bond;

for each individual repeat unit in the repeat unit having index n, two of $G^4$, $G^5$, and $G^6$ are —$CH_2$—, and one of $G^4$, $G^5$, and $G^6$ is a direct bond, and the values $G^4$, $G^5$, and $G^6$ for each individual repeat unit are independently selected from the values of $G^4$, $G^5$, and $G^6$ in other repeating units;

two of $G^7$, $G^8$, and $G^9$ are —$C_2$—, and one of $G^7$, $G^8$, and $G^9$ is a direct bond;

n is an integer from 3 to 250;

with the proviso for each of said second glyceride copolymers at least one of $R^1$, $R^2$, $R^3$, and $R^5$ or at least one $R^4$ in one individual repeat unit of said repeat unit having index n, is selected from the group consisting of: 8-nonenyl; 8-decenyl; 8-undecenyl; 8-dodecenyl; 8,11-dodecadienyl; 8,11-tridecadienyl; 8,11-tetradecadienyl; 8,11-pentadecadienyl; 8,11,14-pentadecatrienyl; 8,11,14-hexadecatrienyl; 8,11,14-octadecatrienyl; 9-methyl-8-decenyl; 9-methyl-8-undecenyl; 10-methyl-8-undecenyl; 12-methyl-8,11-tridecadienyl; 12-methyl-8,11-tetradecadienyl; 13-methyl-8,11-tetradecadienyl; 15-methyl-8,11,14-hexadecatrienyl; 15-methyl-8,11,14-heptadecatrienyl; 16-methyl-8,11,14-heptadecatrienyl; 12-tridecenyl; 12-tetradecenyl; 12-pentadecenyl; 12-hexadecenyl; 13-methyl-12-tetradecenyl; 13-methyl-12-pentadecenyl; and 14-methyl-12-pentadecenyl.

2. The fibrous structure of claim 1, wherein the glyceride copolymers has a weight average molecular weight of from 4,000 g/mol to 150,000 g/mol.

3. The fibrous structure according to claim 1, wherein for said glyceride copolymer, at least one of $R^1$, $R^2$, $R^3$, $R^4$, or $R^5$ is a $C_{9-13}$ alkenyl.

4. The fibrous structure according to claim 1, wherein for the glyceride copolymer, $R^1$ is a $C_{1-24}$ alkyl or a $C_{2-24}$ alkenyl.

5. The fibrous structure according to claim 1, wherein for the glyceride copolymer, $R^2$ is a $C_{1-24}$ alkyl or a $C_{2-24}$ alkenyl.

6. The fibrous structure according to claim 1, wherein for the glyceride copolymer, $R^3$ is a $C_{1-24}$ alkyl or a $C_{2-24}$ alkenyl.

7. The fibrous structure according to claim 1, wherein for the glyceride copolymer, each $R^4$ is independently selected from a $C_{1-24}$ alkyl and a $C_{2-24}$ alkenyl.

8. The fibrous structure according to claim 1, wherein for the glyceride copolymer, $R^5$ is a $C_{1-24}$ alkyl and a $C_{2-24}$ alkenyl.

9. The fibrous structure according to claim 1, wherein the surface softening composition further comprises a surface softening agent selected from the group consisting of: silicones, quaternary ammonium compounds, and mixtures thereof.

10. The fibrous structure according to claim 1, wherein the fibrous structure further comprises a lotion composition.

11. The fibrous structure according to claim 1, wherein the fibrous structure is a through-air-dried fibrous structure.

12. The fibrous structure according to claim 1, wherein the fibrous structure is a dried fibrous structure.

13. The fibrous structure according to claim 1, wherein the fibrous structure is belt creped.

14. The fibrous structure according to claim 1, wherein the fibrous structure is fabric creped.

15. The fibrous structure according to claim 1, wherein the fibrous structure comprises animal fibers, mineral fibers, plant fibers, or mixtures thereof.

16. The fibrous structure according to claim 1, wherein the fibrous structure exhibits a Slip Stick Coefficient of Friction of less than 360, as measured according to the Slip Stick Coefficient of Friction Test Method.

17. The fibrous structure according to claim 1, wherein the fibrous structure exhibits an average TS7 Softness Value of less than 9 as measured according to the Softness Test Method.

18. A single- or multi-ply sanitary tissue product comprising a fibrous structure according to claim 1.

19. The sanitary tissue product according to claim 18, wherein the sanitary tissue product is toilet paper.

* * * * *